United States Patent
Liu et al.

(10) Patent No.: US 11,696,284 B2
(45) Date of Patent: Jul. 4, 2023

(54) INTERFERENCE DETECTION, SIGNALING, AND MITIGATION TECHNIQUES FOR LOW LATENCY TRANSMISSIONS

(71) Applicant: QUALCOMM Incorporated, San Diego, CA (US)

(72) Inventors: Chih-Hao Liu, San Diego, CA (US); Seyed Ali Akbar Fakoorian, San Diego, CA (US); Srinivas Yerramalli, San Diego, CA (US); Qingjiang Tian, San Diego, CA (US); Andrei Dragos Radulescu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 16/563,730

(22) Filed: Sep. 6, 2019

(65) Prior Publication Data
US 2020/0084759 A1    Mar. 12, 2020

Related U.S. Application Data

(60) Provisional application No. 62/729,263, filed on Sep. 10, 2018.

(51) Int. Cl.
*H04W 72/00* (2023.01)
*H04W 72/20* (2023.01)
(Continued)

(52) U.S. Cl.
CPC .......... *H04W 72/20* (2023.01); *H04L 5/0048* (2013.01); *H04L 5/0055* (2013.01); *H04W 24/10* (2013.01);
(Continued)

(58) Field of Classification Search
None
See application file for complete search history.

(56) References Cited

U.S. PATENT DOCUMENTS

2013/0308503 A1*  11/2013  Kim .................. H04L 5/0053
                                                           370/280
2015/0055588 A1*  2/2015  Yerramalli ........ H04W 72/0446
                                                           370/329
(Continued)

FOREIGN PATENT DOCUMENTS

| JP | 2001016627 A | 1/2001 |
| WO | WO-2019070579 A1 | 4/2019 |
| WO | WO-2019084449 A1 | 5/2019 |

OTHER PUBLICATIONS

International Search Report and Written Opinion—PCT/US2019/050246—ISA/EPO—dated Dec. 13, 2019.
(Continued)

*Primary Examiner* — Brandon M Renner
(74) *Attorney, Agent, or Firm* — Holland & Hart LLP

(57) ABSTRACT

Generally, the described techniques provide for a base station transmitting an indication of a set of one or more available channels to a user equipment (UE). The base station may transmit to the UE a first downlink burst using a first channel and a first frame period. In some cases, the base station may detect interference associated with the first downlink burst, for example, by performing a listen-before-talk (LBT) procedure or through an interference management resources (IMR) procedure in which the base station transmits reference signal signals to the UE that the UE may use to return a report on measured interference. If the base station detects interference, the base station may transmit to the UE an instruction to switch to a second channel and a
(Continued)

second frame period, where the second channel may be selected from the set of one or more available channels.

25 Claims, 24 Drawing Sheets

(51) Int. Cl.
| | |
|---|---|
| H04L 5/00 | (2006.01) |
| H04W 24/10 | (2009.01) |
| H04W 28/02 | (2009.01) |
| H04W 72/541 | (2023.01) |
| H04W 72/542 | (2023.01) |

(52) U.S. Cl.
CPC ..... *H04W 28/0236* (2013.01); *H04W 72/541* (2023.01); *H04W 72/542* (2023.01)

(56) References Cited

U.S. PATENT DOCUMENTS

| | | | | |
|---|---|---|---|---|
| 2015/0215074 A1* | 7/2015 | Kim | ................... | H04L 1/1874 714/748 |
| 2015/0215929 A1* | 7/2015 | Damnjanovic | ....... | H04W 48/16 370/241 |
| 2016/0037364 A1* | 2/2016 | Kairouz | ................ | H04L 1/0015 370/252 |
| 2016/0073414 A1* | 3/2016 | Li | ................... | H04W 72/0453 370/330 |
| 2016/0255676 A1* | 9/2016 | Vajapeyam | ........... | H04L 1/0009 370/329 |
| 2016/0302230 A1* | 10/2016 | Novlan | ............... | H04L 27/0006 |
| 2017/0094672 A1* | 3/2017 | Yerramalli | ............ | H04W 24/10 |
| 2017/0134106 A1* | 5/2017 | Emberson | ............. | H04H 20/71 |
| 2017/0332433 A1* | 11/2017 | Garcia | ................. | H04W 72/04 |
| 2018/0014220 A1* | 1/2018 | Yabata | ................. | H04W 48/18 |
| 2018/0042013 A1* | 2/2018 | Byun | ................... | H04L 27/2602 |
| 2018/0220459 A1* | 8/2018 | Park | ...................... | H04W 48/10 |
| 2018/0302195 A1* | 10/2018 | Kim | .................... | H04W 28/065 |
| 2018/0323923 A1* | 11/2018 | Wang | .................... | H04L 5/0053 |
| 2018/0359772 A1* | 12/2018 | Park | ...................... | H04W 16/14 |
| 2019/0037582 A1* | 1/2019 | Noh | ....................... | H04L 5/0094 |
| 2019/0132780 A1* | 5/2019 | Hahn | ..................... | H04W 36/30 |
| 2019/0182093 A1* | 6/2019 | Jayawardene | ...... | H04L 27/2657 |
| 2019/0223161 A1* | 7/2019 | Muruganathan | ...... | H04L 5/0048 |
| 2019/0229759 A1* | 7/2019 | Hwang | .................... | H04L 5/00 |
| 2019/0357180 A1* | 11/2019 | Miao | .................... | H04W 72/04 |
| 2019/0380064 A1* | 12/2019 | Salem | ............... | H04W 74/0808 |
| 2020/0053775 A1* | 2/2020 | Lee | ........................ | H04L 1/0026 |
| 2020/0221429 A1* | 7/2020 | Li | .......................... | H04L 5/0053 |
| 2020/0389805 A1* | 12/2020 | Kim | ...................... | H04L 1/0027 |

OTHER PUBLICATIONS

Qualcomm Incorporated: "Report of Email Discussion [102#69] [Nr] NR-U Mobility", 3GPP Draft; R2-1810323_Report_Email_Discussion_NRU_Mobility, 3rd Generation Partnership Project (3GPP), Mobile Competence Centre; 650, Route Des Lucioles; F-06921 Sophia-Antipolis Cedex; France, vol. RAN WG2, No. Montreal, Canada; Jul. 2, 2018-Jul. 6, 2018, Jul. 1, 2018, XP051467501, 26 pages, Retrieved from the Internet: URL: http://www.3gpp.org/ftp/Meetings%5F3GPP%5FSYNC/RAN2/Docs [retrieved on Jul. 1, 2018] the whole document.

Samsung: "Activation/deactivation of Bandwidth Parts in NR," 3GPP Draft; R2-1711189, Activation_Deactivation of Bandwidth Part in NR_R2, 3rd Generation Partnership Project (3GPP), Mobile Competence Centre; 650, Route Des Lucioles; F-06921, Sophia-Antipolis CEDE, vol. RAN WG2, No. Prague, Czech; Oct. 9, 2017-Oct. 13, 2017, Sep. 29, 2017, XP051355440, 5 pages, Retrieved from the Internet: URL: http://www.3gpp.org/ftp/tsg_ran/WG2_RL2/TSGR2_99bis/Docs/ [retrieved on Sep. 29, 2017].

* cited by examiner

INTERFERENCE DETECTION, SIGNALING, AND MITIGATION TECHNIQUES FOR LOW LATENCY TRANSMISSIONS

CROSS REFERENCE

The present Application for Patent claims benefit of U.S. Provisional Patent Application No. 62/729,263 by LIU et al., entitled "INTERFERENCE DETECTION, SIGNALING, AND MITIGATION TECHNIQUES FOR LOW LATENCY TRANSMISSIONS," filed Sep. 10, 2018, assigned to the assignee hereof, and expressly incorporated by reference in its entirety.

BACKGROUND

The following relates generally to wireless communications, and more specifically to interference detection, signaling, and mitigation techniques for low latency transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

A base station may serve wireless devices configured for different types of wireless communications. For example, a base station may serve wireless devices configured for low latency communications. Low latency communications in, for example, a shared or unlicensed radio frequency spectrum band, may often be used for mission-critical and/or delay-sensitive information. In some cases, transmissions in the shared or unlicensed radio frequency spectrum band from other devices in the vicinity of the low latency system may interfere with the communications between devices of the low latency communications system.

SUMMARY

The described techniques relate to improved methods, systems, devices, and apparatuses that support interference detection, signaling, and mitigation techniques for low latency communications in an unlicensed or shared radio frequency spectrum band. Generally, the described techniques provide for a base station transmitting an indication of a set of one or more available channels to a user equipment (UE). For example, the base station may search through potential radio frequency spectrum bands to identify channels that are unused and may have compiled the unused channels into a list of the available channels (e.g., a whitelist of channels) that may be free from interference. The base station may transmit to the UE a first downlink burst using a first channel and a first frame period. In some cases, the base station may detect interference with the first downlink burst. The interference may, for example, be due to a second UE in the vicinity of the base station and the UE with which the base station is communication, where the second UE may transmit probe signals to discover a nearby access point (AP) so that the UE can connect to a wireless local area network (WLAN). As the UE may transmit the probe signals using unlicensed radio frequency spectrum, the probe signals transmissions may interfere with communications between devices of the low latency communications system that may also use unlicensed radio frequency spectrum.

The base station may detect such interference, for example, by performing a listen-before-talk (LBT) procedure or through an interference management resources (IMR) procedure in which the base station transmits reference signal signals to the UE that the UE may use to return a report on measured interference to the base station. The base station may also infer a presence of interference, for example, based on acknowledgements (ACKs) and/or negative ACKs (NACKs) being received, or not received, respectively, from the target UE or from other UEs in the vicinity. The UE may also explicitly indicate to the base station the presence of interference, for example, using uplink control information (UCI).

If the base station detects interference, to mitigate the interference and/or to avoid further interference, the base station may transmit to the UE an instruction to switch to a second channel and a second frame period, where the second channel may be selected from the set of one or more available channels. The base station may further transmit to the UE a second downlink burst from the base station using the second channel and the second frame period. In some cases, the second downlink burst may include a retransmission of some or all of the first downlink burst that may have encountered interference. Additionally or alternatively, the base station may, upon detecting interference, signal to the UE an indication of a frequency hopping pattern. The frequency hopping pattern may instruct the UE to switch between one or more channels for subsequent transmissions using the indicated frequency hopping pattern, where the subsequent transmissions may include a retransmission of the first downlink burst and/or transmissions of further downlink information.

A method of wireless communication at a UE is described. The method may include receiving an indication of a set of one or more available channels from a base station, receiving a first downlink burst from a base station using a first channel and a first frame period, receiving from the base station an instruction to switch to a second channel and a second frame period, the second channel selected from the set of one or more available channels, and receiving, based on the instruction, a second downlink burst from the base station using the second channel and the second frame period.

An apparatus for wireless communication at a UE is described. The apparatus may include a processor, memory in electronic communication with the processor, and instructions stored in the memory. The instructions may be executable by the processor to cause the apparatus to receive an indication of a set of one or more available channels from a base station, receive a first downlink burst from a base station using a first channel and a first frame period, receive from the base station an instruction to switch to a second channel and a second frame period, the second channel selected from the set of one or more available channels, and receive, based on the instruction, a second downlink burst from the base station using the second channel and the second frame period.

Another apparatus for wireless communication at a UE is described. The apparatus may include means for receiving an indication of a set of one or more available channels from a base station, receiving a first downlink burst from a base station using a first channel and a first frame period, receiving from the base station an instruction to switch to a second channel and a second frame period, the second channel selected from the set of one or more available channels, and receiving, based on the instruction, a second downlink burst from the base station using the second channel and the second frame period.

A non-transitory computer-readable medium storing code for wireless communication at a UE is described. The code may include instructions executable by a processor to receive an indication of a set of one or more available channels from a base station, receive a first downlink burst from a base station using a first channel and a first frame period, receive from the base station an instruction to switch to a second channel and a second frame period, the second channel selected from the set of one or more available channels, and receive, based on the instruction, a second downlink burst from the base station using the second channel and the second frame period.

Some examples of the method, apparatuses, and non-transitory computer-readable medium described herein may further include operations, features, means, or instructions for receiving IMR from the base station, the first downlink burst including the IMR.

Some examples of the method, apparatuses, and non-transitory computer-readable medium described herein may further include operations, features, means, or instructions for receiving downlink control information (DCI) from the base station, the DCI including a trigger for an IMR report, and the first downlink burst including the DCI, generating the IMR report in response to the trigger, the IMR report indicating an amount of interference measured using the received IMR and transmitting the IMR report to the base station.

Some examples of the method, apparatuses, and non-transitory computer-readable medium described herein may further include operations, features, means, or instructions for receiving an IMR configuration from the base station, the IMR configuration indicating that IMR may be to be transmitted semi-persistently at a periodicity within the first downlink burst, and the first downlink burst including the IMR configuration, generating one or more IMR reports at the periodicity within the first downlink burst based on the IMR configuration, each of the one or more IMR reports indicating respective amounts of interference measured using the received IMR and transmitting the one or more IMR reports to the base station.

In some examples of the method, apparatuses, and non-transitory computer-readable medium described herein, the IMR includes a zero-power (ZP) channel state information (CSI)-reference signal (CSI-RS), and the IMR report includes a CSI report.

Some examples of the method, apparatuses, and non-transitory computer-readable medium described herein may further include operations, features, means, or instructions for determining that at least a portion of the first downlink burst was not successfully received and transmitting a NACK to the base station based on determining that the at least the portion of the first downlink burst was not successfully received.

Some examples of the method, apparatuses, and non-transitory computer-readable medium described herein may further include operations, features, means, or instructions for identifying interference associated with the first downlink burst and transmitting an interference indication to the base station, the interference indication based on the identified interference.

Some examples of the method, apparatuses, and non-transitory computer-readable medium described herein may further include operations, features, means, or instructions for transmitting UCI to the base station, the UCI including the interference indication.

Some examples of the method, apparatuses, and non-transitory computer-readable medium described herein may further include operations, features, means, or instructions for determining a signal-to-interference-plus-noise ratio (SINR) based on the first downlink burst, the interference indication including an indication of the SINR.

Some examples of the method, apparatuses, and non-transitory computer-readable medium described herein may further include operations, features, means, or instructions for transmitting an ACK or a NACK, the transmitted ACK or the transmitted NACK including the interference indication.

Some examples of the method, apparatuses, and non-transitory computer-readable medium described herein may further include operations, features, means, or instructions for receiving, from the base station, a measurement gap configuration to configure the UE to perform interference detection during a measurement gap, where the measurement gap at least partially overlaps with an idle period of the first frame period, sensing the second channel during the measurement gap based on the measurement gap configuration to generate a measurement report and transmitting the measurement report to the base station indicating whether the second channel may be available based on sensing the second channel.

Some examples of the method, apparatuses, and non-transitory computer-readable medium described herein may further include operations, features, means, or instructions for receiving DCI from the base station, the DCI including the instruction to switch to the second channel.

In some examples of the method, apparatuses, and non-transitory computer-readable medium described herein, the second frame period may be offset from the first frame period by one slot.

In some examples of the method, apparatuses, and non-transitory computer-readable medium described herein, the second downlink burst includes a retransmission of at least a portion of the data of the first downlink burst.

In some examples of the method, apparatuses, and non-transitory computer-readable medium described herein, the instruction to switch to the second channel includes an instruction to switch from a first bandwidth part (BWP) to a second BWP.

Some examples of the method, apparatuses, and non-transitory computer-readable medium described herein may further include operations, features, means, or instructions for receiving from the base station an indication of a frequency hopping pattern, the frequency hopping pattern including an instruction to switch between a set of additional channels and a set of additional frame periods, each of the set of additional channels selected from the set of one or more available channels.

In some examples of the method, apparatuses, and non-transitory computer-readable medium described herein, the frequency hopping pattern includes a random frequency hopping pattern or a pseudo-random frequency hopping pattern.

Some examples of the method, apparatuses, and non-transitory computer-readable medium described herein may further include operations, features, means, or instructions for receiving from the base station an instruction to switch to the first channel upon an expiration of a timer.

A method of wireless communication at a base station is described. The method may include transmitting an indication of a set of one or more available channels to a UE, detecting interference associated with a first downlink burst between the base station and the UE, the first downlink burst using a first channel and a first frame period, transmitting to the UE, based on the detected interference, an instruction to switch to a second channel and a second frame period, the second channel selected from the set of one or more available channels, and transmitting, based on the instruction, a second downlink burst to the UE using the second channel and the second frame period.

An apparatus for wireless communication at a base station is described. The apparatus may include a processor, memory in electronic communication with the processor, and instructions stored in the memory. The instructions may be executable by the processor to cause the apparatus to transmit an indication of a set of one or more available channels to a UE, detect interference associated with a first downlink burst between the base station and the UE, the first downlink burst using a first channel and a first frame period, transmit to the UE, based on the detected interference, an instruction to switch to a second channel and a second frame period, the second channel selected from the set of one or more available channels, and transmit, based on the instruction, a second downlink burst to the UE using the second channel and the second frame period.

Another apparatus for wireless communication at a base station is described. The apparatus may include means for transmitting an indication of a set of one or more available channels to a UE, detecting interference associated with a first downlink burst between the base station and the UE, the first downlink burst using a first channel and a first frame period, transmitting to the UE, based on the detected interference, an instruction to switch to a second channel and a second frame period, the second channel selected from the set of one or more available channels, and transmitting, based on the instruction, a second downlink burst to the UE using the second channel and the second frame period.

A non-transitory computer-readable medium storing code for wireless communication at a base station is described. The code may include instructions executable by a processor to transmit an indication of a set of one or more available channels to a UE, detect interference associated with a first downlink burst between the base station and the UE, the first downlink burst using a first channel and a first frame period, transmit to the UE, based on the detected interference, an instruction to switch to a second channel and a second frame period, the second channel selected from the set of one or more available channels, and transmit, based on the instruction, a second downlink burst to the UE using the second channel and the second frame period.

Some examples of the method, apparatuses, and non-transitory computer-readable medium described herein may further include operations, features, means, or instructions for performing a LBT procedure prior to transmitting the first downlink burst, where detecting the interference may be based on the LBT procedure.

Some examples of the method, apparatuses, and non-transitory computer-readable medium described herein may further include operations, features, means, or instructions for transmitting IMR to the UE and transmitting the first downlink burst to the UE, the first downlink burst including the IMR.

Some examples of the method, apparatuses, and non-transitory computer-readable medium described herein may further include operations, features, means, or instructions for transmitting DCI to the UE, the DCI including a trigger for an IMR report, and the first downlink burst including the DCI and receiving the IMR report based on transmitting the DCI, where detecting the interference may be based on the received IMR report.

Some examples of the method, apparatuses, and non-transitory computer-readable medium described herein may further include operations, features, means, or instructions for transmitting an IMR configuration to the UE, the IMR configuration indicating that IMR may be to be transmitted semi-persistently at a periodicity within the first downlink burst, the first downlink burst including the IMR configuration and receiving one or more of the IMR reports based on the IMR configuration, where detecting the interference may be based on the received one or more IMR reports.

In some examples of the method, apparatuses, and non-transitory computer-readable medium described herein, the IMR includes a ZP CSI-RS, and the IMR report includes a CSI report.

Some examples of the method, apparatuses, and non-transitory computer-readable medium described herein may further include operations, features, means, or instructions for receiving one or more NACKs from a set of UEs and determining that a number of received NACKs satisfies a threshold value, where detecting the interference may be based on the number of received NACKs satisfying the threshold value.

Some examples of the method, apparatuses, and non-transitory computer-readable medium described herein may further include operations, features, means, or instructions for determining that an ACK or a NACK was not received from the UE in response to transmitting a downlink transmission to the UE, where detecting the interference may be based on determining that the ACK or NACK was not received.

Some examples of the method, apparatuses, and non-transitory computer-readable medium described herein may further include operations, features, means, or instructions for receiving an interference indication from the UE, where detecting the interference may be based on the received interference indication.

Some examples of the method, apparatuses, and non-transitory computer-readable medium described herein may further include operations, features, means, or instructions for receiving UCI from the UE, the UCI including the interference indication.

In some examples of the method, apparatuses, and non-transitory computer-readable medium described herein, the interference indication includes an indication of a SINR at the UE and detecting the interference may be based on the SINR exceeding a SINR threshold.

Some examples of the method, apparatuses, and non-transitory computer-readable medium described herein may further include operations, features, means, or instructions for receiving an ACK or a NACK, the transmitted ACK or the transmitted NACK including the interference indication.

Some examples of the method, apparatuses, and non-transitory computer-readable medium described herein may further include operations, features, means, or instructions for determining, during the first frame period, that the second channel may be available, where the set of one or more available channels includes the second channel.

Some examples of the method, apparatuses, and non-transitory computer-readable medium described herein may further include operations, features, means, or instructions for sensing the second channel during an idle period of the first frame period, where determining that the second channel may be available may be based on the sensing.

Some examples of the method, apparatuses, and non-transitory computer-readable medium described herein may further include operations, features, means, or instructions for transmitting a measurement gap configuration to the UE to configure the UE to perform interference detection during a measurement gap, where the measurement gap at least partially overlaps with an idle period of the first frame period and receiving a measurement report from the UE indicating whether the second channel may be available based on the transmitted measurement gap configuration, where determining that the second channel may be available may be based on the received measurement report.

Some examples of the method, apparatuses, and non-transitory computer-readable medium described herein may further include operations, features, means, or instructions for transmitting DCI to a set of one or more UEs, the set including the UE, and the DCI including the instruction to switch to the second channel.

In some examples of the method, apparatuses, and non-transitory computer-readable medium described herein, the second frame period may be offset from the first frame period by one slot.

In some examples of the method, apparatuses, and non-transitory computer-readable medium described herein, the second downlink burst includes a retransmission of at least a portion of the data of the first downlink burst.

In some examples of the method, apparatuses, and non-transitory computer-readable medium described herein, the instruction to switch to the second channel includes an instruction to switch from a first bandwidth part BWP to a second BWP.

Some examples of the method, apparatuses, and non-transitory computer-readable medium described herein may further include operations, features, means, or instructions for transmitting to the UE an indication of a frequency hopping pattern, the frequency hopping pattern including an instruction to switch between a set of additional channels and a set of additional frame periods, each of the set of additional channels selected from the set of one or more available channels.

In some examples of the method, apparatuses, and non-transitory computer-readable medium described herein, the frequency hopping pattern includes a random frequency hopping pattern or a pseudo-random frequency hopping pattern.

Some examples of the method, apparatuses, and non-transitory computer-readable medium described herein may further include operations, features, means, or instructions for transmitting to the UE an instruction to switch to the first channel upon an expiration of a timer.

In some examples of the method, apparatuses, and non-transitory computer-readable medium described herein, the set of one or more available channels may include one or more whitelisted channels.

DETAILED DESCRIPTION

Figure 1:
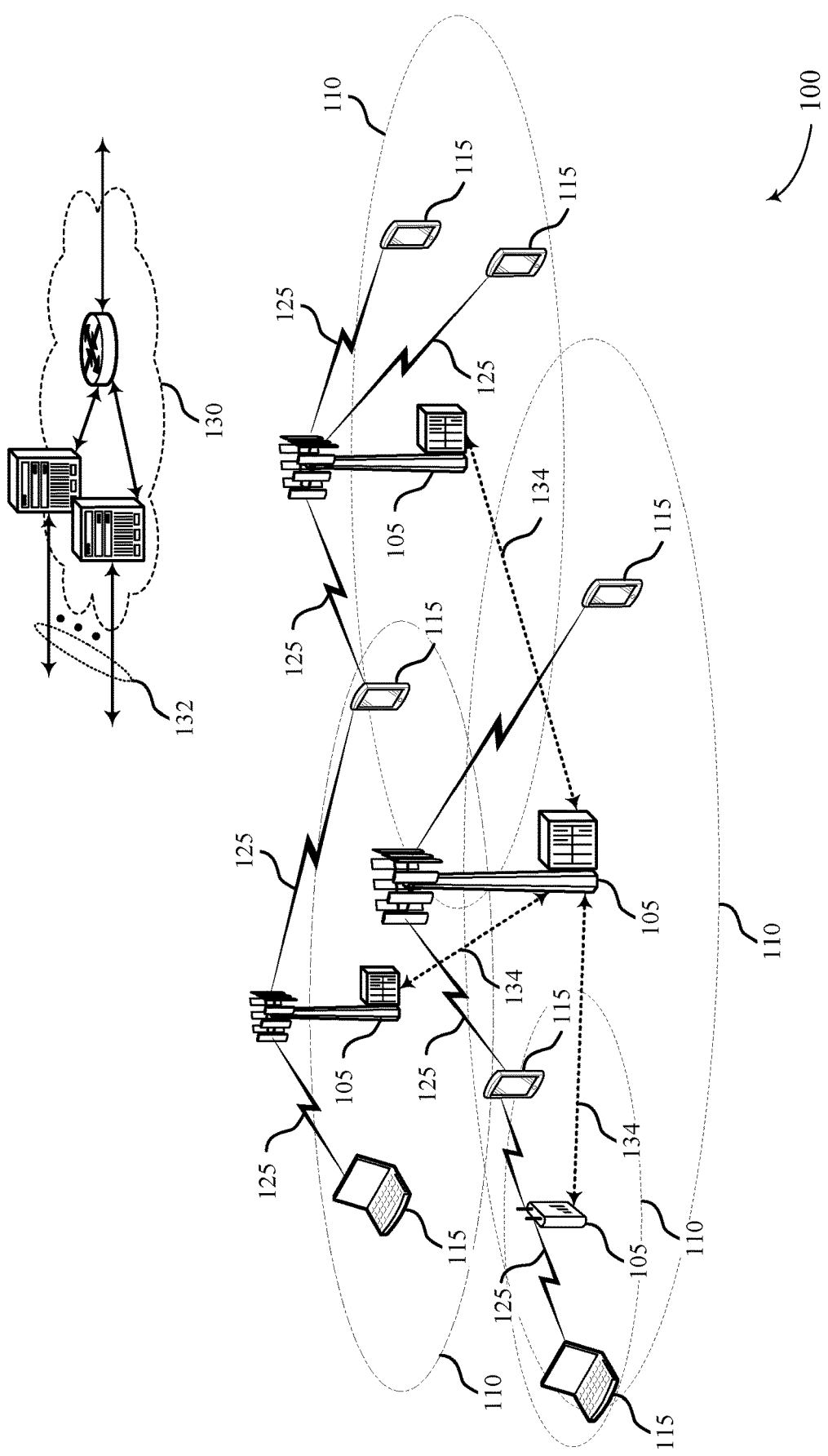
FIG. 1 illustrates an example of a wireless communications system that supports interference detection, signaling, and mitigation techniques for low latency transmissions in accordance with aspects of the present disclosure.

Some wireless communications systems may utilize shared radio frequency spectrum. In a shared or unlicensed radio frequency spectrum, a wireless device, such as base station or a user equipment (UE), may utilize a listen-before-talk (LBT) procedure to contend for access to the transmission medium in order to transmit. To perform the LBT procedure, the base station may sense an energy level of one or more channels and compare the sensed energy level to an energy level threshold to determine whether the channel is available. The base station may perform the LBT procedure and initiate communications with the UE in response to successfully performing the LBT procedure (i.e., that the sensed channel is available). If the transmission medium is busy, the contending device may back off and try again later. If the channel is clear, the wireless device may reserve the transmission medium and begin transmitting.

In some cases, rules may be established for using shared or unlicensed radio frequency spectrum, such as frame based equipment (FBE) regulations. FBE LBT procedure is an LBT protocol for medium access according to European Telecommunications Standards Institute (ETSI), although other regulatory bodies may have similar rules for such spectrum access. FBE is equipment in which a transmit and/or receive structure is not demand-driven, but may have a fixed timing. That is, FBE may transmit and/or receive according to a fixed frame structure with a periodicity equal to a fixed frame period. Techniques discussed herein contemplate a frame structure that may comply with FBE regulations or other regulations for shared or unlicensed radio frequency spectrum.

Low latency communications, such as ultra-reliable low latency communications (URLLC), may often be used for mission-critical and/or delay-sensitive information. A low latency communications system may provide such mission-critical and/or delay-sensitive information in a shared or unlicensed radio frequency spectrum. However, transmissions in unlicensed radio frequency spectrum from other devices in the vicinity of a communications system (e.g., a low latency communications system) may interfere with communications between devices of the communications system. For example, a UE in the vicinity of the communications system may transmit one or more probe signals to discover a nearby access point (AP) so that the UE can connect to a corresponding WLAN to which the AP belongs. As the UE may transmit the probe signals using unlicensed radio frequency spectrum, the probe signals transmissions may interfere with communications between devices of the communications system that may also use unlicensed radio frequency spectrum.

The base station may detect interference by performing an LBT procedure or via an interference management resources (IMR) procedure. In an LBT procedure, the base station may contend for access to the transmission medium in order to transmit. To perform the LBT procedure, the base station may sense an energy level of one or more channels and compare the sensed energy level to an energy level threshold to determine whether the channel is available. The base station may perform the LBT procedure and initiate communications with the UE in response to successfully performing the LBT procedure (i.e., that the sensed channel is available). If the transmission medium is busy, the contending device may back off and try again later. If the channel is available, the wireless device may reserve the transmission medium and begin transmitting. In an IMR procedure, the base station may transmit reference signal signals to the UE that the UE may use to return a report to the base station including measured interference. Additionally or alternatively, the base station may infer a presence of interference, for example, based on acknowledgements (ACKs) and/or negative ACKs (NACKs) being received, or not received, respectively, from the target UE or from other UEs in the vicinity. The UE may also explicitly indicate to the base station the presence of interference, for example, using UCI. Techniques are also discussed herein for maintaining a set of available channels (e.g., a whitelist of channels) that may be free from interference and migrating to one or more of the available channels to mitigate detected or signaled interference.

In some cases, the interference may be of a limited bandwidth (e.g., probe signals may only use one particular channel at a given time). That is, once the base station is aware of the interference, the base station may switch from a currently active first channel to a second channel at a clean carrier frequency to avoid interference affecting further communications (e.g., retransmissions and/or transmission of further information). In some cases, the base station may search through potential radio frequency spectrum bands to identify channels that are unused and compile the unused (e.g., available) channels to maintain the list of clean channels that may be free from interference. According to a first technique for mitigating interference in the low latency communications system, the base station may, upon detecting interference, signal to the UEs in communication with the base station to migrate to a new channel for subsequent transmissions, where the new channel may be selected from the set of available channels. In a second technique for mitigating interference in the low latency communications system, the base station may, upon detecting interference, signal to the UEs in communication with the base station an indication of a frequency hopping pattern. The frequency hopping pattern may configure the UE for one or more frequency hops between one or more channels for subsequent transmissions according to the indicated frequency hopping pattern.

Aspects of the disclosure are initially described in the context of a wireless communications system. Aspects of the disclosure are also illustrated by and described with reference to transmission timelines that relate to interference detection, signaling, and mitigation techniques for low latency transmissions. Aspects of the disclosure are further illustrated by and described with reference to apparatus diagrams, system diagrams, and flowcharts that relate to interference detection, signaling, and mitigation techniques for low latency transmissions.

FIG. 1 illustrates an example of a wireless communications system 100 that supports interference detection, signaling, and mitigation techniques for low latency transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), URLLC, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 and base stations 105 may also use channel state information (CSI) reporting to increase the reliability of communications. For example, a UE 115 may generate and transmit a CSI report to a base station 105, which may modify transmission parameters for subsequent transmissions based on the received CSI report—for example, a base station 105 may use a higher modulation order for subsequent transmissions when a UE 115 indicates good channel conditions, increasing the throughput of subsequent communications.

The CSI report may include multiple feedback components including a CSI-RS resource indicator (CRI), rank indicator (RI), a precoding matrix indicator (PMI) (e.g., PMI-1 and PMI-2), a channel quality indicator (CQI), or some combination of these components. In some cases, the generated CSI report differs based on a transmission time interval (TTI) configuration for communications.

The CRI component may be used to indicate which CSI-RS resource is used for a corresponding RI/PMI/CQI measurements (i.e., which transmission beam of multiple beamformed transmissions is preferred). The RI component may be used to recommend a number of transmission layers (i.e., the rank) for the base station 105 to use in subsequent transmissions based on the signal/interference to noise (SINR) of a previous transmission received at the UE 115. The size of the RI component may be based on the number of transmit layers used by the base station 105.

The PMI component may be used to signal preferred weights to be applied during the precoding process, where the signaled weights may increase the SN ratio of transmissions received at the UE 115. The PMI component may be separated into two sub-components: PMI-1 and PMI-2. PMI-1 may be associated with channel conditions of the full frequency band and/or long-term channel conditions, while PMI-2 may be associated with channel conditions of fixed frequency subbands and/or short-term channel conditions. In some cases, PMI-2 may be reported per fixed frequency subband. Thus, the size of the PMI-2 component may be proportional to the number of fixed frequency subbands within the frequency band used for downlink transmissions to the UE 115. In some cases, only wideband PMI is reported, reducing the size of the PMI component.

The CQI component may be used to signal channel quality information to the base station 105, and the base station 105 may use the information in the CQI component to select a modulation and coding scheme (MCS) for subsequent transmissions. Similar to the PMI-2 components, CQI may be reported per fixed frequency subband. Thus, the size of the CQI component may be proportional to the number of fixed frequency subbands within the frequency band used for downlink transmissions to the UE 115. The CQI component may include multiple indices (e.g., index 0 to index 15) that correspond to particular MCSs.

To determine a CQI index for each frequency subband, the UE 115 may identify a single physical downlink shared channel (PDSCH) transport block (which may be referred to as the CSI reference resource) occupying a group of downlink physical resources blocks. In some cases, the CSI reference resource may be identified relative to an uplink subframe designated for reporting CQI. The UE 115 may determine a combination of a modulation scheme and transport block size for the PDSCH transport block that corresponds to the highest CQI index associated with the PDSCH transport block being received with a transport block error probability that does not exceed 0.1. A modulation scheme and transport block size corresponds to a CQI index if the combination could be signaled from transmission on the PDSCH in the CSI reference resource according to the relevant transport block size table, the modulation scheme is indicated by the CQI index, and the combination of transport block size and modulation scheme when applied to the reference resource results in the effective channel code rate which is the closest possible to the code rate indicated by the CQI index.

In some examples, CQI is based on common references signals (CRS) included in a downlink transmission—e.g., transmission modes (TMs) 1 through 8 may use CRS. In some examples, CQI is based on CSI-RS included in a downlink transmission.

In some examples, the CQI index calculation is a function of the length of the CSI reference resource. In some cases, the CSI reference resource is prohibited from using certain types of subframes, such as multicast-broadcast single-frequency network (MBSFN) subframes, which may not have CRS in the data region.

CSI reporting may be configured either periodically or aperiodically. For periodic CSI reporting, a base station 105 may direct a UE 115 to report CSI according to a specified interval. In some cases, the specified interval is unique in either the time or frequency domain from intervals specified to other UEs 115 within the coverage area. The base station 105 may expect a response from the UE 115 during the specified interval using specified resources and correlate information received during that interval with the scheduled UE 115. That is, the base station 105 may identify a UE 115 based on the time and frequency resources used to convey the CSI report. In some cases, the periodic CSI may be reported using physical uplink control channel (PUCCH) resources.

For aperiodic reporting, a base station 105 may send a trigger to the UE 115 that triggers the UE 115 to report CSI. After receiving the trigger, the UE 115 may transmit the CSI to the base station 105. In some cases, the aperiodic CSI report may be transmitted using physical uplink shared channel (PUSCH) resources, and a base station 105 may receive the CSI report over the scheduled resources.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as (orthogonal frequency-division multiplexing) OFDM or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, rules may be established for using shared or unlicensed radio frequency spectrum, such as FBE regulations. FBE LBT is an LBT protocol for medium access according to ETSI, although other regulatory bodies may have similar rules for such spectrum access. FBE is equipment in which a transmit and/or receive structure is not demand-driven, but may have a fixed timing. That is, FBE may transmit and/or receive according to a fixed frame structure with a periodicity equal to a fixed frame period. Techniques discussed herein describe using a frame structure based on FBE regulations for shared or unlicensed radio frequency spectrum As discussed herein, a low latency communications system may operate in a shared or unlicensed radio frequency spectrum. Transmissions in unlicensed radio frequency spectrum from other devices in the vicinity of a low latency communications system may interfere with communications between devices of the low latency communications system. For example, a UE 115 (alternatively, station (STA)) in the vicinity of the low latency communications system may transmit one or more probe signals to discover a nearby AP so that the UE 115 can connect to a corresponding WLAN to which the AP belongs. As the UE 115 may transmit the probe signals using unlicensed radio frequency spectrum, the probe signals transmissions may interfere with communications between devices of the low latency communications system that may also use unlicensed radio frequency spectrum.

Various techniques discussed herein provide for a base station 105 and/or a UE 115 detecting such interference with communications between the base station 105 and the UE 115. The base station 105 may detect interference by performing an LBT procedure or through an IMR procedure in which the base station 105 may transmit reference signal signals to the UE 115 that the UE 115 may use to return a report to the base station 105 including measured interference. Various techniques discussed herein also provide for the base station 105 inferring a presence of interference, for example, based on ACKs and/or NACKs being received, or not received, respectively, from the target UE 115 or from other UEs 115 in the vicinity. Various techniques discussed herein also provide for maintaining a set of available channels (e.g., whitelisted channels) that may be free from interference and migrating to one or more of the whitelisted channels to mitigate detected or signaled interference.

Figure 2:
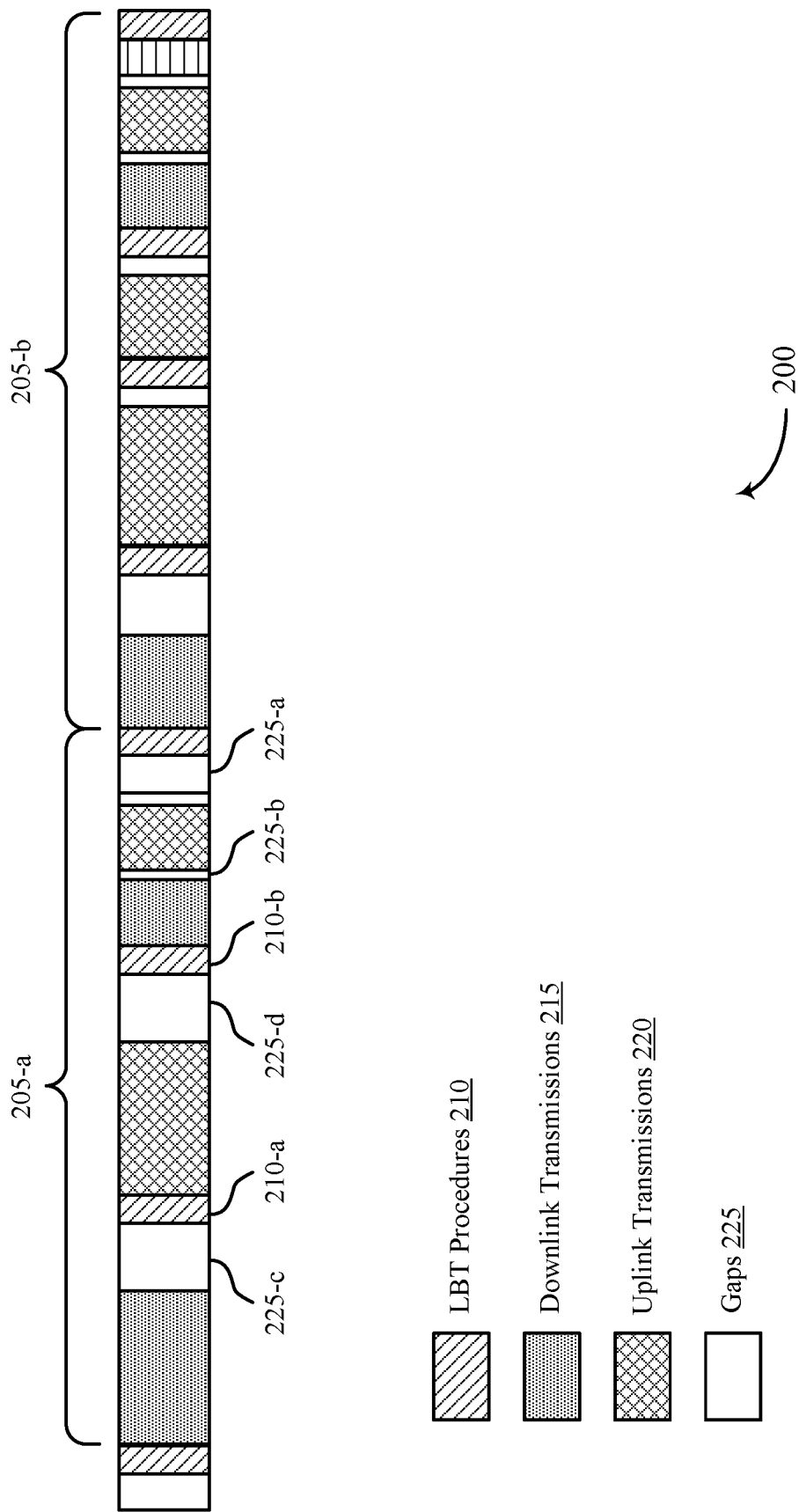
FIG. 2 illustrates an example of a transmission timeline for low latency transmissions in accordance with aspects of the present disclosure.

FIG. 2 illustrates an example of a transmission timeline 200 for low latency transmissions in accordance with aspects of the present disclosure. In some examples, the transmission timeline 200 may implement aspects of the wireless communications system 100 as described with reference to FIG. 1. The transmission timeline 200 illustrates a transmission scheme and frame structure design for low latency transmissions communications in a low latency communications system, which may implement aspects of the wireless communications system 100 as described with reference to FIG. 1. The low latency communications system may include one or more base stations 105 and one or more UEs 115, which may be examples of the corresponding devices as described with reference to FIG. 1.

The transmission timeline 200 illustrates a transmission scheme for low latency communications between an initiating device and a responding device. The initiating device is described herein as a base station 105 and the responding device is described herein as a UE 115. It is to be understood, however, that in some cases the UE 115 may perform the functions of the initiating device and the base station 105 may perform the functions of the responding device. The base station 105 and the UE 115 may be examples of the corresponding devices as described with reference to FIG. 1. The transmission timeline 200 illustrates a frame structure including two frames 205, for example, a first frame 205-a (e.g., a frame N) and a second frame 205-b (e.g., a frame N+1).

The transmission timeline 200 illustrates communications using a frame structure based on, for example, FBE regulations for shared or unlicensed radio frequency spectrum. In some cases, the transmission timeline 200 may describe aspects of a TDD frame structure for the base station 105 to communicate with the UE 115 via shared radio frequency spectrum in which an LBT procedure 210 is performed prior to transmitting downlink transmissions 215 and/or receiving uplink transmissions 220. To perform the LBT procedure 210, the base station 105 may sense an energy level of one or more channels and compare the sensed energy level to an energy level threshold to determine whether the channel is available. The base station 105 may perform the LBT procedure 210 and initiate communications with the UE 115 in response to successfully performing the LBT procedure 210 (i.e., that the sensed channel is available).

In some cases, certain rules may be established for using shared or unlicensed radio frequency spectrum, such as FBE regulations. FBE LBT is an LBT protocol for medium access according to ETSI, although other regulatory bodies may have similar rules for such spectrum access. FBE is equipment in which a transmit and/or receive structure is not demand-driven, but may have a fixed timing. That is, in FBE the base station 105 and UE 115 may transmit and/or receive during the frames 205 according to a fixed frame structure with a periodicity equal to a fixed frame period. As such, the base station 105, operating according to the FBE regulations, may perform the LBT procedure 210 (i.e., a Clear Channel Assessment (CCA)) at the start of each of the frames 205 and, if the LBT procedure clears, initiate communications with the UE 115 up to a maximum channel occupancy time (COT). Otherwise, the whole fixed frame period may be skipped. In some cases, the COT according to FBE LBT may not be greater than 95% of the fixed frame period and shall be followed by an idle period, for example, a gap 225-a, until the start of the next fixed frame period, such that the idle period is at least 5% of the COT, with a minimum of 100 μs.

In some cases, an adaptivity rule may be defined for the LBT procedures 210 within the transmission timeline 200. For example, the adaptivity rule may provide that the base station 105 perform a 9 us LBT procedure 210 at the start of each the frames 205 and initiate communications with the UE 115 if the LBT procedure is successful. If the LBT procedure is not successful, the whole fixed frame period may be skipped. If, however, a gap 225-b between a preceding downlink transmission 215 and a subsequent uplink transmission 220 is less than a certain duration (e.g., 16 us) (the gap 225-b being, e.g., an idle period during which neither the base station 105 nor the UE 115 are transmitting), the UE 115 may transmit the uplink transmission 220 without performing an LBT procedure 210 prior to the transmitting the uplink transmission 220.

In some cases, the UE 115 may perform a one-shot LBT procedure 210-a (e.g., a 25 us LBT procedure) prior to transmitting an uplink transmission 220 if a gap 225-c between a preceding downlink transmission 215 and a following uplink transmission 220 is greater than a certain duration (e.g., 16 us). The UE 115 may perform the one-shot LBT procedure 210-a to recapture the medium from the base station 105, as the base station 105 may have previously obtained authorization to use the medium, for example, via a prior LBT procedure 210. Similarly, if a gap 225-d between a preceding uplink transmission 220 and a following downlink transmission 215 is greater than a certain duration (e.g., 16 us), the base station 105 may perform a one-shot LBT procedure 210-b to reoccupy the frame 205-a (i.e., to regain the medium from the UE 115) following the gap 225-d. These uplink-to-downlink and downlink-to-uplink switches, and/or attempts by the base station 105 or the UE 115 to regain the medium, may occur any number of times over the course of a frame 205 as long as the medium is occupied at the beginning of the frame 205.

As discussed herein, because low latency communications systems operate in unlicensed radio frequency spectrum, transmissions from other devices in unlicensed radio frequency spectrum in the vicinity of a low latency communications system may interfere with communications between devices of the low latency communications system. Various techniques discussed herein may be applied to the frame structure described in FIG. 2, or to modify the described frame structure, to detect, signal the presence of, and mitigate such interference between low latency communications and other transmissions using unlicensed radio frequency spectrum.

Figure 3:
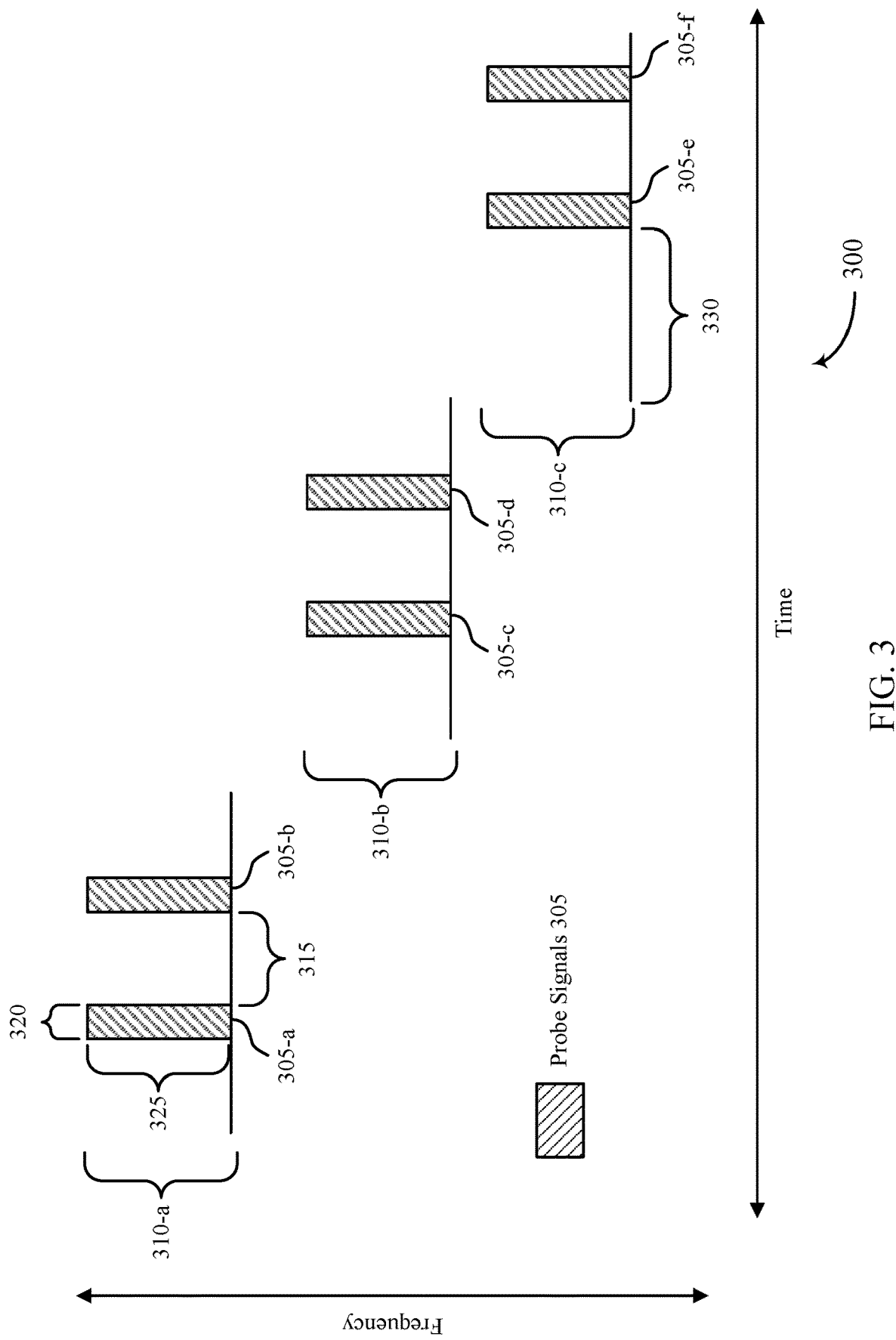
FIG. 3 illustrates an example of a probe signal pattern that may cause interference with low latency communications in accordance with aspects of the present disclosure.

FIG. 3 illustrates an example of a probe signal pattern 300 that may cause interference with low latency communications in accordance with aspects of the present disclosure. In some examples, the probe signal pattern 300 may be an example of a time and frequency resource pattern for communications to or from a device that may interfere with communications between devices of a low latency communications system. In some examples, the low latency communications system contemplated in FIG. 3 may implement aspects of the wireless communications system 100 as described with reference to FIG. 1 and the low latency communications system as described with reference to FIG. 2.

In some cases, a low latency communications system may be used for mission-critical and/or delay-sensitive information. As such, low latency communications may have a relatively strict target error rate (e.g., a target packet error rate of $10^{-5}$ to $10^{-6}$). However, because the low latency communications system operates in unlicensed spectrum, other transmissions to or from devices within a proximity to the low latency communications system but not associated with the low latency communications system may interfere with transmissions between devices of the low latency communications system. For example, a transmission from such an unassociated device using unlicensed spectrum (e.g., using Wi-Fi, or any other communications service or radio access technology (RAT) that may use unlicensed spectrum) may overlap in time and frequency with a transmission between devices of the low latency communications system. Thus, the transmission from the unassociated device may interfere with the potentially mission-critical and/or delay-sensitive information in the low latency transmission which may cause partial or complete errors in the information in the low latency transmission as received.

The low latency communications system may be installed in a controlled environment that seeks to prevent such interference with the low latency communications due to transmissions to and from other such unassociated devices. For example, the low latency communications system may be installed in a controlled factory environment that may exclude unauthorized personnel from accessing the factory, that may include electromagnetic shielding installations to block outside transmissions, etc.

Such a factory environment may also offer, for example, a WLAN (e.g., Wi-Fi) for other communications within the factory environment. The WLAN may include one or more APs that provides wireless connectivity to various wireless devices (e.g., UEs 115, which may alternatively be referred to as STAs) within the factory environment. Each of the devices of the WLAN (e.g., the APs and the UEs) within the factory environment may be configured to send and receive transmissions via the WLAN using a radio frequency bandwidth different than a radio frequency bandwidth at which the low latency communications are sent and received. In this way, communications between devices of the WLAN and do not interfere with communications between devices of the low latency communications system.

In some cases, however, this type of interference may still potentially occur in a controlled environment, even though there may not be any APs near the controlled environment with which a UE 115 or other communications device may communicate. For example, an employee or other person may carry into the factory a UE 115 (e.g., a personal cellular phone belonging to the employee) that is new to the factory environment, or that otherwise may not be previously associated with the factory environment's configured WLAN or the low latency communications system.

Upon entering the factory environment, or after the employee turns on the UE 115 or activates a WLAN module of the UE 115, or the like, the UE 115 may scan one or more radio frequency spectrum bands of unlicensed spectrum to detect the WLAN. For example, the UE 115 may scan a portion of radio frequency spectrum that includes frequency bands traditionally used by Wi-Fi technology, such as the 2.4 GHz band, the 5 GHz band, the 60 GHz band, the 3.6 GHz band, and the 900 MHz band, and/more additional unlicensed spectrum bands, for example, the emerging 6 GHz band.

If the UE 115 detects an AP with which the UE 115 may connect for WLAN communications services, the UE 115 may connect to the AP. If the UE 115 does not detect an AP within a neighborhood of the UE 115 with which the UE 115 may connect for WLAN communications services (i.e., an AP within a sufficient proximity to connect to the UE 115), the UE 115 may broadcast a series of one or more probe signals 305 on one or more channels 310. For example, the UE 115 may broadcast a first probe signal 305-*a* on a first channel 310-*a*, the first channel 310-*a* centered at a first frequency. In some cases, the first channel 310-*a* may be an unlicensed radio frequency spectrum band.

The first probe signal 305-*a* may have a duration 320 in the time domain of 100 to 200 us. In the frequency domain, the first probe signal 305-*a* may span a frequency range 325.

The frequency range 325 may occupy a portion or an entirety of the first channel 310-*a*. For example, the frequency range 325 of the first probe signal 305-*a* may span a channel bandwidth of 20 MHz, 40 MHz, 80 MHz, 160 MHz, etc. In some cases, each of the probe signals 305 may be have the same duration 320 and span the same frequency range 325 as the first probe signal 305-*a*. Alternatively, one or more of the probes signals 305 may be configured with a different duration 320 and/or span a different frequency range 325 than one or more of the other probe signals 305. In some cases, the duration 320 and the frequency range 325 of the probe signals 305 may be based on a device-dependent configuration for the UE 115 and/or capabilities associated with the UE 115.

After broadcasting the first probe signal 305-*a*, the UE 115 may wait for a response from any APs that may have received the first probe signal 305-*a*. That is, the UE 115 may wait for a duration of time defined by an inter-probe spacing 315 (e.g., of 5 to 20 ms) before transmitting a second probe signal 305-*b*, such that APs may have sufficient time to respond to the probe signal 305-*a*. In some cases, the UE 115 may wait after each of the probe signals 305 for the same inter-probe spacing 315 as the first probe signal 305-*a* before transmitting the next probe signal 305. Alternatively, the UE 115 may be configured to wait for a different inter-probe spacing 315 after one of the probe signals 305 than one or more of the other probe signals 305. The inter-probe spacing 315 may be based on a device-dependent configuration for the UE 115 and/or capabilities associated with the UE 115.

In some cases, the UE 115 may receive a probe response from one or more APs in response to one of the transmitted probe signal. In these cases, the UE 115 may associate with one or more of the APs from which the UE 115 received a probe response, and may thereafter maintain communicate and maintain connectivity through the respective one or more APs with which the UE 115 is associated. Alternatively, the UE 115 may not receive a probe response, in which case, after the inter-probe spacing 315, the UE 115 may broadcast the second probe signal 305-*b*. The UE 115 may wait a further time period (e.g., the same inter-probe spacing 315) to monitor for probe responses from APs in response to the second probe signal 305-*b*. If the UE 115 does not receive a probe response in response to the second probe signal 305-*b*, the UE 115 may broadcast a third probe signal 305-*c* on a second channel 310-*b*, the second channel 310-*b* centered at a second frequency. In some cases, the second channel 310-*b* may be an unlicensed radio frequency spectrum band.

In some cases, the second frequency at which the second channel 310-*b* is centered may be a different frequency than the first frequency at which the first channel 310-*a* is centered. In some cases, the first channel 310-*a* and the second channel 310-*b* may occupy non-overlapping sets of frequency resources. As shown in FIG. 3, the UE 115 may broadcast the first probe signal 305-*a* and the second probe signal 305-*b* using the first channel 310-*a*, and switch to the channel 310-*b* for the third probe signal 305-*c*. However, in other examples, the UE 115 may transmit only one probe signal 305 before a switch to a new channel 310, or the UE may continue to transmit any number of probe signal 305 on one channel 310 before a switch to a new channel 310 (including, e.g., transmitting varying numbers of probe signals 305 on each of the different channels 310).

As described similarly for the first channel 310-*a*, the UE 115 may wait a further time period (e.g., the same inter-probe spacing 315) after transmitting the third probe signal 305-*c* to monitor for one or more probe responses from one or more APs in response to the third probe signal 305-c. If the UE 115 does not receive a probe response in response to the third probe signal 305-c, the UE 115 may broadcast a fourth probe signal 305-d, for example, on the second channel 310-b. The UE 115 may wait a further time period (e.g., the same inter-probe spacing 315) to monitor for probe responses from APs in response to the fourth probe signal 305-d.

If the UE 115 does not receive a probe response in response to the fourth probe signal 305-d, the UE 115 may broadcast a fifth probe signal 305-e on a third channel 310-c, the third channel 310-c centered at a third frequency, for example, following a further time period (e.g., the same inter-probe spacing 315) after transmitting the fourth probe signal 305-d. In some cases, the third frequency at which the third channel 310-c is centered may be a different frequency than the first frequency at which the first channel 310-a is centered and/or the second frequency at which the second channel 310-b is centered. In some cases, the first channel 310-a and the second channel 310-b may occupy non-overlapping sets of frequency resources. In some cases, the third channel 310-c may be an unlicensed radio frequency spectrum band. Additionally or alternatively, the UE 115 may wait for an additional wait period 330 before transmitting the fifth probe signal 305-e. In some cases, the UE 115 may wait for an additional wait period 330 before each of the probe signal 305 transmissions after switching to a new channel 310 (i.e., also waiting an additional wait period 330 before the first probe signal 305-a and/or before the second probe signal 305-b).

As described similarly for the first channel 310-a and the second channel 310-b, the UE 115 may wait a further time period (e.g., the same inter-probe spacing 315) after transmitting the fifth probe signal 305-e to monitor for one or more probe responses from one or more APs in response to the fifth probe signal 305-e. If the UE 115 does not receive a probe response in response to the fifth probe signal 305-e, the UE 115 may broadcast a sixth probe signal 305-f, for example, on the third channel 310-c. The UE 115 may wait a further time period (e.g., the same inter-probe spacing 315) to monitor for probe responses from APs in response to the sixth probe signal 305-f.

If the UE 115 does not receive a probe response in response to the sixth probe signal 305-f, the UE 115 may broadcast a further probe signal 305 on a further channel 310 centered at a further frequency (e.g., further unlicensed radio frequency spectrum bands), for example, similarly following a further time period (e.g., the same inter-probe spacing 315) after transmitting the sixth probe signal 305-f. The UE 115 may repeat this process any number of times on same or different channels 310. Additionally or alternatively, after failing to receive a probe response in response to any of the transmitted probe signals 305, the UE 115 may return to a channel 310 on which the UE 115 previously transmitted one of the probe signals 305 (e.g., to the first channel 310-a, or any other channel 310). The UE 115 may be configured to return to a channel 310, for example, after having transmitted a number of probe signals 305 and/or at the expiration of a timer. The number of probe signals 305 and/or the length of the timer may be based on, for example, a device-dependent configuration and/or capabilities associated with the UE 115.

As described herein, the low latency communications system may operate in a shared or unlicensed spectrum. As FIG. 3 shows, a UE 115 that attempts to locate an AP to connect to a WLAN, and that is not already associated with an AP, may transmit several probe signals 305 also using unlicensed spectrum. Thus, if the UE 115 is within a near-enough proximity to the low latency communications system such that transmissions may cause interference, there is a likelihood that some transmissions between devices of the low latency communications system will occupy the same or overlapping time and frequency resources as the probe signals 305 the UE 115 transmits. When this overlap occurs, the probe signals 305 from the UE 115 may interfere with potentially mission-critical and/or delay-sensitive information in transmissions between devices of the wireless communications system. This interference may cause partial or complete errors in the information and/or loss of information in received low latency transmissions. Additionally, the probe signals 305 may interfere an LBT procedure, for example, as may be performed by a base station 105 of the low latency communications system.

As such, even in a controlled environment, one UE 115 being powered or attempting to connect to a WLAN may cause meaningful interference and create meaningful errors for nearby low latency communications. Because a low latency communications system may have a relatively strict target error rate (e.g., a target packet error rate of $10^{-5}$ to $10^{-6}$), the interference and errors may cause the low latency communications system to fail to meet the target error rate. Additionally, other types of communications services and/or other RATs may also transmit use unlicensed spectrum which may cause similar interference with nearby low latency communications systems.

A low latency communications system may also be used in other environments in which ultra-high reliability communications may be desirable. These environments may, in some cases, not effectively prevent non-associated UEs 115 from accessing the environment and similarly causing interference with transmissions of the low latency communications system. For example, low latency communications systems may be used in outdoor environments that are accessible to the general public which may be unlikely to maintain a strictly controlled environment.

Various techniques discussed herein provide for a base station 105 and/or a UE 115 detecting interference associated with communications between the base station 105 and the UE 115. For example, the base station 105 may detect interference by performing an LBT procedure or through an IMR procedure in which the base station 105 may transmit reference signal signals to the UE 115 that the UE 115 may use to return a report on measured interference to the base station 105. Various techniques discussed herein also provide for the base station 105 inferring a presence of interference, for example, based on ACKs and/or NACKs being received, or not received, respectively, from the target UE 115 or from other UEs 115 in the vicinity. The UE 115 may also explicitly indicate to the base station 105 the presence of interference, for example, using UCI. Various techniques discussed herein also provide for maintaining a set of whitelisted channels that may be free from interference and migrating to one or more of the whitelisted channels to mitigate interference.

Figure 4:
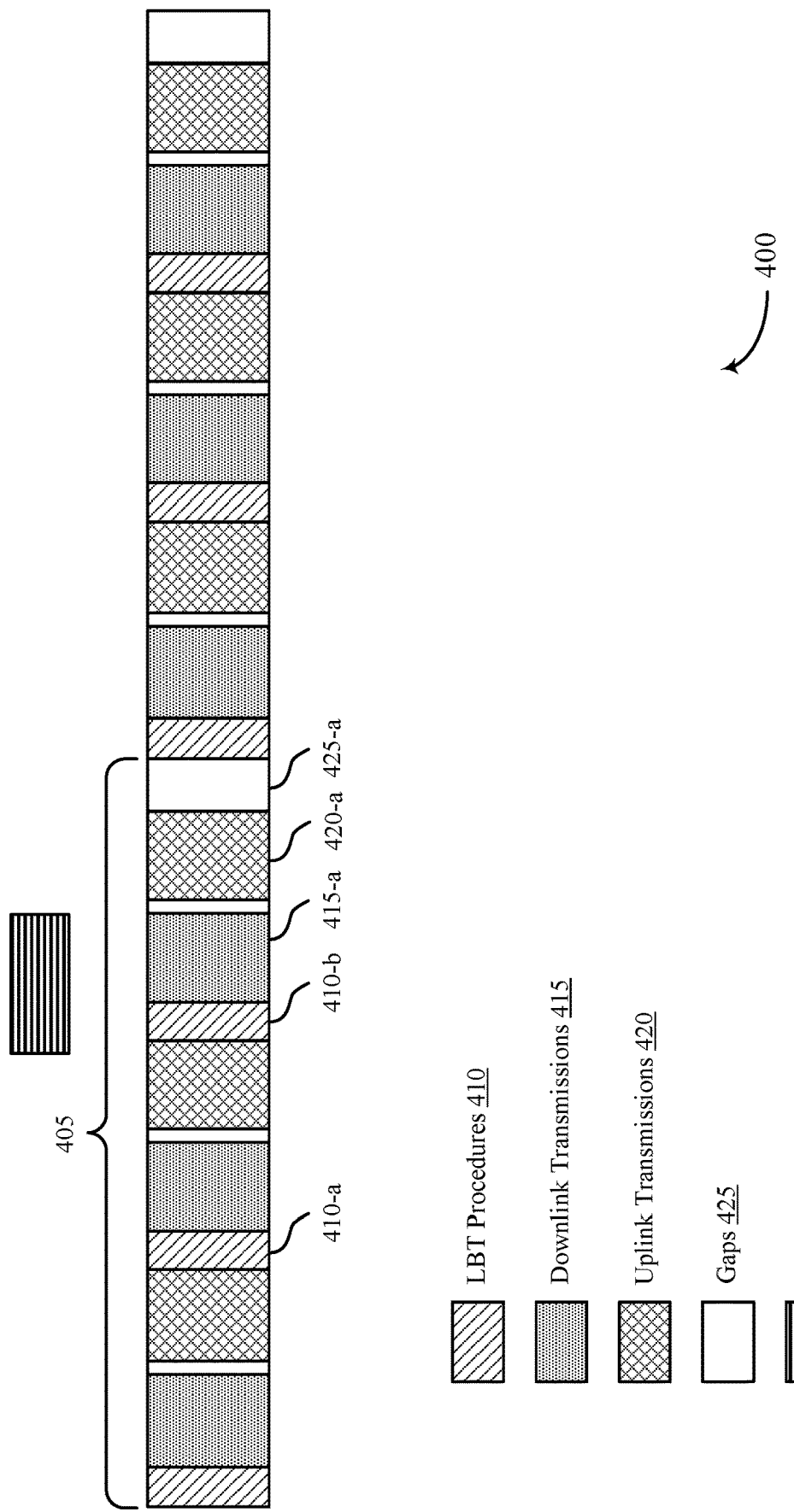
FIGS. 4 through 6 illustrate examples of transmission timelines that support interference detection, signaling, and mitigation techniques for low latency transmissions in accordance with aspects of the present disclosure.

FIG. 4 illustrates an example of a transmission timeline 400 that supports interference detection, signaling, and mitigation techniques for low latency transmissions in accordance with aspects of the present disclosure. In some examples, the transmission timeline 400 may implement aspects of the wireless communications system 100 as described with reference to FIG. 1 and the transmission timeline 200 as described with reference to FIG. 2. The transmission timeline 400 illustrates a transmission scheme and frame structure design for detecting interference with low latency communications in a low latency communications system, which may implement aspects of the wireless communications system 100 as described with reference to FIG. 1. The low latency communications system may include one or more base stations 105 and one or more UEs 115, which may be examples of the corresponding devices as described with reference to FIG. 1. The transmission timeline 400 illustrates a frame structure including one or more frames 405.

The transmission timeline 400 illustrates a transmission scheme for communications using low latency between an initiating device and a responding device in a low latency communications system. The initiating device is described herein as a base station 105 and the responding device is described herein as a UE 115. It is to be understood, however, that in some cases the UE 115 may perform the functions of the initiating device and the base station 105 may perform the functions of the responding device. The base station 105 and the UE 115 may be examples of the corresponding devices as described with reference to FIG. 1.

The transmission timeline 400 illustrates communications using a frame structure that may conform to, for example, FBE regulations for shared or unlicensed radio frequency spectrum. In some cases, the transmission timeline 400 may describe aspects of a TDD frame structure for the base station 105 to communicate with the UE 115 via shared radio frequency spectrum in which an LBT procedure 410 is performed. According to the FBE regulations, the base station 105 and UE 115 may transmit and/or receive during the frames 405 according to a fixed frame structure with a periodicity equal to a fixed frame period. The transmission timeline 400 illustrates time periods for LBT procedures 410, downlink transmissions 415, uplink 420 transmissions, and gaps 425. The transmission timeline 400 also illustrates a block of one or more interfering transmissions 430.

As described herein, the low latency communications system may be installed in a controlled environment that seeks to prevent interference with the low latency communications with transmissions to or from devices within a proximity to the low latency communications system not associated with the low latency communications system. In the controlled environment, such interference from non-associated devices may tend to occur in bursts (i.e., resulting in "bursty" interference). That is, during normal operating conditions such interference may not occur often. However, in the example of a non-associated UE 115 attempting to access a WLAN in the controlled environment, as described with reference to FIG. 2, the UE 115 may transmit several probe signals to attempt to connect with a WLAN, which may result in a burst of interference over a relatively short period of time. Thus, techniques described herein provide for detecting this interference and signaling an indication of the interference to other devices of the low latency communications system within the controlled environment.

In a first technique for detecting interference in low latency communications system, a base station may perform an LBT procedure 410 prior to transmitting downlink transmissions 415 and/or receiving uplink transmission 420. A low latency communications system may switch from uplink to downlink, and vice versa, multiple times during one frame 405. In some cases, using multiple uplink-to-downlink switches may provide for relatively reduced latency because of an improved turnaround time between transmissions versus, for example, one uplink-to-downlink per frame 405. According to the first technique, the base station 105 may perform an LBT procedure 410 before each of the downlink transmissions 415 (e.g., downlink transmission bursts) for each uplink-to-downlink switch. For example, the base station 105 may perform an LBT procedure 410-a for which the base station 105 may not detect any interference, indicating a successful LBT procedure 410.

In some cases, the frame structure may be configured such that a periodicity of the uplink-to-downlink switches is keyed to a duration of a particular type of interference. For example, the periodicity of the uplink-to-downlink switches may be configured such that an LBT procedure 410 before each switch would be likely to detect a known typical duration of the particular type of interference (e.g., a typical duration a UE 115 may probe signals to access a WLAN). In response to successfully performing the LBT procedure 410, the base station 105 may initiate communications with the UE 115 (e.g., by proceeding to the subsequent downlink transmission 415). In some cases, the base station 105 may also perform an LBT procedure 410 at the beginning of the frame 405 before the first downlink transmission 415 of the frame 405. In some cases, the LBT procedures 410 may be one-shot LBT procedures 410, as described with reference to FIG. 2.

In FIG. 4, interfering transmissions 430 are shown as overlapping a portion of the frame 405. The interfering transmissions 430 may include a burst of transmissions from devices that are not associated with the low latency communications system (e.g., a UE 115 broadcasting a series of probe signals to detect and connect to a WLAN, as described with reference to FIG. 3). As similarly described herein, the base station 105 may perform an LBT procedure 410-b. For example, the base station 105 may sense an energy level of one or more channels and compare the sensed energy level to an energy level threshold to determine whether the channel is available. During the LBT procedure 410-b, the base station 105 may detect the interfering transmissions 430 (e.g., based on an energy level measurement exceeding the energy level threshold), in which case the LBT procedure 410-b may be regarded unsuccessful. In cases in which an LBT procedure 410 is not successful, the remainder of the frame 405 may be skipped, or procedures to avoid and/or mitigate interference may be employed, as further described herein.

Additionally or alternatively, in a second technique for detecting interference in low latency communications system, the base station 105 may detect interference using CSI-based IMR. In some cases, by employing CSI-based IMR, the low latency communications system may use shorter and/or less frequent LBT procedures 410, which may relatively reduce signaling overhead.

According to the second technique, the base station 105 may transmit IMR (e.g., zero power (ZP) (CSI-RSs) to the UE 115, for example, in a downlink burst in one or more of the downlink transmissions 415. In some cases, the base station 105 may transmit a configuration to the UE 115 indicating a periodicity at which IMR is to be transmitted to the UE 115. For example, the base station may transmit an IMR configuration to the UE 115 indicating that the base station 105 is to transmit ZP CSI-RSs at a periodicity matching that of the downlink transmissions 415, where the ZP CSI-RSs transmissions may align with the boundaries of the downlink transmissions 415 (e.g., ZP CSI-RS are transmitted every K slots within a downlink burst). That is, the base station 105 may indicate a location of the ZP CSI-RSs in a first downlink transmission 415 along with a periodicity indicating a location of the ZP CSI-RSs in subsequent downlink transmission 415. In some cases, the IMR configuration may indicate that the IMR is to be transmitted semi-persistently, for example, until the base station 105 transmits a trigger to the UE 115 deactivating the semi-persistent scheduled IMR and/or until the expiration of a configured duration. In some cases, the base station 105 may transmit the IMR configuration in downlink control information (DCI). In some cases, the base station 105 may transmit IMR in each downlink transmission 415.

The UE 115 may use the IMR to measure and capture interference information. For example, the base station 105 may puncture one or more downlink transmission 415 with ZP CSI-RSs, where the UE 115 may know that the resource elements of the ZP CSI-RSs were transmitted with zero power. When the UE 115 receives the respective downlink transmissions 415, the UE 115 would know that any detected power on the REs containing the ZP CSI-RSs would be due to interference (e.g., the interfering transmissions 430).

The base station 105 may transmit a trigger for an IMR report (e.g., a CSI report) to the UE 115 (e.g., in DCI) to the UE 115, for example, in a downlink burst in a downlink transmission 415 subsequent to the corresponding IMR that the UE 115 used to measure interference. Upon receiving the trigger for the IMR report, the UE 115 may transmit to the base station 105 the IMR report indicating interference that the UE 115 may have measured using the received IMR.

Illustratively, for example, the base station 105 may transmit ZP CSI-RSs to the UE 115 during a downlink transmission 415-a. Based on a previously received IMR configuration, the UE 115 may know that REs corresponding to the ZP CSI-RSs would have zero power as transmitted by the base station 105. However, because of the interfering transmissions 430, the UE may detect that these REs were received with a non-zero power, and thus the UE 115 may identify that the interference due to the interfering transmissions 430. The UE 115 may then signal this interference to the base station in an IMR report in a subsequent uplink transmission, for example, uplink transmission 420-a.

In some cases, however, the base station 105 may not detect the interference using the first and second techniques for detecting interference in low latency communications system, as described herein. For example, according to the first technique described above, the base station 105 may perform an LBT procedure 410 before the beginning of a downlink transmission 415. However, interference that begins after the beginning of the respective downlink transmission 415, and that has a relatively short duration occurring only in the middle of the downlink transmission 415, may not be detected in the LBT procedure 410. While the periodicity of the uplink-downlink switches may be shortened to detect such short-duration interference, this may increase signaling overheard for performing more LBT procedures 410. Further, in some case, interference may not be visible to the base station 105, for example, due to geological separation (e.g., signal blockage) or because the base station 105 and the UE 115 use different beam patterns making interference relatively more difficult to identify. Techniques are provided herein for these cases in which one or more UEs 115 may provide additional information to the base station 105 that the base station 105 may use to identify interference.

For example, in a third technique for detecting interference in low latency communications systems, the base station 105 may infer interference (e.g., infer the presence of the interfering transmission 430) based on receiving one or more NACKs from one or more additional UEs 115. That is, in addition to the target UE 115 to and from which the base station 105 may be transmitting and receiving respective downlink transmissions 415 and uplink transmission 420 as described herein, the base station 105 may also be communicating with one or more additional UEs 115 within the low latency communications system.

In some cases, the UEs 115 of the low latency communications system may transmit to the base station 105 an ACK indicating that a downlink transmission 415 was correctly received or a NACK indicating that the downlink transmission 415 was not correctly received. In some cases, a target block error rate (BLER) for an initial transmission (e.g., an initial downlink transmission 415) may be relatively low (e.g., a target BLER of $10^{-3}$) with respect to a latency requirement of the system (e.g., $10^{-1}$). Thus, it may be relatively unlikely that multiple UEs 115 would transmit NACKs to the base station 105 for a given slot, absent interference from a device external to the low latency communications system (e.g., a non-associated UE 115). As such, if the base station 105 receives multiple NACKs for one downlink transmission 415, or multiple NACKs for different but downlink transmissions 415 closely spaced in time, the base station 105 may infer the presence of interference (e.g., interference caused by the interfering transmissions 430).

Additionally or alternatively, the base station 105 based on having not received ACKs or NACKs for downlink transmissions 415. For example, the base station 105 may schedule downlink transmissions 415 for one or more UEs 115. However, because of interference, control signaling (e.g., PDCCH) and/or the downlink transmissions 415 may not be received at the respective UEs 115. In this case, the UEs 115 may not be aware of the scheduled downlink transmissions 415, and thus would not respond with a NACK indicating that the transmissions were not correctly received. The base station 105, with the knowledge of having scheduled and transmitted the downlink transmission 415, may recognize that the base station 105 did not receive a ACK or a NACK for the respective transmissions. From this lack of receiving any feedback, the base station may similarly infer the presence of interference. Based on the inferred interference, the base station 105 may, for example, employ procedures to avoid and/or mitigate interference, as further described here.

Additionally or alternatively, in a fourth technique for detecting interference in a low latency communications system, the UE 115 may transmit to the base station 105 an explicit indication of interference, for example, via UCI. According to the fourth technique, the UE 115 may identify interference in communications with the base station 105 (e.g., according to any of the techniques described herein, and/or by detecting that one or more transmissions were not correctly received at the UE 115 or the base station 105) and signal an indication of the interference to the base station 105. For example, the UE 115 may determine a SINR for communications between the UE 115 and the base station 105 and transmit an indication of the determined SINR to the base station 105. Additionally or alternatively, the UE 115 may transmit to the base station 105 an indication of interference (e.g., a 1-bit indication or a multi-bit indication) based on a measured level of interference exceeding a threshold level of interference. In some cases, the indication of interference may be transmitted via one or more extra bits in an ACK or a NACK.

Additionally or alternatively, the UE 115 may transmit to the base station 105 an IMR report (e.g., a CSI report) to report measured levels of interference. The UE 115 may periodically transmit this IMR report at a relatively lower periodicity (e.g., every 1 slot, every 2 slots, etc.). Alternatively, the IMR report may be triggered by signaling in the downlink transmissions 415 (e.g., by signaling included in each downlink transmission 415). In some cases, the UE 115 may signal the indication of interference to the base station 105 by reusing existing codepoints for CQI signaling, and/or by introducing additional codepoints for the CQI signaling. Based on receiving the IMR reports from one or more UEs 115, the base station 105 may identifying interference affecting communications with particular UEs 115 with which the base station is communicating.

The base station 105 and/or the UE 115 may maintain a set of whitelisted channels that may be used if interference is detected. In some cases, the whitelisted channels may be used to avoid long-term interference, for example, due to radar signals. For example, low latency communications systems may be deployed in 5 GHz radio frequency spectrum bands which may also be used by periodic and/or long-term radar signals that may interference with the low latency communications. The base station 105 may search through potential radio frequency spectrum bands to identify channels that are unused and compile the unused channels to maintain the whitelist of clean channels that may be free from interference.

In some cases, the base station 105 and/or the UE 115 may search for clean channels during an idle period of the frame 405. For example, in some cases, as described with reference to FIG. 2, a maximum COT may not be greater than 95% of the fixed frame period and shall be followed by an idle period, for example, a gap 425-$a$, until the start of the next fixed frame period, such that the idle period is at least 5% of the COT (e.g., according to FBE or other regulations). In such cases, the base station 105 may tune to other frequencies (e.g., other radio frequency spectrum bands corresponding to channels not currently being used by the base station 105) during the gap 425-$a$ to sense whether other channels are or clean or are already be used for other communications that may cause interference. After sensing the other channels, the base station 105 may retune to the original frequency at which the base station 105 was communicating with the UE 115 to further communicate with the UE 115.

Additionally or alternatively, the base station 105 may configure transmit to the UE 115 a measurement gap configuration to configure the UE 115 to perform similar interference detection during a measurement gap, where the base station 105 may configure the measurement gap to overlap with the gap 425-$a$. The UE 115 may then similarly tune to other frequencies during the gap 425-$a$ to sense whether other channels are or clean or in-use. The UE 115 may transmit a measurement report to the base station 105 indicating the results of the UE 115 measuring the other channels (i.e., a list of channels that the UE 115 may have sensed to be clean). After sensing the other channels during the measurement gap, the UE 115 may retune to the original frequency at which the UE 115 was communicating with the base station 105 to further communicate with the base station 105.

Figure 5:
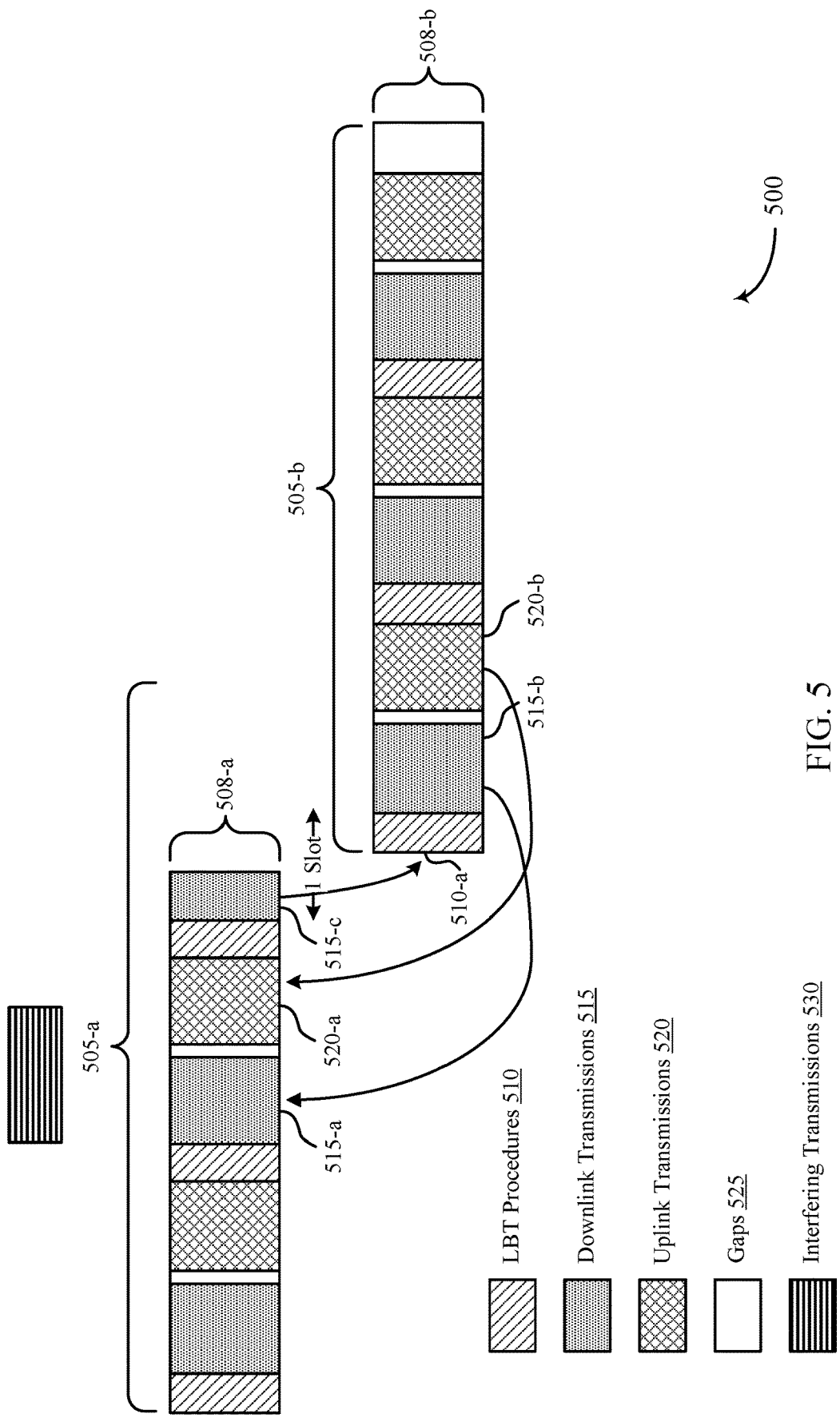

FIG. 5 illustrates an example of a transmission timeline 500 that supports interference detection, signaling, and mitigation techniques for low latency transmissions in accordance with aspects of the present disclosure. In some examples, the transmission timeline 500 may implement aspects of the wireless communications system 100 as described with reference to FIG. 1 and the transmission timeline 200 as described with reference to FIG. 2. The transmission timeline 500 illustrates a transmission scheme and frame structure design for mitigating interference with low latency communications in a low latency communications system, which may implement aspects of the wireless communications system 100 as described with reference to FIG. 1. The low latency communications system may include one or more base stations 105 and one or more UEs 115, which may be examples of the corresponding devices as described with reference to FIG. 1.

The transmission timeline 500 illustrates a transmission scheme for communications using low latency between an initiating device and a responding device in a low latency communications system. The initiating device is described herein as a base station 105 and the responding device is described herein as a UE 115. It is to be understood, however, that in some cases the UE 115 may perform the functions of the initiating device and the base station 105 may perform the functions of the responding device. The base station 105 and the UE 115 may be examples of the corresponding devices as described with reference to FIG. 1.

The transmission timeline 500 illustrates communications using a frame structure that may conform to, for example, FBE regulations for shared or unlicensed radio frequency spectrum. In some cases, the transmission timeline 500 may describe aspects of a TDD frame structure for the base station 105 to communicate with the UE 115 via shared radio frequency spectrum in which an LBT procedure 510 is performed. According to the FBE regulations, the base station 105 and UE 115 may transmit and/or receive during one or more frames 505 according to a fixed frame structure with a periodicity equal to a fixed frame period. The transmission timeline 500 illustrates time periods for LBT procedures 510, downlink transmissions 515, uplink transmission 520, and gaps 525. The transmission timeline 500 also illustrates a block of one or more interfering transmissions 530.

As described herein, the low latency communications system may be installed in a controlled environment that seeks to prevent interference with the low latency communications with transmissions to or from devices within a proximity to the low latency communications system not associated with the low latency communications system. In some cases, a non-associated UE 115 may attempt to access a WLAN in the controlled environment. For example, as described with reference to FIG. 3, the UE 115 may transmit several probe signals to attempt to connect with a WLAN, which may interfere with communications between devices of the low latency communications system. In some cases, this interference may be of a limited bandwidth (e.g., probe signals may only use one particular channel 508 at a given time). That is, once the base station 105 is aware of the interference, the base station 105 may switch from a currently active first channel 508-$a$ to a second channel 508-$b$ at a clean carrier frequency to avoid interference affecting further communications (e.g., retransmissions and/or transmission of further information). In some cases, a low latency communications system may use multiple retransmissions to achieve a target BLER. Accordingly, techniques described herein provide for the low latency communications system mitigating or avoiding this interference within the controlled environment that may reduce a number of retransmissions that may be necessary to communicate the originally transmitted information.

In a first technique for mitigating interference in the low latency communications system, the base station 105 may, upon detecting interference, signal to the UEs 115 in communication with the base station 105 to migrate to a new channel 508 for subsequent transmissions. For example, the base station 105 may initially be communicating with one or more UEs 115 during a first frame 505-$a$, where the first frame 505-$a$ may have a first fixed frame period. As described with reference to FIG. 4, the base station may search through potential radio frequency spectrum bands to identify channels 508 that are unused and compile the unused channels 508 to maintain a whitelist of clean channels 508 that may be free from interference. In some cases, the base station 105 may periodically update the UEs 115 with the whitelist of clean channels 508.

At a time during the first frame 505-*a*, the base station 105 may identify interference with the communications to or from the UEs 115 with which the base station 105 is communicating (e.g., according to the various techniques described herein). For example, as shown in FIG. 5, the interfering transmissions 530 may interference with the downlink transmissions 515-*a* and the uplink transmissions 520-*a*. After the base station 105 transmits the downlink transmissions 515-*a* to the UEs 115, one or more of the of respective UEs 115 may include a NACK in the downlink transmission 520-*a*, indicating that the downlink transmission 515-*a* was not correctly received. From this, the base station 105 may identify the presence of the interfering transmission 530. Based on the identified interference, the base station 105 may determine that the content of the downlink transmission 515-*a* and the uplink transmission 520-*b* may need to be recommunicated, for example, in a downlink transmission 515-*b* and a uplink transmission 520-*b* in a second frame 505-*b*. The base station 105 may accordingly transmit an instruction (e.g., via a group DCI (G-DCI)) in the subsequent downlink transmission 515-*c* to each of the UEs 115 to migrate from the first channel 508-*a* on which the base station 105 is communicating with the UEs 115 to the second channel 508-*b* so that the information may be recommunicated. The base station 105 may select the second channel 508-*b* from the whitelist of clean channels 508 that have been identified as potentially free from interference. The base station 105 may signal the instruction to migrate to the second channel 508-*b* via a G-DCI that may include in the control-resource set (CORESET) information for relatively higher aggregation levels, as higher aggregation levels may be relatively more robust to interference.

The base station 105 may then communicate with one or more of the UEs 115 during the second frame 505-*b*, where the second frame 505-*b* may have a second fixed frame period. In some cases, the second fixed frame period may be offset from the first fixed frame period by a particular duration, for example, 1 slot, as shown in FIG. 5. In some cases, one or more neighboring base stations 105 in the low latency communications system may also be communicating using one more additional channels 508. If the second channel 508-*b* does not overlap with any of the additional channels 508 on which other base stations 105 are communicating, locations of respective LBT procedures 510 in the second frame 505-*b* may be assigned arbitrarily. If, however, the channel 508-*b* overlaps with any of the additional channels 508 on which other base stations 105 are communicating, the locations of respective LBT procedures 510 in the second frame 505-*b* may be assigned such that the LBT procedures 510 coincide with locations for the LBT procedures 510 for the other base stations 105 and/or to not interfere with the communications of the other base stations 105.

To start the second frame 505-*b*, the base station 105 may perform a further LBT procedure 510-*a* to confirm that the second channel 508-*b* is still clear. The base station 105 may also retune for the second channel 508-*b* as necessary during the LBT procedure 510-*a* according to the G-DCI as may have been transmitted in the downlink transmission 515-*c* (as indicated by the arrow between the downlink transmission 515-*c* and the LBT procedure 510-*a* in FIG. 5). Following the LBT procedure 510-*a*, the base station 105 may retransmit the information from the downlink transmission 515-*a* in the downlink transmission 515-*b* (e.g., a retransmission of a PDSCH originally transmitted in the downlink transmission 515-*a* that may have failed due to interference). The UEs 115 may then retransmit the information from the uplink transmission 520-*a* in the uplink transmission 520-*b* (e.g., a retransmission of a PUSCH originally transmitted in the downlink transmission 515-*a* that may have failed due to interference). In FIG. 5, the retransmissions of the PDSCH and the PUSCH information are shown as the arrows between the downlink transmission 515-*b* and the downlink transmission 515-*a* and the uplink transmission 520-*b* and the uplink transmission 520-*a*, respectively.

In some cases, the base station 105 and the respective UEs 115 of the low latency communications system may return to the first channel 508-*a*, for example, following the expiration of a timer. The base station 105 may preconfigure the duration of the timer with the UEs 115 ahead of time or may transmit to the UEs 115 an instruction to switch back to the first channel 508-*a* in a downlink transmission 515 on the second channel 508-*b*. In some cases (e.g., in the case of an adjacent channel switch), the first channel 508-*a* and the second channel 508-*b* may use different bandwidth parts (BWPs). In these cases, the instruction to switch from the first channel 508-*a* to the second channel 508-*b* may further include an instruction to switch from a first BWP to a second BWP. To signal such a BWP switch, the G-DCI may include one or more information fields to indicate the target BWP and related information to facilitate the BWP switch.

Figure 6:
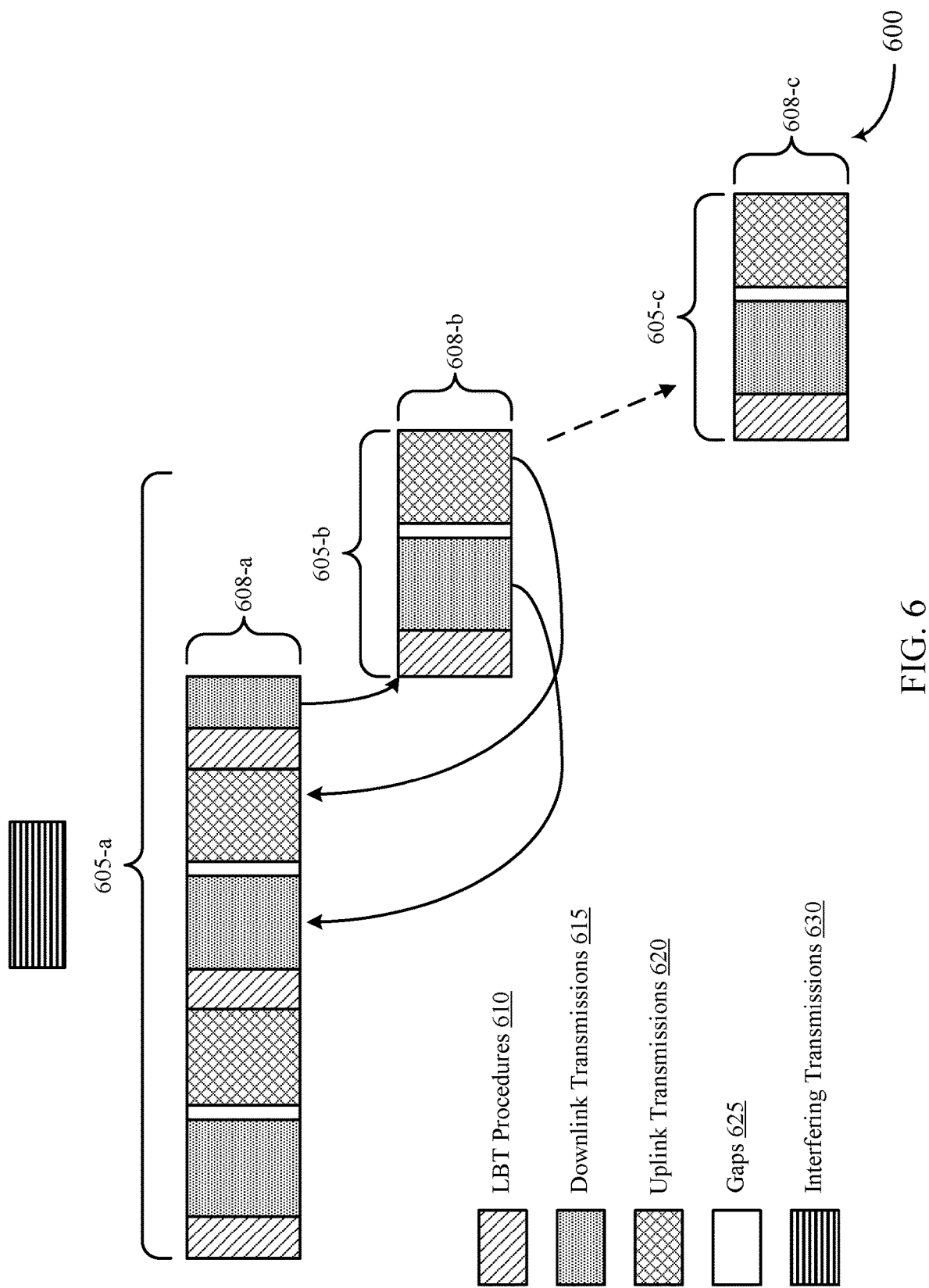

FIG. 6 illustrates an example of a transmission timeline 600 that supports interference detection, signaling, and mitigation techniques for low latency transmissions in accordance with aspects of the present disclosure. In some examples, the transmission timeline 600 may implement aspects of the wireless communications system 100 as described with reference to FIG. 1 and the transmission timeline 200 as described with reference to FIG. 2. The transmission timeline 600 illustrates a transmission scheme and frame structure design for mitigating interference with low latency communications in a low latency communications system, which may implement aspects of the wireless communications system 100 as described with reference to FIG. 1. The low latency communications system may include one or more base stations 105 and one or more UEs 115, which may be examples of the corresponding devices as described with reference to FIG. 1.

The transmission timeline 600 illustrates a transmission scheme for communications using low latency communications between an initiating device and a responding device. The initiating device is described herein as a base station 105 and the responding device is described herein as a UE 115. It is to be understood, however, that in some cases the UE 115 may perform the functions of the initiating device and the base station 105 may perform the functions of the responding device. The base station 105 and the UE 115 may be examples of the corresponding devices as described with reference to FIG. 1.

The transmission timeline 600 illustrates communications using a frame structure that may conform to, for example, FBE regulations for shared or unlicensed radio frequency spectrum. In some cases, the transmission timeline 600 may describe aspects of a TDD frame structure for the base station 105 to communicate with the UE 115 via shared radio frequency spectrum in which an LBT procedure 610 is performed. According to the FBE regulations, the base station 105 and UE 115 may transmit and/or receive during one or more frames 605 according to a fixed frame structure with a periodicity equal to a fixed frame period. In some cases, the fixed frame periods of the frames 605 (e.g., a second frame 605-*b*, a third frame 605-*c*, and so on) may be relatively shortened to reduce a probability of collision with one or more interfering transmissions 630 (e.g., probe signals from a non-associated UE 115). The transmission timeline 600 illustrates time periods for LBT procedures 610, downlink transmissions 615, uplink transmissions 620, and gaps 625. The transmission timeline 600 also illustrates a block of one or more interfering transmissions 630.

As described herein, the low latency communications system may be installed in a controlled environment that seeks to prevent interference with the low latency communications with transmissions to or from devices within a proximity to the low latency communications system not associated with the low latency communications system. In some cases, the non-associated UE 115 may attempt to access a WLAN in the controlled environment. For example, as described with reference to FIG. 3, the UE 115 may transmit several probe signals to attempt to connect with a WLAN, which may interfere with communications between devices of the low latency communications system. As described with reference to FIG. 3, the UE 115 may sequentially transmit the probe signals using multiple channels 608. Thus, after a switch from a first channel 608-*a* to a second channel 608-*b*, the probe signal may again interfere with transmission of the low latency communications system on the second channel 608-*b*. Accordingly, techniques described herein provide for the low latency communications system mitigating or avoiding interference within the controlled environment across multiple channels 608.

In a second technique for mitigating interference in the low latency communications system, the base station 105 may, upon detecting interference, signal to the UEs 115 in communication with the base station 105 an indication of a frequency hopping pattern. The frequency hopping pattern may instruct the UEs 115 to switch between one or more channels 608 for subsequent transmissions using the indicated frequency hopping pattern. For example, the base station 105 may initially be communicating with one or more UEs 115 during a first frame 605-*a*, where the first frame 605-*a* may have a first fixed frame period. As described with reference to FIGS. 4 and 5, the base station may search through potential radio frequency spectrum bands to identify channels 608 that are unused and compile the unused channels 608 to maintain a whitelist of clean channels 608 that may be free from interference.

At a time during the first frame 605-*a*, the base station 105 may identify interference with the communications to or from the UEs 115 with which the base station 105 is communicating (e.g., according to the various techniques described herein). For example, as shown in FIG. 6, the interfering transmissions 630 may interference with the downlink transmissions 615-*a* and the uplink transmissions 620-*a*. After the base station 105 transmits the downlink transmissions 615-*a* to the UEs 115, one or more of the of respective UEs 115 may include a NACK in the uplink transmission 620-*a*, indicating that the downlink transmission 615-*a* was not correctly received. From this, the base station 105 may identify the presence of the interfering transmission 630.

The base station 105 may transmit an indication of a frequency hopping pattern (e.g., via a G-DCI) in the downlink transmission 615-*c* to each of the UEs 115 to migrate from the first channel 608-*a* to the second channel 608-*b*, to a third channel 608-*c*, and so on, according to the frequency hopping pattern so that the information may be recommunicated and subsequent transmissions do not interfere with subsequent probe signals (or, e.g., other interfering transmission 630 that may also change frequencies). The frequency hopping pattern may indicate channels 608 selected from the whitelist of clean channels 608 that have been identified as potentially free from interference. In some cases, the frequency hopping pattern may be a random frequency hopping pattern or a pseudo-random frequency hopping pattern.

The base station 105 may communicate with one or more of the UEs 115 during the second frame 605-*b*, where the second frame 605-*b* may have a second fixed frame period. In some cases, the second fixed frame period may be offset from the first fixed frame period by a particular duration, for example, 1 slot, as similarly described with reference to FIG. 5. To start the second frame 605-*b*, the base station 105 may perform a further LBT procedure 610-*a* to confirm that the second channel 608-*b* is still clear. The base station 105 may also retune for the second channel 608-*b* as necessary during the LBT procedure 610-*a* according to the G-DCI as may have been transmitted in the downlink transmission 615-*c* (as indicated by the arrow between the downlink transmission 615-*c* and the LBT procedure 610-*a* in FIG. 6). Following the LBT procedure 610-*a*, the base station 105 may retransmit the information from the downlink transmission 615-*a* in the downlink transmission 615-*b* (e.g., a retransmission of a PDSCH originally transmitted in the downlink transmission 615-*a* that may have failed due to interference). The UEs 115 may then retransmit the information from the uplink transmission 620-*a* in the uplink transmission 620-*b* (e.g., a retransmission of a PUSCH originally transmitted in the downlink transmission 615-*a* that may have failed due to interference). In FIG. 6, the retransmissions of the PDSCH and the PUSCH information are shown as the arrows between the downlink transmission 615-*b* and the downlink transmission 615-*a* and the uplink transmission 620-*b* and the uplink transmission 620-*a*, respectively.

Following the uplink transmission 620-*b* on the second channel 608-*b*, the base station 105 and the UE 115 may migrate from the second channel 608-*b* to the third channel 608-*c* according to the frequency hopping pattern. The base station 105 may then communicate with the one or more of the UEs 115 during the third frame 605-*c*, where the third frame 605-*c* may have a third fixed frame period. In some cases, the third fixed frame period may be offset from the first fixed frame period by a particular duration, for example, 1 slot, as similarly described above.

To start the third frame 605-*c*, the base station 105 may again perform a LBT procedure 610-*c* to confirm that the third channel 608-*c* is clear. The base station 105 may also retune for the third channel 608-*c* as necessary during the LBT procedure 610-*c* according to the G-DCI as may have been transmitted in the downlink transmission 615-*c* during the first frame 605-*a*. Following the LBT procedure 610-*c*, the base station 105 may transmit a further downlink transmission 615-*d* and the UEs 115 may transmit a further uplink transmission 620-*c*. The base station 105 and the UEs 115 may continue to transmit subsequent downlink transmissions 615 and uplink transmissions 620 on further channels 608.

In some cases, the base station 105 and the respective UEs 115 of the low latency communications system may return to the first channel 608-*a*, for example, following the expiration of a timer. As similarly described with reference to FIG. 5, the base station 105 may preconfigure the duration of the timer with the UEs 115 ahead of time or may transmit to the UEs 115 an instruction to switch back to the first channel 608-a in a downlink transmission 615 on the second channel 608-b, the third channel 608-c, or a subsequent channel 608. In some cases, each of the first channel 608-a, the second channel 608-b, the third channel 608-c, and any subsequent channels 608 may use different BWPs. In these cases, the frequency hopping pattern may include instructions to switch between multiple different BWPs.

Figure 7:
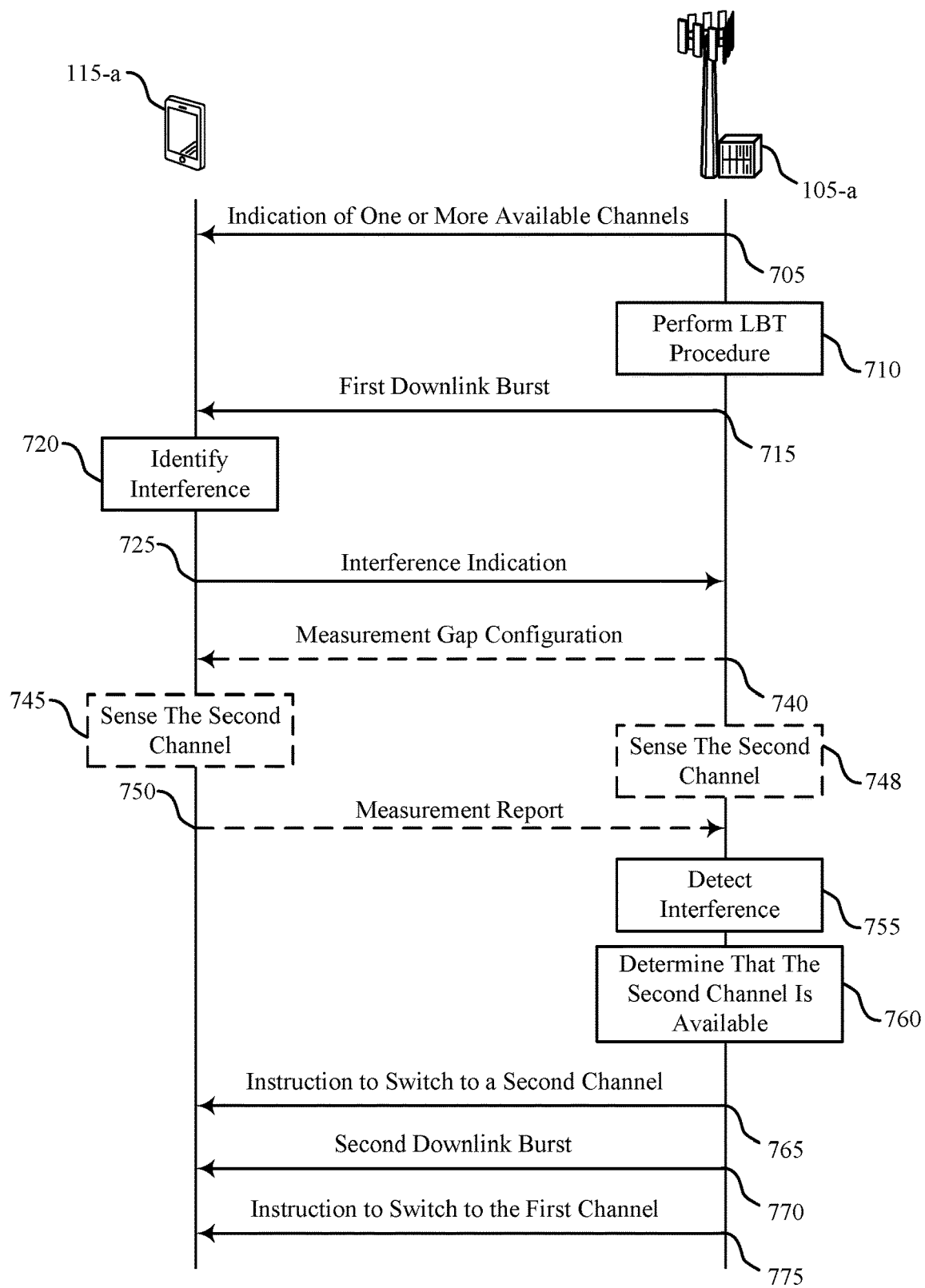
FIG. 7 illustrates an example of a process flow that supports interference detection, signaling, and mitigation techniques for low latency transmissions in accordance with aspects of the present disclosure.

FIG. 7 illustrates an example of a process flow 700 that supports interference detection, signaling, and mitigation techniques for low latency transmissions in accordance with aspects of the present disclosure. In some examples, the process flow 700 may implement aspects of wireless communications system 100. For example, the process flow 700 includes a UE 115-a and base station 105-a that may be examples of the corresponding devices described with reference to FIG. 1. The process flow may illustrate an example of the UE 115-a and the base station 105-a detecting, signaling, and mitigating interference from interfering transmissions, for example, a sequence of probe signals.

At 705, the base station 105-a may transmit to the UE 115-a, and the UE 115-a may receive from the base station 105-a, an indication of a set of one or more available channels (e.g., a set of whitelisted channels). In some cases, the base station 105-a and/or the UE 115-a may search through potential radio frequency spectrum bands to identify channels that are unused and may have compiled the unused channels 608 to maintain a list of the set of the available channels that may be free from interference.

At 710, the base station 105-a may perform a LBT procedure prior to transmitting a first downlink burst (e.g., at 715). In some cases, the LBT procedure may be a one-shot LBT procedure (e.g., a 25 us LBT procedure).

At 715, the base station 105-a may transmit to the UE 115-a, and the UE 115-a may receive from the base station 105-a, a first downlink burst using a first channel and a first frame period. In some cases, the first downlink burst may include IMR. In some cases, the IMR may include a ZP CSI-RS.

In some cases, the first downlink burst may include DCI, where the DCI may include a trigger for an IMR report. In some cases, the first downlink burst may include an IMR configuration, where the IMR configuration may indicate that IMR is to be transmitted semi-persistently at a periodicity within the first downlink burst.

At 720, the UE 115-a may identify interference associated with the first downlink burst. In some cases, the UE 115-a may determine that at least a portion of the first downlink burst was not successfully received. In some cases, the UE 115-a may determine a SINR based on the first downlink burst.

The UE 115-a may further generate one or more IMR reports in response to the trigger for the IMR report, as may have been received in the first downlink burst at 715. The IMR reports may indicate an amount of interference measured using the received IMR. In some cases, the IMR report may include a CSI report. In some cases, generating the IMR reports may be based on the IMR configuration as may have been received in the first downlink burst at 715. The IMR reports may indicate respective amounts of interference measured using the received IMR, as may have also been received in the first downlink burst at 715.

At 725, the UE 115-a may transmit to the base station 105-a, and the base station 105-a may receive from the UE 115-a, an interference indication, where the interference indication may be based on the interference, as may have been identified at 720. In some cases, the UE 115-a may transmit to the base station 105-a, and the base station 105-a may receive from the UE 115-a, UCI, where the UCI may include the interference indication. In some cases, the interference indication may include an indication of the SINR, as may have been determined at 720.

In some cases, the UE 115-a may transmit to the base station 105-a, and the base station 105-a may receive from the UE 115-a, a NACK based on determining that the at least the portion of the first downlink burst was not successfully received. Additionally or alternatively, the UE 115-a may transmit to the base station 105-a, and the base station 105-a may receive from the UE 115-a, an ACK or a NACK, where the ACK or the NACK includes the interference indication. In some cases, the base station 105-a may receive one or more NACKs from one or more further UEs 115

In some cases, the UE 115-a may further transmit to the base station 105-a, and the base station 105-a may receive from the UE 115-a, one or more IMR reports, as the UE 115-a may have generated at 720. In some cases, the IMR reports may be, or be included in, the interference indication.

At 740, the base station 105-a may optionally transmit to the UE 115-a, and the UE 115-a may receive from the base station 105-a, a measurement gap configuration to configure the UE to perform interference detection during a measurement gap, where the measurement gap may at least partially overlap with an idle period of the first frame period.

At 745, the UE 115-a may optionally sense the second channel during the measurement gap, for example, based at least in part on the measurement gap configuration, to generate a measurement report.

At 748, the base station 105-a may optionally sense the second channel during an idle period of the first frame period.

At 750, the UE 115-a may optionally transmit to the base station 105-a, and the base station 105-a may receive from the UE 115-a, a measurement report, where the measurement report may indicate whether the second channel is available based on sensing the second channel at 745.

At 755, the base station 105-a may detect interference associated with the first downlink burst. In some cases, detecting the interference may be based on the interference indication, as may have been received at 725. In some cases, detecting the interference may be based on the LBT procedure that the base station 105-a may have performed at 710. In some cases, detecting the interference may be based on the IMR reports, as may have been received at 735. In some cases, detecting the interference may be based on the SINR, as may have been received at 725, exceeding a SINR threshold.

In some cases, the base station 105-a may determine that an ACK or a NACK not received from the UE in response to transmitting a downlink transmission to the UE (e.g., the first downlink burst at 715), where detecting the interference is based on determining that the ACK was not received. In some cases, the base station 105-a may determine that a number of received NACKs at 725 satisfies a threshold value, where detecting the interference is based on the number of received NACKs satisfying the threshold value.

At 760, the base station 105-a may determine, during the first frame period, that the second channel is available, where the set of one or more available channels may include the second channel. In some cases, determining that the second channel is available may be based on sensing the second channel during an idle period of the first frame period at 748. In some cases, determining that the second channel is available may be based on the measurement report, as may have been received at 750.

At 765, the base station 105-*a* may transmit to the UE 115-*a*, and the UE 115-*a* may receive from the base station 105-*a*, an instruction to switch to a second channel and a second frame period, where the second channel may be selected from the set of one or more available channels. In some cases, the base station 105-*a* may transmit instruction to switch to the second channel based on in the interference as the base station 105-*a* may have detected at 755. In some cases, the base station 105-*a* may transmit the DCI to one or more UEs 115 with which the base station 105-*a* is also associated, where the DCI may include the instruction to switch to the second channel. In some cases, DCI may include the instruction to switch to the second channel. In some cases, the second frame period may be offset from the first frame period by one slot. In some cases, the instruction to switch to the second channel include an instruction to switch from a first BWP to a second BWP.

In some cases, the base station 105-*a* may transmit to the UE 115-*a*, and the UE 115-*a* may receive from the base station 105-*a*, an indication of a frequency hopping pattern, where the frequency hopping pattern may include an instruction to switch between a plurality of additional channels and a plurality of additional frame periods. In some cases, each of the plurality of additional channels selected from the set of one or more available channels. In some cases, the frequency hopping pattern may include a random frequency hopping pattern or a pseudo-random frequency hopping pattern.

At 770, the base station 105-*a* may transmit to the UE 115-*a*, and the UE 115-*a* may receive from the base station 105-*a*, a second downlink burst from the base station using the second channel and the second frame period based on the instruction to switch to the second channel as may have been transmitted at 765. In some cases, the second downlink burst includes a retransmission of at least a portion of the data of the first downlink burst.

At 775, the base station 105-*a* may transmit to the UE 115-*a*, and the UE 115-*a* may receive from the base station 105-*a*, an instruction to switch to the first channel upon an expiration of a timer.

Figure 8:
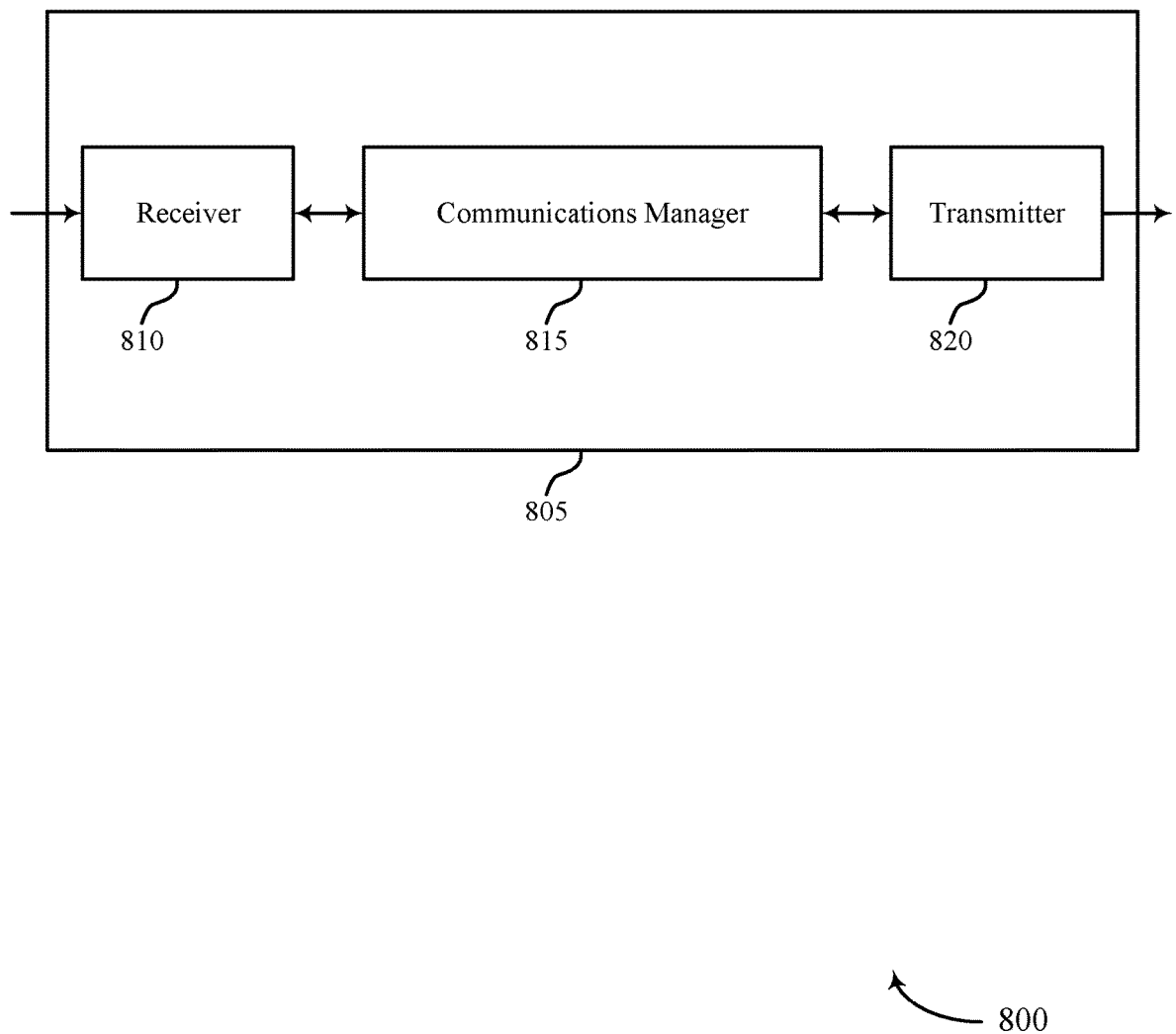
FIGS. 8 and 9 show block diagrams of devices that support interference detection, signaling, and mitigation techniques for low latency transmissions in accordance with aspects of the present disclosure.

FIG. 8 shows a block diagram 800 of a device 805 that supports interference detection, signaling, and mitigation techniques for low latency transmissions in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to interference detection, signaling, and mitigation techniques for low latency transmissions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive an indication of a set of one or more available channels from a base station, receive a first downlink burst from a base station using a first channel and a first frame period, receive, based on the instruction, a second downlink burst from the base station using the second channel and the second frame period, and receive from the base station an instruction to switch to a second channel and a second frame period, the second channel selected from the set of one or more available channels. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal process (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 815 as described herein may be implemented to realize one or more potential advantages discussed herein. One implementation may allow the device 805 to identify interference in a wireless communications system requiring a relatively high reliability (e.g., for ultra-high reliability communications). According to the techniques provided herein, the device 805 may switch between available channels to mitigate the effect of the identified interference. As such, the techniques described herein may provide reliability enhancements by way of improved interference identification and mitigation.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
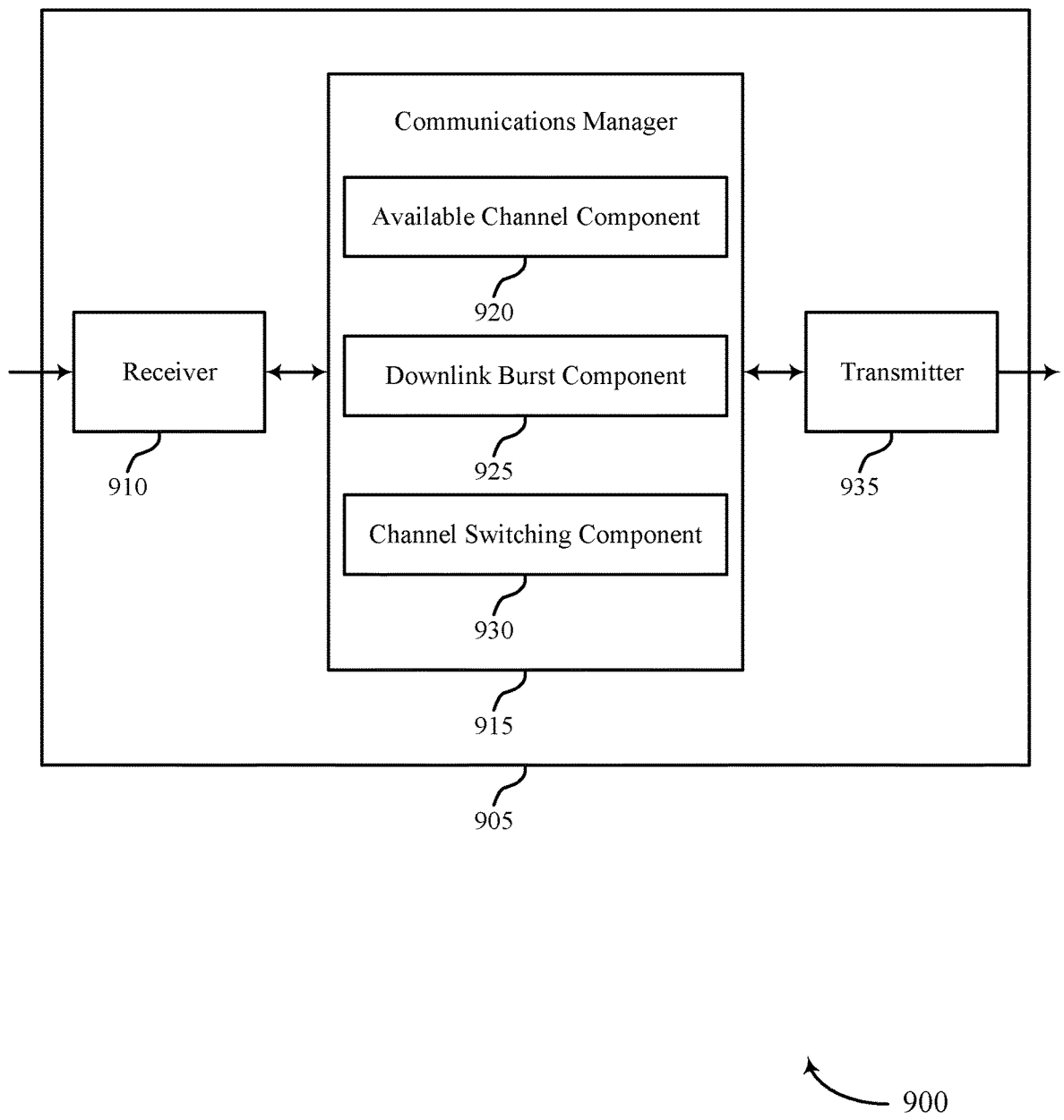

FIG. 9 shows a block diagram 900 of a device 905 that supports interference detection, signaling, and mitigation techniques for low latency transmissions in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to interference detection, signaling, and mitigation techniques for low latency transmissions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an available channel component 920, a downlink burst component 925, and a channel switching component 930. The communications manager 915 may be an example of aspects of the communications manager 1110 described herein.

The available channel component 920 may receive an indication of a set of one or more available channels from a base station.

The downlink burst component 925 may receive a first downlink burst from a base station using a first channel and a first frame period and receive, based on the instruction, a second downlink burst from the base station using the second channel and the second frame period.

The channel switching component 930 may receive from the base station an instruction to switch to a second channel and a second frame period, the second channel selected from the set of one or more available channels.

In some implementations, the actions performed by the available channel component 920, the downlink burst component 925, and the channel switching component 930, as described herein, may facilitate the processor 1140, as described with reference to FIG. 10, to more efficiently cause the device 905 to perform various functions. For example, the device 905 may detect or receive signaling indicating interference in an environment requiring a relatively high reliability (e.g., for ultra-high reliability communications). In the case of such interference, the device 905 may switch between available channels to mitigate the effect of the identified interference. As such, the techniques described herein may provide reliability enhancements by way of improved interference identification and mitigation. These reliability improvements may reduce the need for repeated transmissions by way of less collisions with interfering transmissions, which may correspondingly conserve spectral resources through a reduced number of transmissions, and reduce a number of processing operations at the processor of the device 905. This may in turn provide power savings and conserve processing resources for the processor of the device 905.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
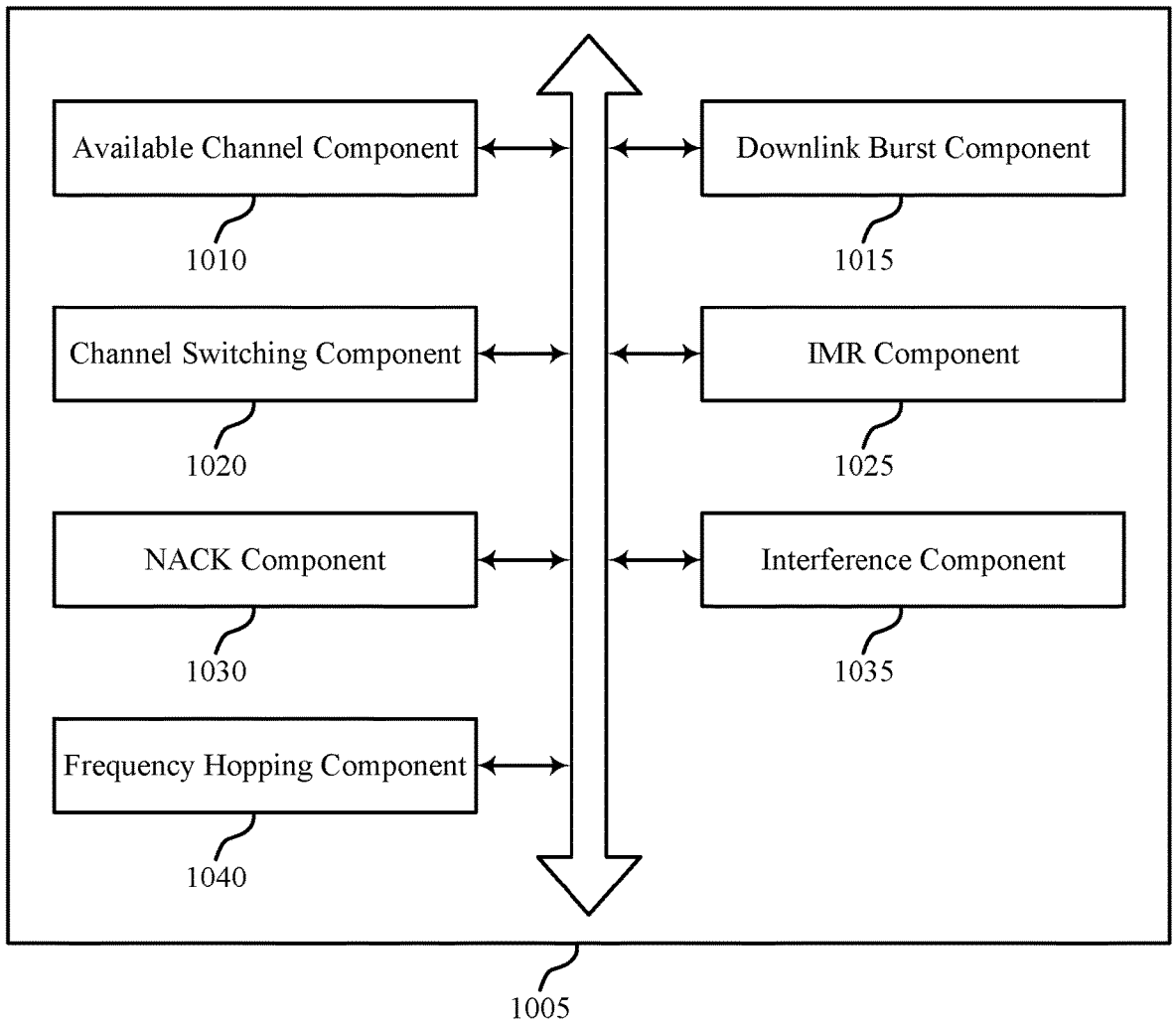
FIG. 10 shows a block diagram of a communications manager that supports interference detection, signaling, and mitigation techniques for low latency transmissions in accordance with aspects of the present disclosure.

FIG. 10 shows a block diagram 1000 of a communications manager 1005 that supports interference detection, signaling, and mitigation techniques for low latency transmissions in accordance with aspects of the present disclosure. The communications manager 1005 may be an example of aspects of a communications manager 815, a communications manager 915, or a communications manager 1110 described herein. The communications manager 1005 may include an available channel component 1010, a downlink burst component 1015, a channel switching component 1020, an IMR component 1025, a NACK component 1030, an interference component 1035, and a frequency hopping component 1040. Each of these modules may communicate, directly or indirectly, with one another (e.g., via one or more buses).

The available channel component 1010 may receive an indication of a set of one or more available channels from a base station. In some examples, the set of one or more available channels may include one or more whitelisted channels.

The downlink burst component 1015 may receive a first downlink burst from a base station using a first channel and a first frame period. In some examples, the downlink burst component 1015 may receive, based on the instruction, a second downlink burst from the base station using the second channel and the second frame period. In some examples, the downlink burst component 1015 may determine that at least a portion of the first downlink burst was not successfully received. In some cases, the second downlink burst includes a retransmission of at least a portion of the data of the first downlink burst.

The channel switching component 1020 may receive from the base station an instruction to switch to a second channel and a second frame period, the second channel selected from the set of one or more available channels. In some examples, the channel switching component 1020 may receive DCI from the base station, the DCI including the instruction to switch to the second channel. In some examples, the channel switching component 1020 may receive from the base station an instruction to switch to the first channel upon an expiration of a timer. In some cases, the second frame period is offset from the first frame period by one slot. In some cases, the instruction to switch to the second channel includes an instruction to switch from a first BWP to a second BWP.

The IMR component 1025 may receive IMR from the base station, the first downlink burst including the IMR. In some examples, the IMR component 1025 may receive DCI from the base station, the DCI including a trigger for an IMR report, and the first downlink burst including the DCI. In some examples, the IMR component 1025 may generate the IMR report in response to the trigger, the IMR report indicating an amount of interference measured using the received IMR. In some examples, the IMR component 1025 may transmit the IMR report to the base station. In some examples, the IMR component 1025 may receive an IMR configuration from the base station, the IMR configuration indicating that IMR is to be transmitted semi-persistently at a periodicity within the first downlink burst, and the first downlink burst including the IMR configuration. In some examples, the IMR component 1025 may generate one or more IMR reports at the periodicity within the first downlink burst based on the IMR configuration, each of the one or more IMR reports indicating respective amounts of interference measured using the received IMR. In some examples, the IMR component 1025 may transmit the one or more IMR reports to the base station. In some cases, the IMR includes a ZP CSI-RS, and the IMR report includes a CSI report.

The NACK component 1030 may transmit a NACK to the base station based on determining that the at least the portion of the first downlink burst was not successfully received. In some examples, the NACK component 1030 may transmit an ACK or a NACK, the transmitted ACK or the transmitted NACK including the interference indication.

The interference component 1035 may identify interference associated with the first downlink burst. In some examples, the interference component 1035 may transmit an interference indication to the base station, the interference indication based on the identified interference. In some examples, the interference component 1035 may transmit UCI to the base station, the UCI including the interference indication. In some examples, the interference component 1035 may determine a SINR based on the first downlink burst, the interference indication including an indication of the SINR. In some examples, the interference component 1035 may receive, from the base station, a measurement gap configuration to configure the UE to perform interference detection during a measurement gap, where the measurement gap at least partially overlaps with an idle period of the first frame period. In some examples, the interference component 1035 may sense the second channel during the measurement gap based on the measurement gap configuration to generate a measurement report. In some examples, the interference component 1035 may transmit the measurement report to the base station indicating whether the second channel is available based on sensing the second channel.

The frequency hopping component 1040 may receive from the base station an indication of a frequency hopping pattern, the frequency hopping pattern including an instruction to switch between a set of additional channels and a set of additional frame periods, each of the set of additional channels selected from the set of one or more available channels.

In some cases, the frequency hopping pattern includes a random frequency hopping pattern or a pseudo-random frequency hopping pattern.

Figure 11:
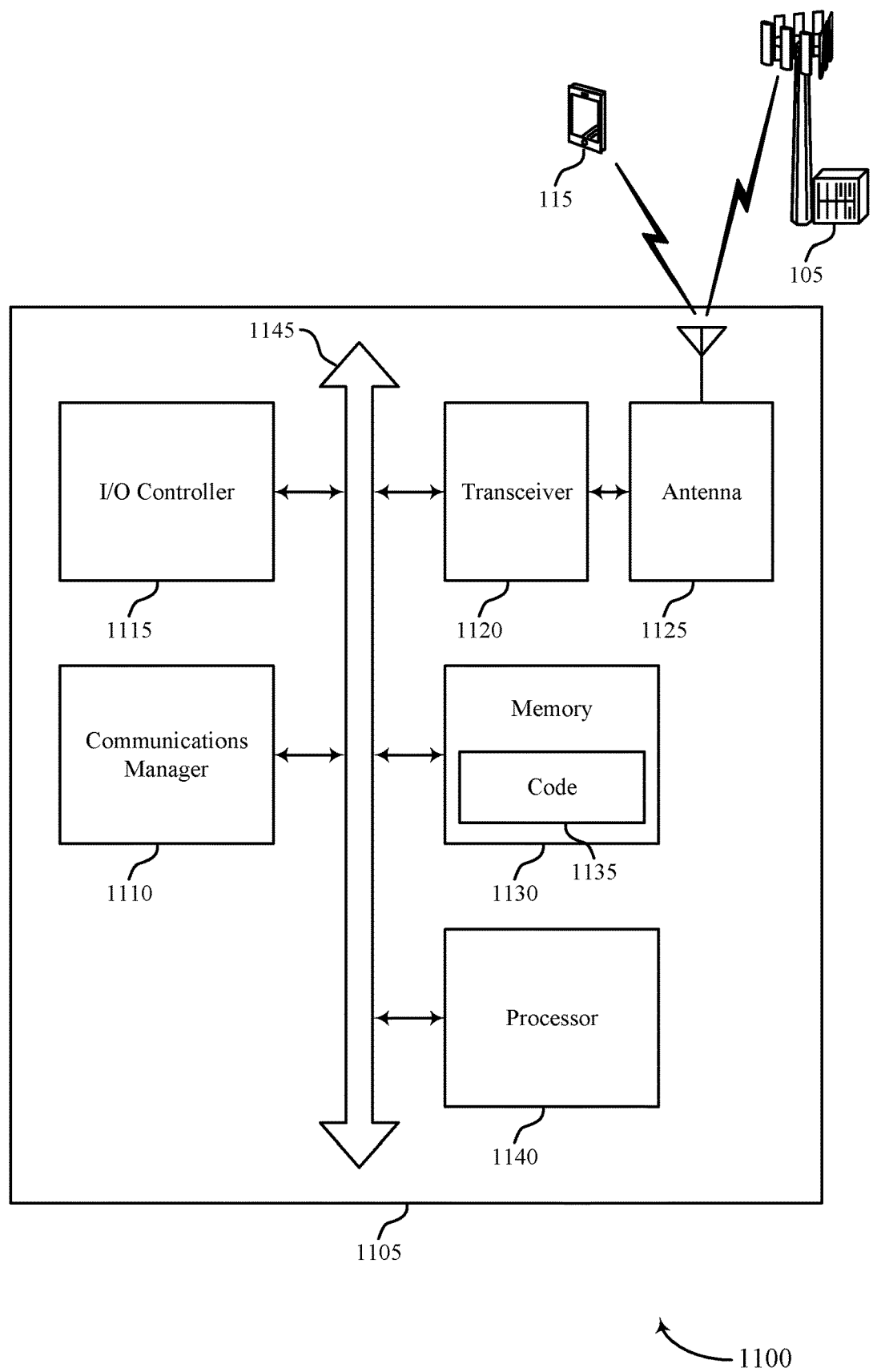
FIG. 11 shows a diagram of a system including a device that supports interference detection, signaling, and mitigation techniques for low latency transmissions in accordance with aspects of the present disclosure.

FIG. 11 shows a diagram of a system 1100 including a device 1105 that supports interference detection, signaling, and mitigation techniques for low latency transmissions in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive an indication of a set of one or more available channels from a base station, receive a first downlink burst from a base station using a first channel and a first frame period, receive, based on the instruction, a second downlink burst from the base station using the second channel and the second frame period, and receive from the base station an instruction to switch to a second channel and a second frame period, the second channel selected from the set of one or more available channels.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting interference detection, signaling, and mitigation techniques for low latency transmissions).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
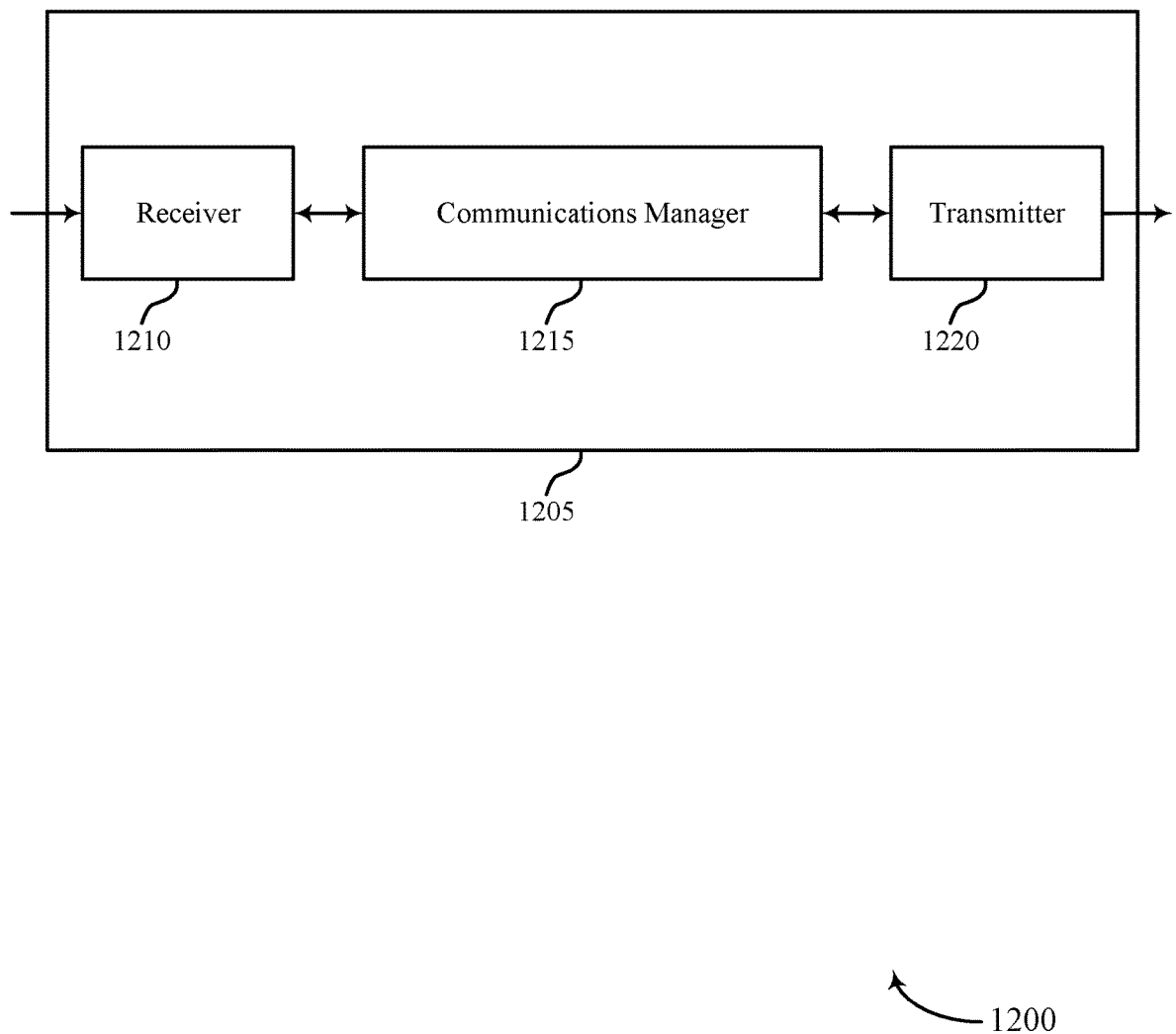
FIGS. 12 and 13 show block diagrams of devices that support interference detection, signaling, and mitigation techniques for low latency transmissions in accordance with aspects of the present disclosure.

FIG. 12 shows a block diagram 1200 of a device 1205 that supports interference detection, signaling, and mitigation techniques for low latency transmissions in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to interference detection, signaling, and mitigation techniques for low latency transmissions, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit an indication of a set of one or more available channels to a UE, detect interference associated with a first downlink burst between the base station and the UE, the first downlink burst using a first channel and a first frame period, transmit to the UE, based on the detected interference, an instruction to switch to a second channel and a second frame period, the second channel selected from the set of one or more available channels, and transmit, based on the instruction, a second downlink burst to the UE using the second channel and the second frame period. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
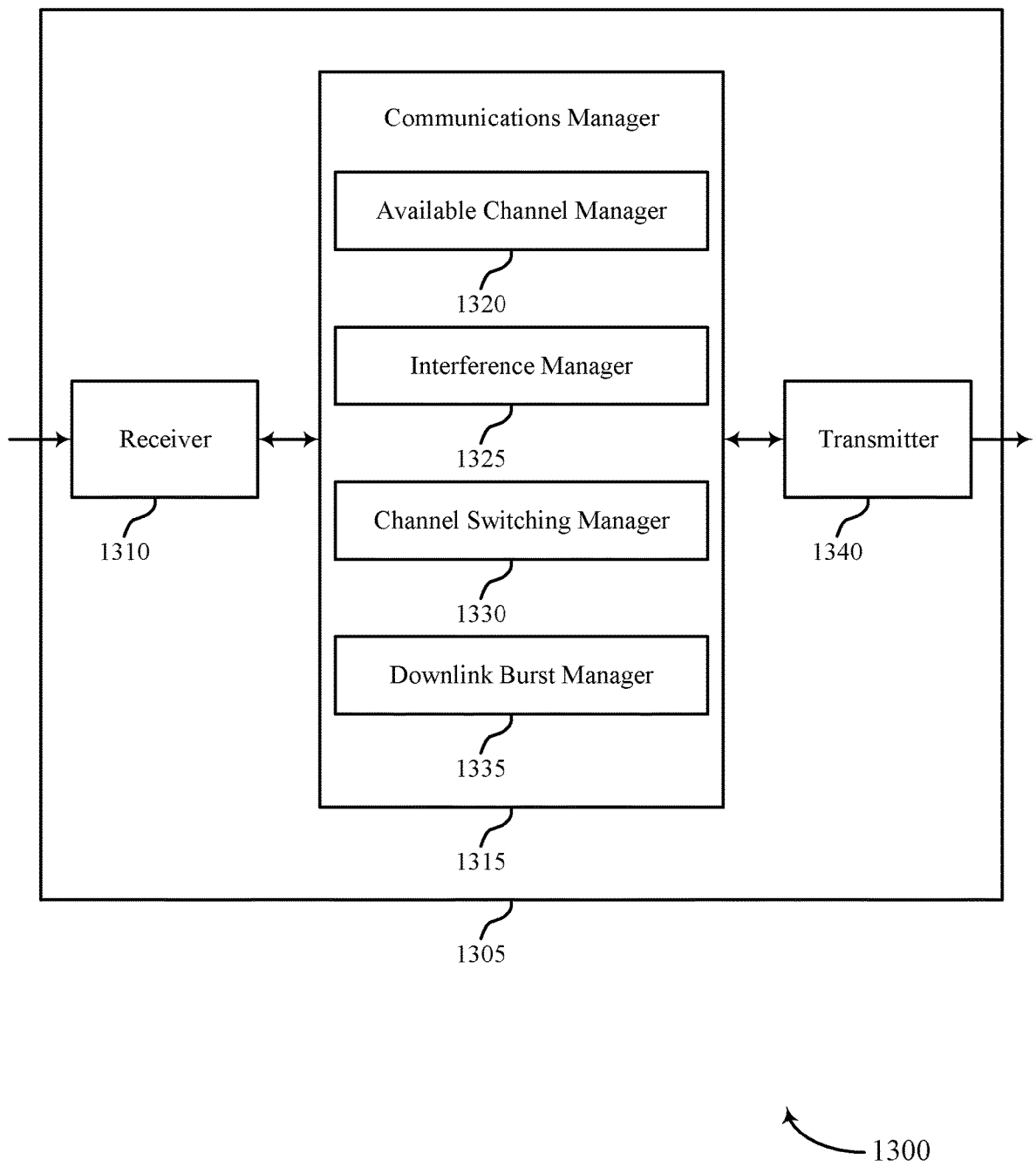

FIG. 13 shows a block diagram 1300 of a device 1305 that supports interference detection, signaling, and mitigation techniques for low latency transmissions in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to interference detection, signaling, and mitigation techniques for low latency transmissions, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an available channel manager 1320, an interference manager 1325, a channel switching manager 1330, and a downlink burst manager 1335. The communications manager 1315 may be an example of aspects of the communications manager 1510 described herein.

The available channel manager 1320 may transmit an indication of a set of one or more available channels to a UE.

The interference manager 1325 may detect interference associated with a first downlink burst between the base station and the UE, the first downlink burst using a first channel and a first frame period.

The channel switching manager 1330 may transmit to the UE, based on the detected interference, an instruction to switch to a second channel and a second frame period, the second channel selected from the set of one or more available channels.

The downlink burst manager 1335 may transmit, based on the instruction, a second downlink burst to the UE using the second channel and the second frame period.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
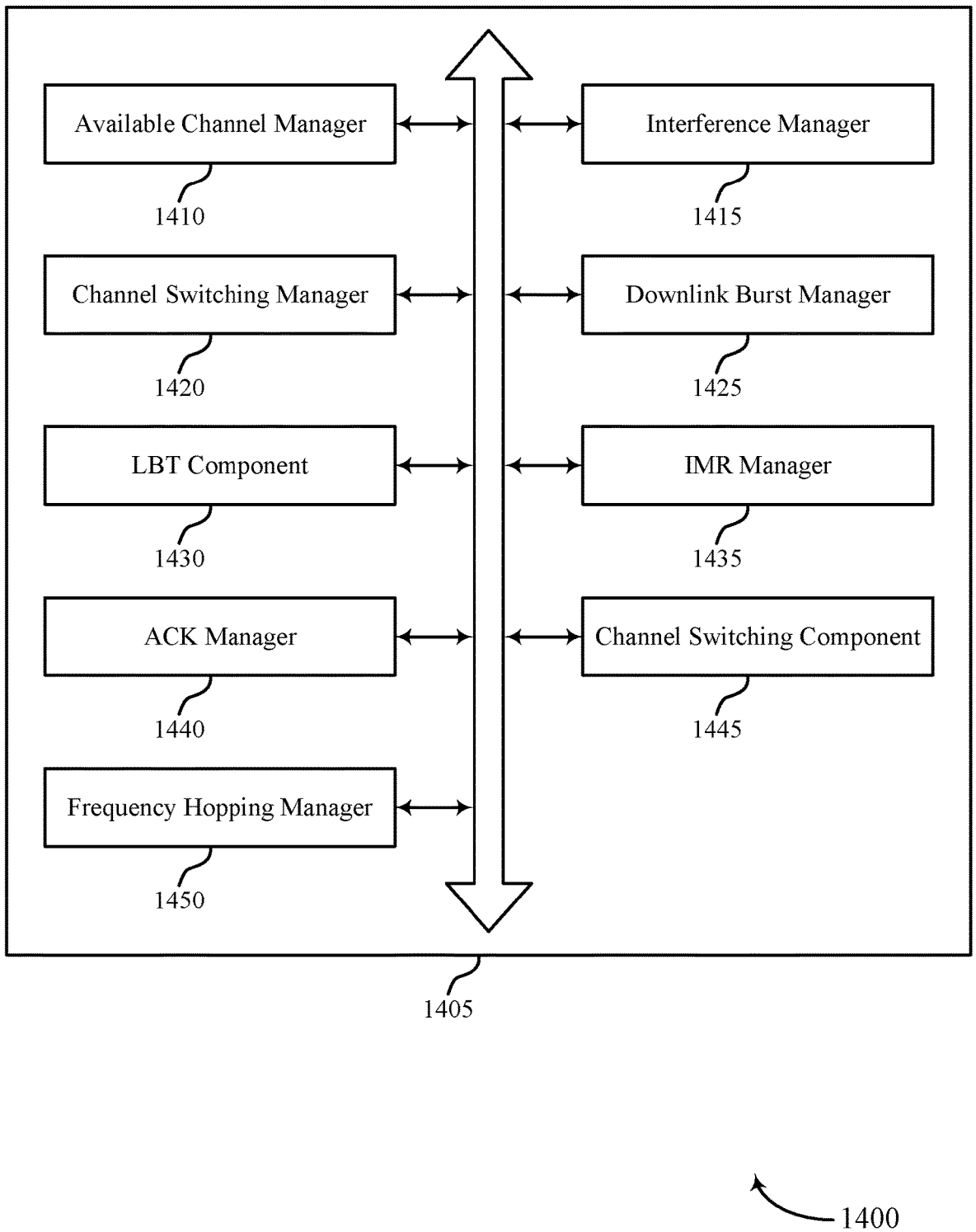
FIG. 14 shows a block diagram of a communications manager that supports interference detection, signaling, and mitigation techniques for low latency transmissions in accordance with aspects of the present disclosure.

FIG. 14 shows a block diagram 1400 of a communications manager 1405 that supports interference detection, signaling, and mitigation techniques for low latency transmissions in accordance with aspects of the present disclosure. The communications manager 1405 may be an example of aspects of a communications manager 1215, a communications manager 1315, or a communications manager 1510 described herein. The communications manager 1405 may include an available channel manager 1410, an interference manager 1415, a channel switching manager 1420, a downlink burst manager 1425, a LBT component 1430, an IMR manager 1435, an ACK manager 1440, a channel switching component 1445, and a frequency hopping manager 1450. Each of these modules may communicate, directly or indirectly, with one another (e.g., via one or more buses).

The available channel manager 1410 may transmit an indication of a set of one or more available channels to a UE. In some examples, determining, during the first frame period, that the second channel is available, where the set of one or more available channels includes the second channel. In some examples, the available channel manager 1410 may sense the second channel during an idle period of the first frame period, where determining that the second channel is available is based on the sensing. In some examples, the available channel manager 1410 may transmit a measurement gap configuration to the UE to configure the UE to perform interference detection during a measurement gap, where the measurement gap at least partially overlaps with an idle period of the first frame period. In some examples, the available channel manager 1410 may receive a measurement report from the UE indicating whether the second channel is available based on the transmitted measurement gap configuration, where determining that the second channel is available is based on the received measurement report.

The interference manager 1415 may detect interference associated with a first downlink burst between the base station and the UE, the first downlink burst using a first channel and a first frame period. In some examples, the interference manager 1415 may receive an interference indication from the UE, where detecting the interference is based on the received interference indication. In some examples, the interference manager 1415 may receive UCI from the UE, the UCI including the interference indication. In some cases, the interference indication includes an indication of a SINR at the UE and detecting the interference is based on the SINR exceeding a SINR threshold.

The channel switching manager 1420 may transmit to the UE, based on the detected interference, an instruction to switch to a second channel and a second frame period, the second channel selected from the set of one or more available channels. In some examples, the channel switching manager 1420 may transmit DCI to a set of one or more UEs, the set including the UE, and the DCI including the instruction to switch to the second channel. In some examples, the channel switching manager 1420 may transmit to the UE an instruction to switch to the first channel upon an expiration of a timer.

In some cases, the second frame period is offset from the first frame period by one slot.

The downlink burst manager 1425 may transmit, based on the instruction, a second downlink burst to the UE using the second channel and the second frame period. In some examples, the downlink burst manager 1425 may transmit the first downlink burst to the UE, the first downlink burst including the IMR. In some cases, the second downlink burst includes a retransmission of at least a portion of the data of the first downlink burst.

The LBT component 1430 may perform a LBT procedure prior to transmitting the first downlink burst, where detecting the interference is based on the LBT procedure.

The IMR manager 1435 may transmit IMR to the UE. In some examples, the IMR manager 1435 may transmit DCI to the UE, the DCI including a trigger for an IMR report, and the first downlink burst including the DCI. In some examples, the IMR manager 1435 may receive the IMR report based on transmitting the DCI, where detecting the interference is based on the received IMR report. In some examples, the IMR manager 1435 may transmit an IMR configuration to the UE, the IMR configuration indicating that IMR is to be transmitted semi-persistently at a periodicity within the first downlink burst, the first downlink burst including the IMR configuration. In some examples, the IMR manager 1435 may receive one or more of the IMR reports based on the IMR configuration, where detecting the interference is based on the received one or more IMR reports. In some cases, the IMR includes a ZP CSI-RS, and the IMR report includes a CSI report.

The ACK manager 1440 may receive one or more NACKs from a set of UEs. In some examples, the ACK manager 1440 may determine that a number of received NACKs satisfies a threshold value, where detecting the interference is based on the number of received NACKs satisfying the threshold value. In some examples, the ACK manager 1440 may determine that an ACK or a NACK was not received from the UE in response to transmitting a downlink transmission to the UE, where detecting the interference is based on determining that the ACK was not received. In some examples, the ACK manager 1440 may receive an ACK or a NACK, the transmitted ACK or the transmitted NACK including the interference indication.

The channel switching component 1445 may the process the instruction to switch to the second channel, where the instruction to switch to the second channel may include an instruction to switch from a first BWP to a second BWP.

The frequency hopping manager 1450 may transmit to the UE an indication of a frequency hopping pattern, the frequency hopping pattern including an instruction to switch between a set of additional channels and a set of additional frame periods, each of the set of additional channels selected from the set of one or more available channels.

In some cases, the frequency hopping pattern includes a random frequency hopping pattern or a pseudo-random frequency hopping pattern.

Figure 15:
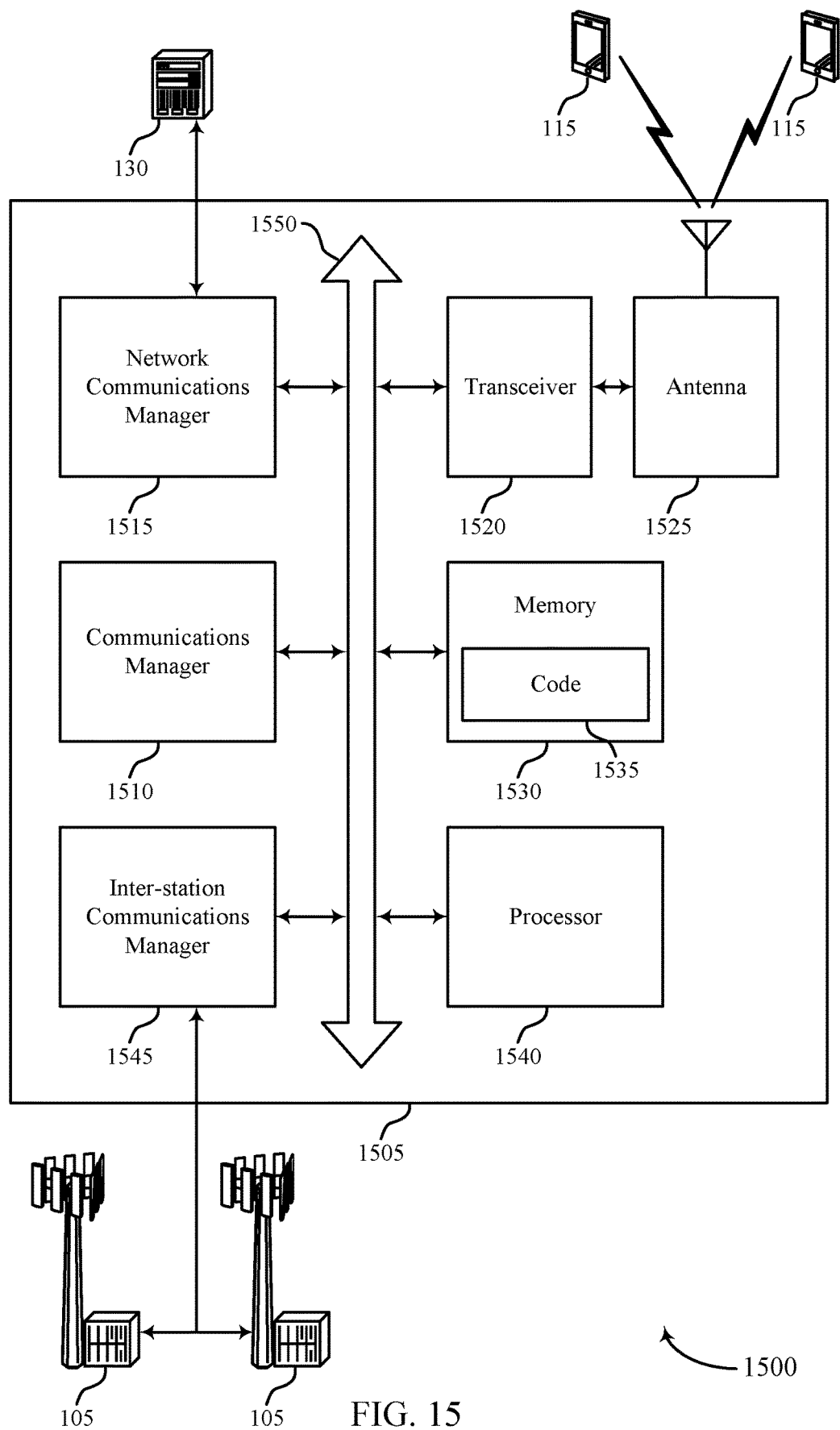
FIG. 15 shows a diagram of a system including a device that supports interference detection, signaling, and mitigation techniques for low latency transmissions in accordance with aspects of the present disclosure.

FIG. 15 shows a diagram of a system 1500 including a device 1505 that supports interference detection, signaling, and mitigation techniques for low latency transmissions in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit an indication of a set of one or more available channels to a UE, detect interference associated with a first downlink burst between the base station and the UE, the first downlink burst using a first channel and a first frame period, transmit to the UE, based on the detected interference, an instruction to switch to a second channel and a second frame period, the second channel selected from the set of one or more available channels, and transmit, based on the instruction, a second downlink burst to the UE using the second channel and the second frame period.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting interference detection, signaling, and mitigation techniques for low latency transmissions).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
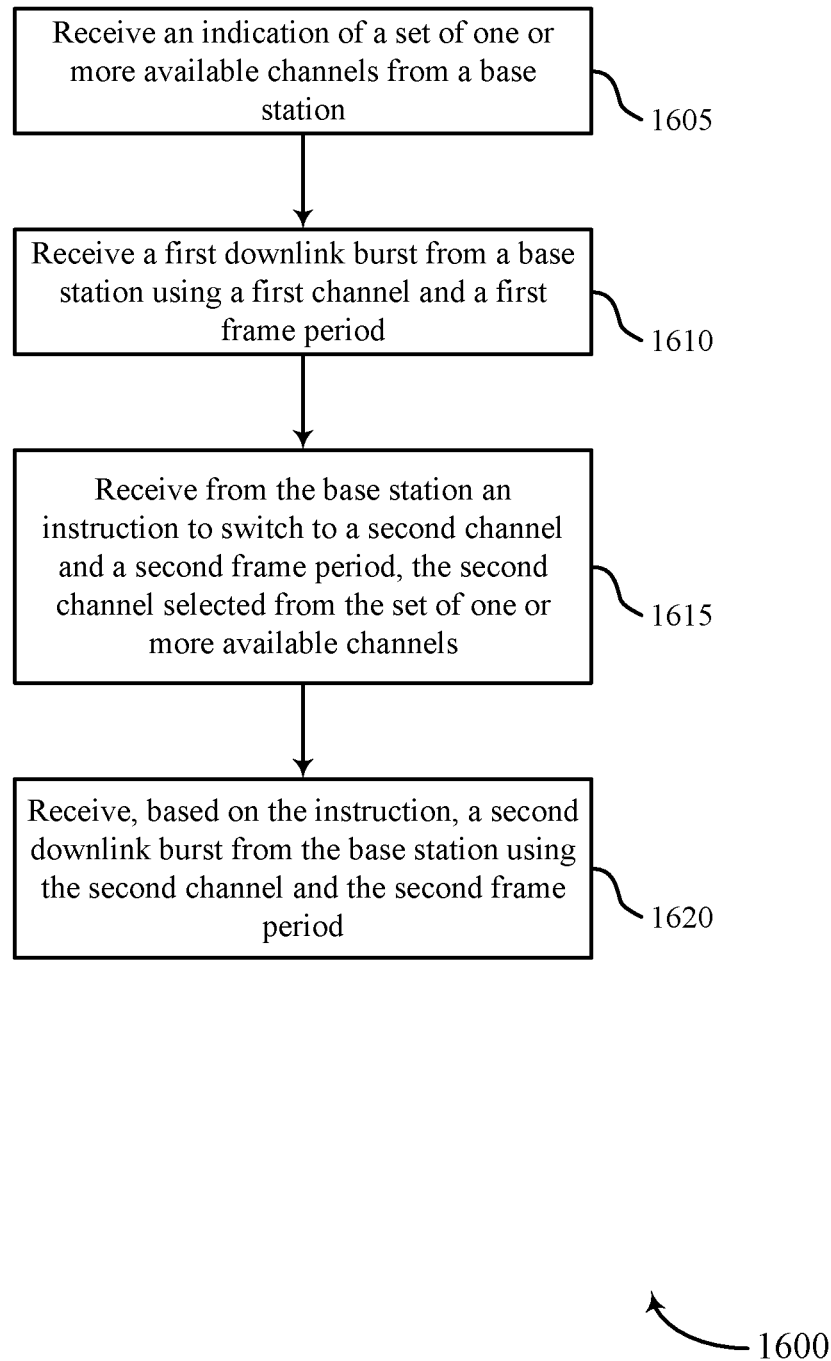
FIGS. 16 through 24 show flowcharts illustrating methods that support interference detection, signaling, and mitigation techniques for low latency transmissions in accordance with aspects of the present disclosure.

FIG. 16 shows a flowchart illustrating a method 1600 that supports interference detection, signaling, and mitigation techniques for low latency transmissions in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive an indication of a set of one or more available channels from a base station. The operations of 1605 may be performed according to the methods described herein. In some examples, aspects of the operations of 1605 may be performed by an available channel component as described with reference to FIGS. 8 through 11.

At 1610, the UE may receive a first downlink burst from a base station using a first channel and a first frame period. The operations of 1610 may be performed according to the methods described herein. In some examples, aspects of the operations of 1610 may be performed by a downlink burst component as described with reference to FIGS. 8 through 11.

At 1615, the UE may receive from the base station an instruction to switch to a second channel and a second frame period, the second channel selected from the set of one or more available channels. The operations of 1615 may be performed according to the methods described herein. In some examples, aspects of the operations of 1615 may be performed by a channel switching component as described with reference to FIGS. 8 through 11.

At 1620, the UE may receive, based on the instruction, a second downlink burst from the base station using the second channel and the second frame period. The operations of 1620 may be performed according to the methods described herein. In some examples, aspects of the operations of 1620 may be performed by a downlink burst component as described with reference to FIGS. 8 through 11.

Figure 17:
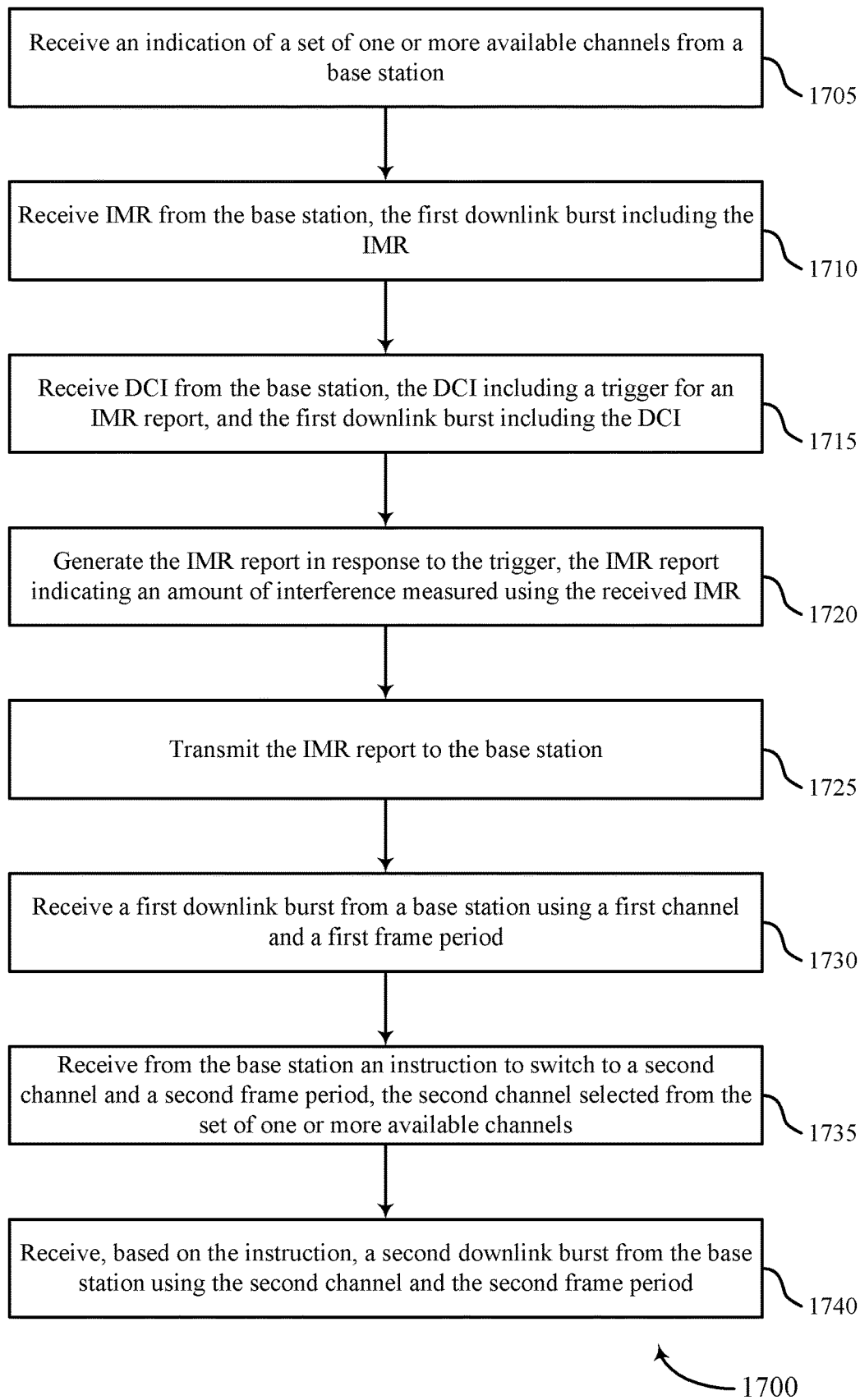

FIG. 17 shows a flowchart illustrating a method 1700 that supports interference detection, signaling, and mitigation techniques for low latency transmissions in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive an indication of a set of one or more available channels from a base station. The operations of 1705 may be performed according to the methods described herein. In some examples, aspects of the operations of 1705 may be performed by an available channel component as described with reference to FIGS. 8 through 11.

At 1710, the UE may receive IMR from the base station, the first downlink burst including the IMR. The operations of 1710 may be performed according to the methods described herein. In some examples, aspects of the operations of 1710 may be performed by an IMR component as described with reference to FIGS. 8 through 11.

At 1715, the UE may receive DCI from the base station, the DCI including a trigger for an IMR report, and the first downlink burst including the DCI. The operations of 1715 may be performed according to the methods described herein. In some examples, aspects of the operations of 1715 may be performed by an IMR component as described with reference to FIGS. 8 through 11.

At 1720, the UE may generate the IMR report in response to the trigger, the IMR report indicating an amount of interference measured using the received IMR. The operations of 1720 may be performed according to the methods described herein. In some examples, aspects of the operations of 1720 may be performed by an IMR component as described with reference to FIGS. 8 through 11.

At 1725, the UE may transmit the IMR report to the base station. The operations of 1725 may be performed according to the methods described herein. In some examples, aspects of the operations of 1725 may be performed by an IMR component as described with reference to FIGS. 8 through 11.

At 1730, the UE may receive a first downlink burst from a base station using a first channel and a first frame period. The operations of 1730 may be performed according to the methods described herein. In some examples, aspects of the operations of 1730 may be performed by a downlink burst component as described with reference to FIGS. 8 through 11.

At 1735, the UE may receive from the base station an instruction to switch to a second channel and a second frame period, the second channel selected from the set of one or more available channels. The operations of 1735 may be performed according to the methods described herein. In some examples, aspects of the operations of 1735 may be performed by a channel switching component as described with reference to FIGS. 8 through 11.

At 1740, the UE may receive, based on the instruction, a second downlink burst from the base station using the second channel and the second frame period. The operations of 1740 may be performed according to the methods described herein. In some examples, aspects of the operations of 1740 may be performed by a downlink burst component as described with reference to FIGS. 8 through 11.

Figure 18:
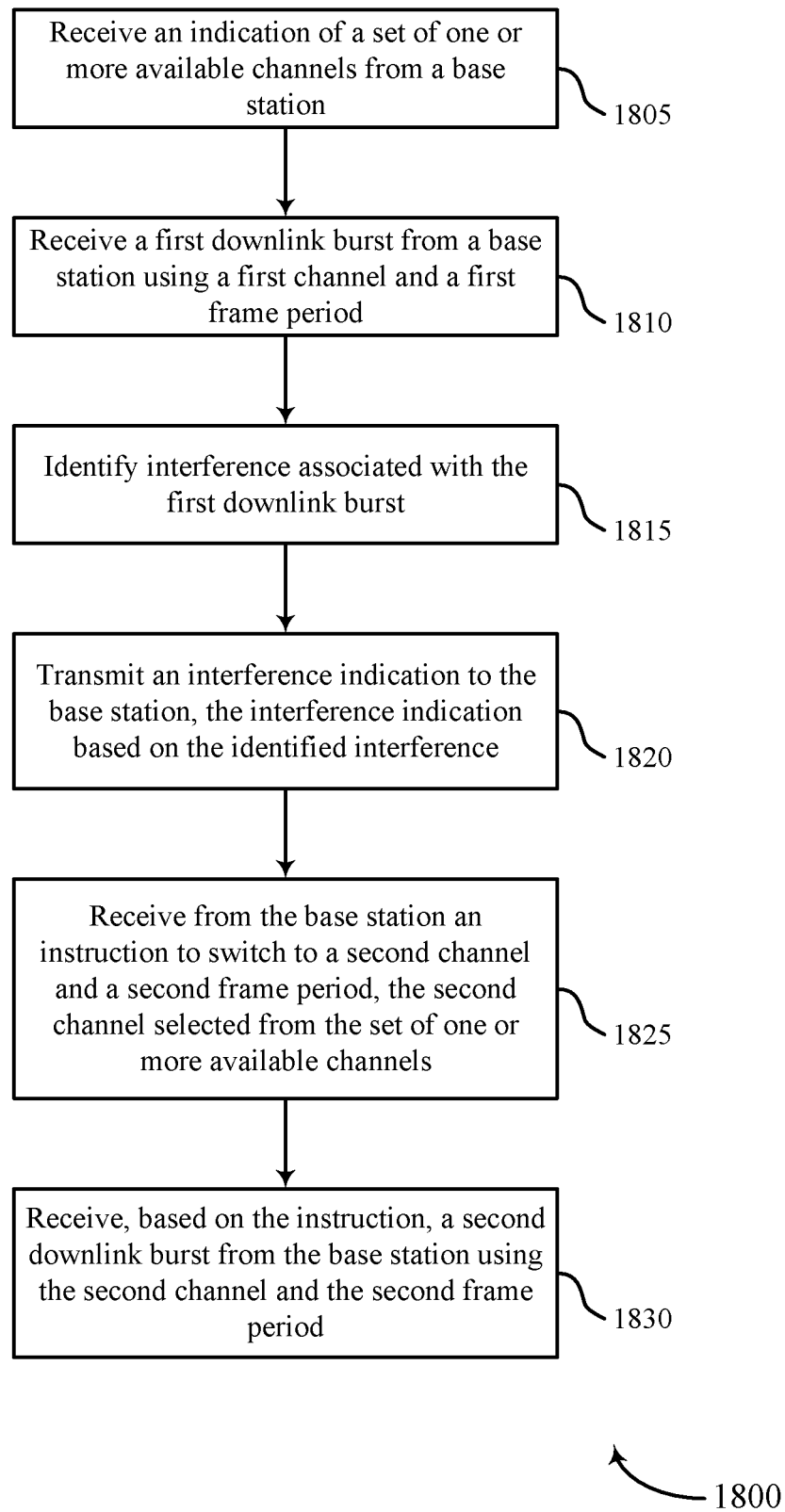

FIG. 18 shows a flowchart illustrating a method 1800 that supports interference detection, signaling, and mitigation techniques for low latency transmissions in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive an indication of a set of one or more available channels from a base station. The operations of 1805 may be performed according to the methods described herein. In some examples, aspects of the operations of 1805 may be performed by an available channel component as described with reference to FIGS. 8 through 11.

At 1810, the UE may receive a first downlink burst from a base station using a first channel and a first frame period. The operations of 1810 may be performed according to the methods described herein. In some examples, aspects of the operations of 1810 may be performed by a downlink burst component as described with reference to FIGS. 8 through 11.

At 1815, the UE may identify interference associated with the first downlink burst. The operations of 1815 may be performed according to the methods described herein. In some examples, aspects of the operations of 1815 may be performed by an interference component as described with reference to FIGS. 8 through 11.

At 1820, the UE may transmit an interference indication to the base station, the interference indication based on the identified interference. The operations of 1820 may be performed according to the methods described herein. In some examples, aspects of the operations of 1820 may be performed by an interference component as described with reference to FIGS. 8 through 11.

At 1825, the UE may receive from the base station an instruction to switch to a second channel and a second frame period, the second channel selected from the set of one or more available channels. The operations of 1825 may be performed according to the methods described herein. In some examples, aspects of the operations of 1825 may be performed by a channel switching component as described with reference to FIGS. 8 through 11.

At 1830, the UE may receive, based on the instruction, a second downlink burst from the base station using the second channel and the second frame period. The operations of 1830 may be performed according to the methods described herein. In some examples, aspects of the operations of 1830 may be performed by a downlink burst component as described with reference to FIGS. 8 through 11.

Figure 19:
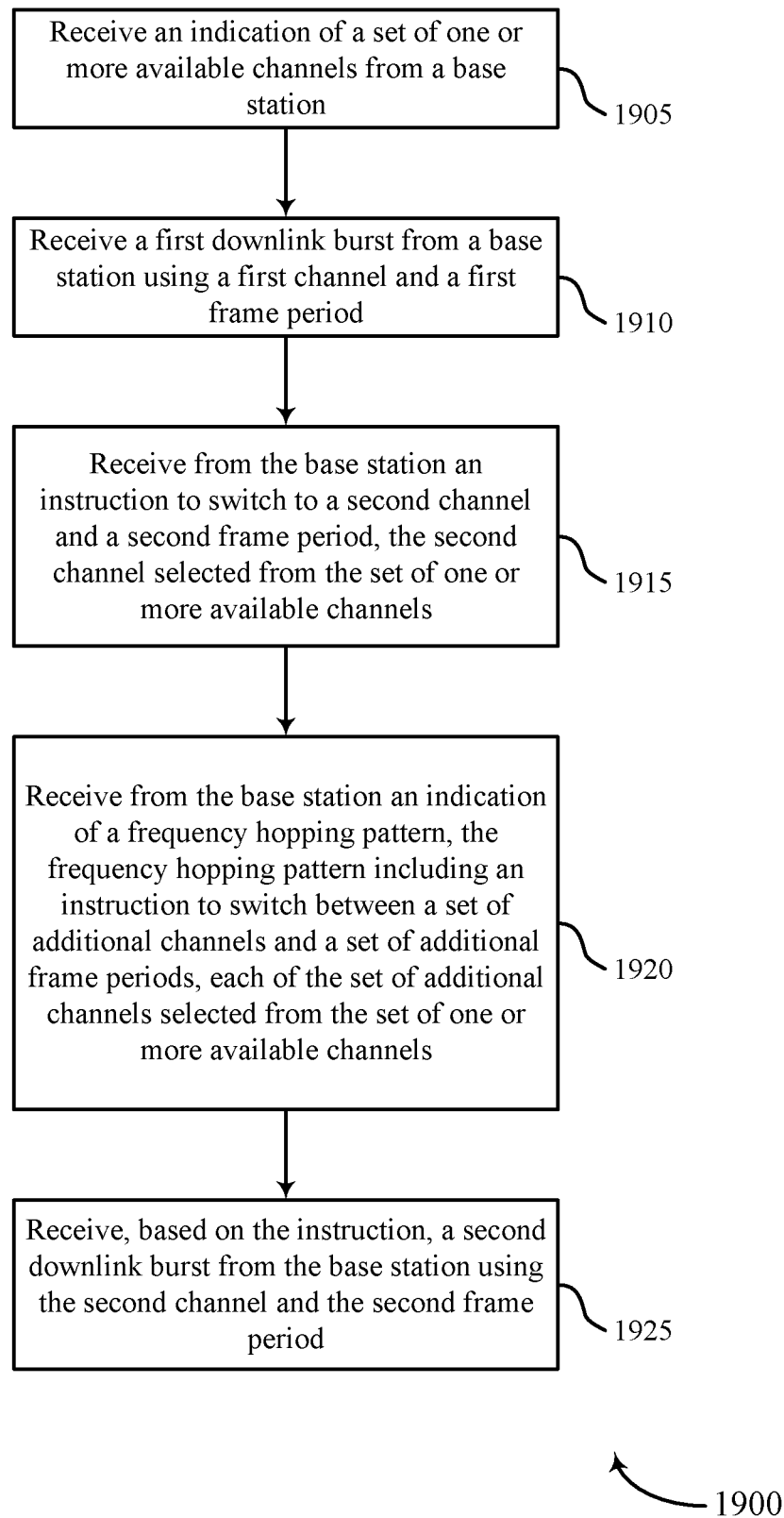

FIG. 19 shows a flowchart illustrating a method 1900 that supports interference detection, signaling, and mitigation techniques for low latency transmissions in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive an indication of a set of one or more available channels from a base station. The operations of 1905 may be performed according to the methods described herein. In some examples, aspects of the operations of 1905 may be performed by an available channels component as described with reference to FIGS. 8 through 11.

At 1910, the UE may receive a first downlink burst from a base station using a first channel and a first frame period. The operations of 1910 may be performed according to the methods described herein. In some examples, aspects of the operations of 1910 may be performed by a downlink burst component as described with reference to FIGS. 8 through 11.

At 1915, the UE may receive from the base station an instruction to switch to a second channel and a second frame period, the second channel selected from the set of one or more available channels. The operations of 1915 may be performed according to the methods described herein. In some examples, aspects of the operations of 1915 may be performed by a channel switching component as described with reference to FIGS. 8 through 11.

At 1920, the UE may receive from the base station an indication of a frequency hopping pattern, the frequency hopping pattern including an instruction to switch between a set of additional channels and a set of additional frame periods, each of the set of additional channels selected from the set of one or more available channels. The operations of 1920 may be performed according to the methods described herein. In some examples, aspects of the operations of 1920 may be performed by a frequency hopping component as described with reference to FIGS. 8 through 11.

At 1925, the UE may receive, based on the instruction, a second downlink burst from the base station using the second channel and the second frame period. The operations of 1925 may be performed according to the methods described herein. In some examples, aspects of the operations of 1925 may be performed by a downlink burst component as described with reference to FIGS. 8 through 11.

Figure 20:
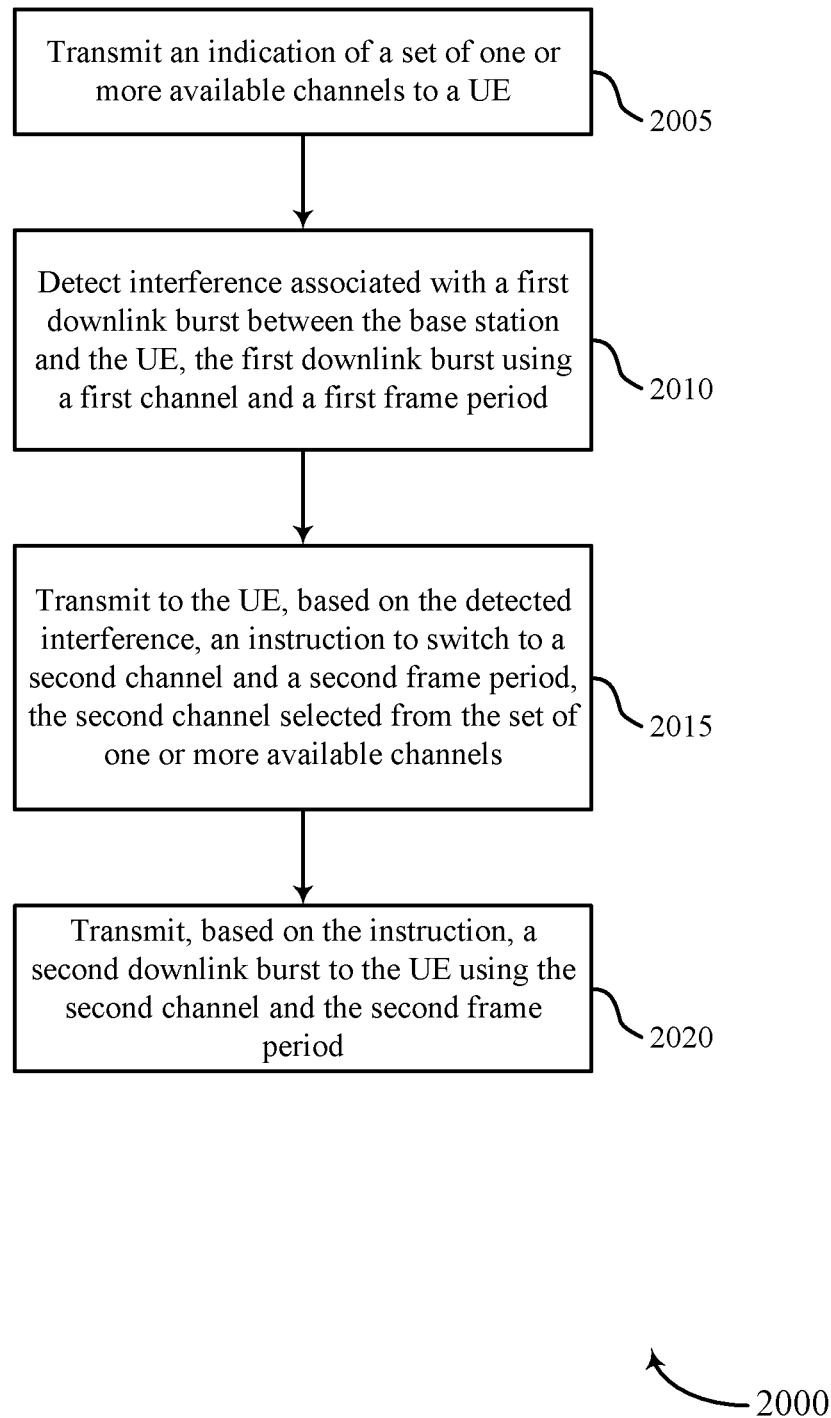

FIG. 20 shows a flowchart illustrating a method 2000 that supports interference detection, signaling, and mitigation techniques for low latency transmissions in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may transmit an indication of a set of one or more available channels to a UE. The operations of 2005 may be performed according to the methods described herein. In some examples, aspects of the operations of 2005 may be performed by an available channels manager as described with reference to FIGS. 12 through 15.

At 2010, the base station may detect interference associated with a first downlink burst between the base station and the UE, the first downlink burst using a first channel and a first frame period. The operations of 2010 may be performed according to the methods described herein. In some examples, aspects of the operations of 2010 may be performed by an interference manager as described with reference to FIGS. 12 through 15.

At 2015, the base station may transmit to the UE, based on the detected interference, an instruction to switch to a second channel and a second frame period, the second channel selected from the set of one or more available channels. The operations of 2015 may be performed according to the methods described herein. In some examples, aspects of the operations of 2015 may be performed by a channel switching manager as described with reference to FIGS. 12 through 15.

At 2020, the base station may transmit, based on the instruction, a second downlink burst to the UE using the second channel and the second frame period. The operations of 2020 may be performed according to the methods described herein. In some examples, aspects of the operations of 2020 may be performed by a downlink burst manager as described with reference to FIGS. 12 through 15.

Figure 21:
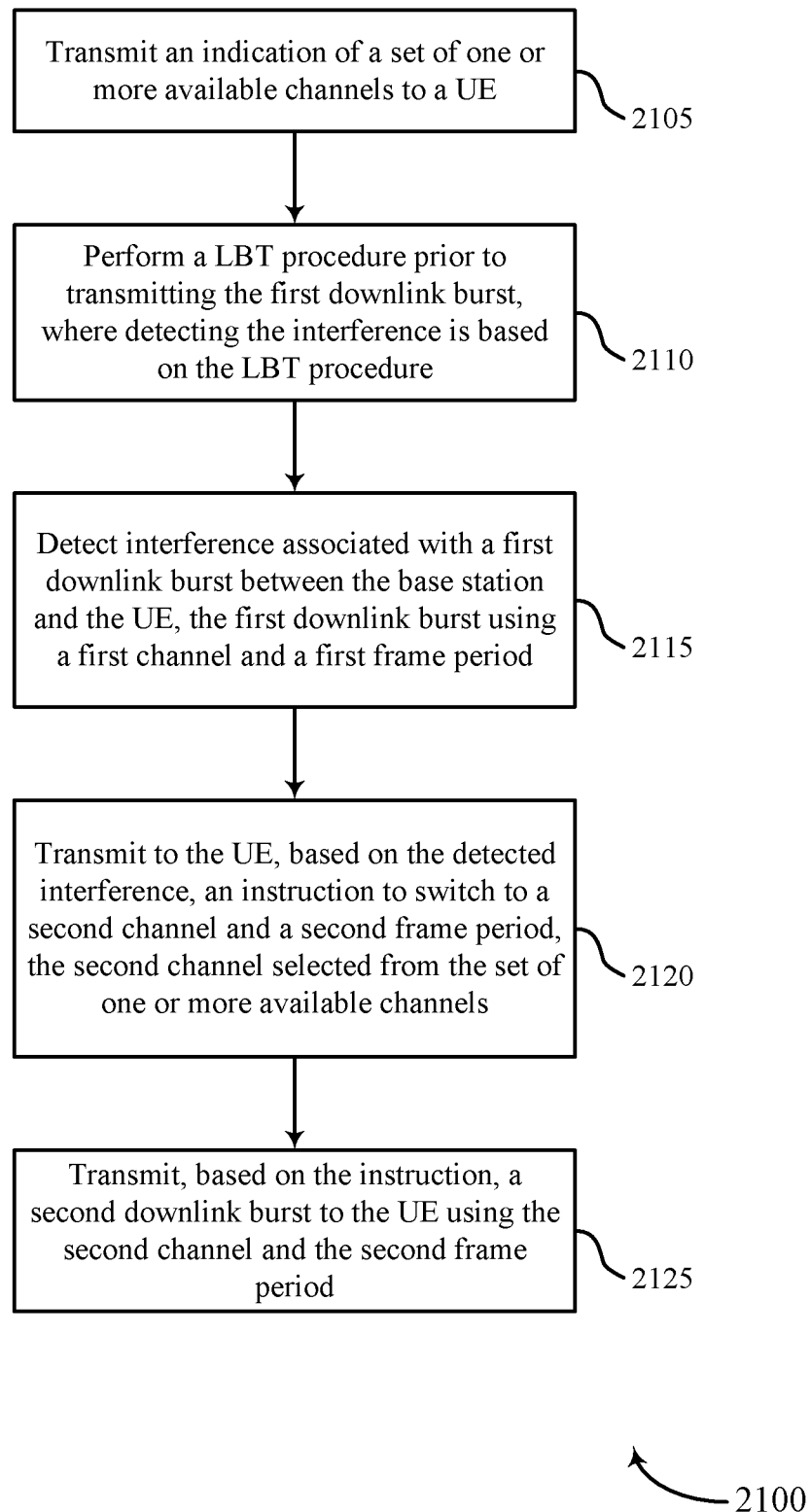

FIG. 21 shows a flowchart illustrating a method 2100 that supports interference detection, signaling, and mitigation techniques for low latency transmissions in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may transmit an indication of a set of one or more available channels to a UE. The operations of 2105 may be performed according to the methods described herein. In some examples, aspects of the operations of 2105 may be performed by an available channels manager as described with reference to FIGS. 12 through 15.

At 2110, the base station may perform a LBT procedure prior to transmitting the first downlink burst, where detecting the interference is based on the LBT procedure. The operations of 2110 may be performed according to the methods described herein. In some examples, aspects of the operations of 2110 may be performed by a LBT component as described with reference to FIGS. 12 through 15.

At 2115, the base station may detect interference associated with a first downlink burst between the base station and the UE, the first downlink burst using a first channel and a first frame period. The operations of 2115 may be performed according to the methods described herein. In some examples, aspects of the operations of 2115 may be performed by an interference manager as described with reference to FIGS. 12 through 15.

At 2120, the base station may transmit to the UE, based on the detected interference, an instruction to switch to a second channel and a second frame period, the second channel selected from the set of one or more available channels. The operations of 2120 may be performed according to the methods described herein. In some examples, aspects of the operations of 2120 may be performed by a channel switching manager as described with reference to FIGS. 12 through 15.

At 2125, the base station may transmit, based on the instruction, a second downlink burst to the UE using the second channel and the second frame period. The operations of 2125 may be performed according to the methods described herein. In some examples, aspects of the operations of 2125 may be performed by a downlink burst manager as described with reference to FIGS. 12 through 15.

Figure 22:
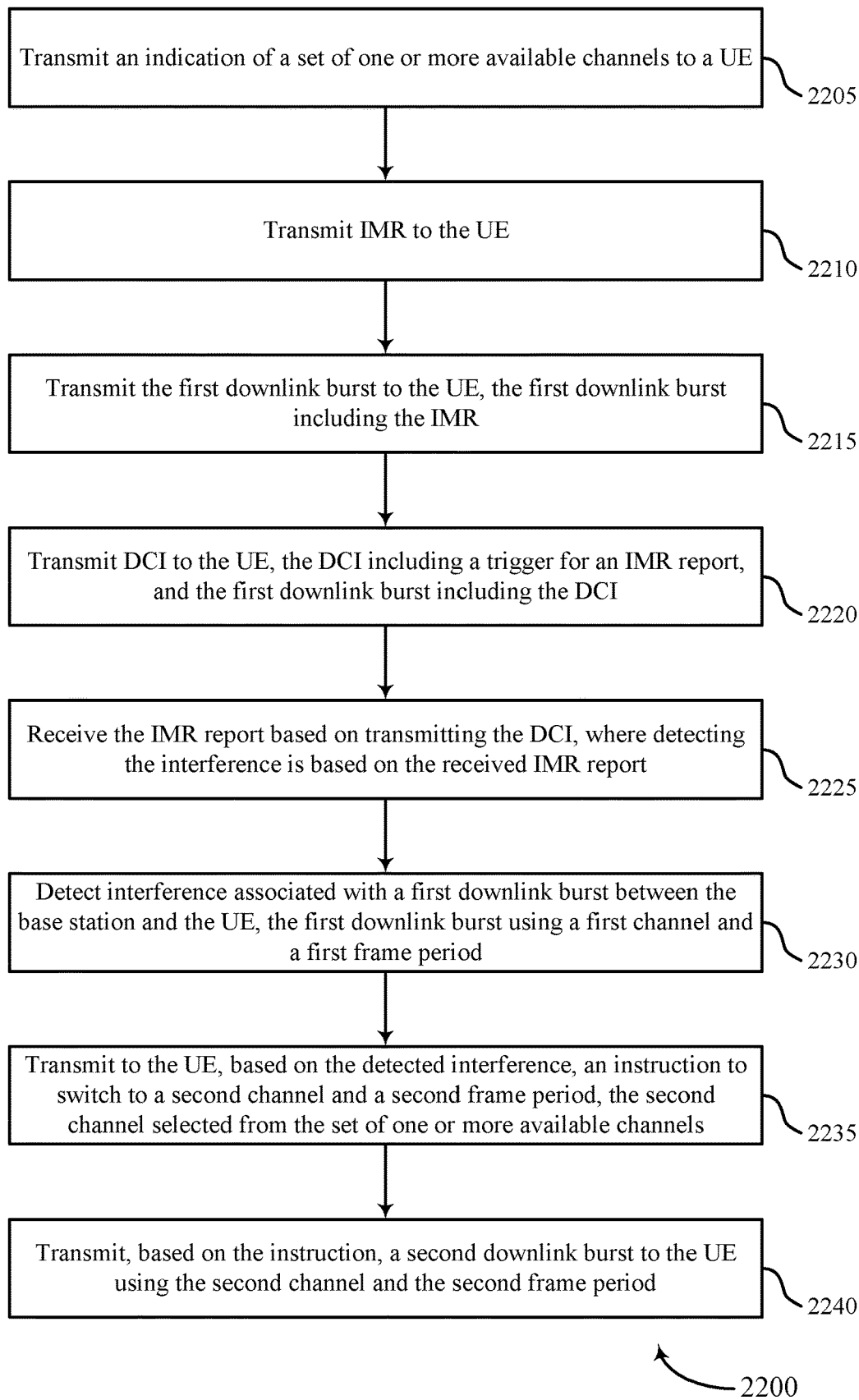

FIG. 22 shows a flowchart illustrating a method 2200 that supports interference detection, signaling, and mitigation techniques for low latency transmissions in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2205, the base station may transmit an indication of a set of one or more available channels to a UE. The operations of 2205 may be performed according to the methods described herein. In some examples, aspects of the operations of 2205 may be performed by an available channels manager as described with reference to FIGS. 12 through 15.

At 2210, the base station may transmit IMR to the UE. The operations of 2210 may be performed according to the methods described herein. In some examples, aspects of the operations of 2210 may be performed by an IMR manager as described with reference to FIGS. 12 through 15.

At 2215, the base station may transmit the first downlink burst to the UE, the first downlink burst including the IMR. The operations of 2215 may be performed according to the methods described herein. In some examples, aspects of the operations of 2215 may be performed by a downlink burst manager as described with reference to FIGS. 12 through 15.

At 2220, the base station may transmit DCI to the UE, the DCI including a trigger for an IMR report, and the first downlink burst including the DCI. The operations of 2220 may be performed according to the methods described herein. In some examples, aspects of the operations of 2220 may be performed by an IMR manager as described with reference to FIGS. 12 through 15.

At 2225, the base station may receive the IMR report based on transmitting the DCI, where detecting the interference is based on the received IMR report. The operations of 2225 may be performed according to the methods described herein. In some examples, aspects of the operations of 2225 may be performed by an IMR manager as described with reference to FIGS. 12 through 15.

At 2230, the base station may detect interference associated with a first downlink burst between the base station and the UE, the first downlink burst using a first channel and a first frame period. The operations of 2230 may be performed according to the methods described herein. In some examples, aspects of the operations of 2230 may be performed by an interference manager as described with reference to FIGS. 12 through 15.

At 2235, the base station may transmit to the UE, based on the detected interference, an instruction to switch to a second channel and a second frame period, the second channel selected from the set of one or more available channels. The operations of 2235 may be performed according to the methods described herein. In some examples, aspects of the operations of 2235 may be performed by a channel switching manager as described with reference to FIGS. 12 through 15.

At 2240, the base station may transmit, based on the instruction, a second downlink burst to the UE using the second channel and the second frame period. The operations of 2240 may be performed according to the methods described herein. In some examples, aspects of the operations of 2240 may be performed by a downlink burst manager as described with reference to FIGS. 12 through 15.

Figure 23:
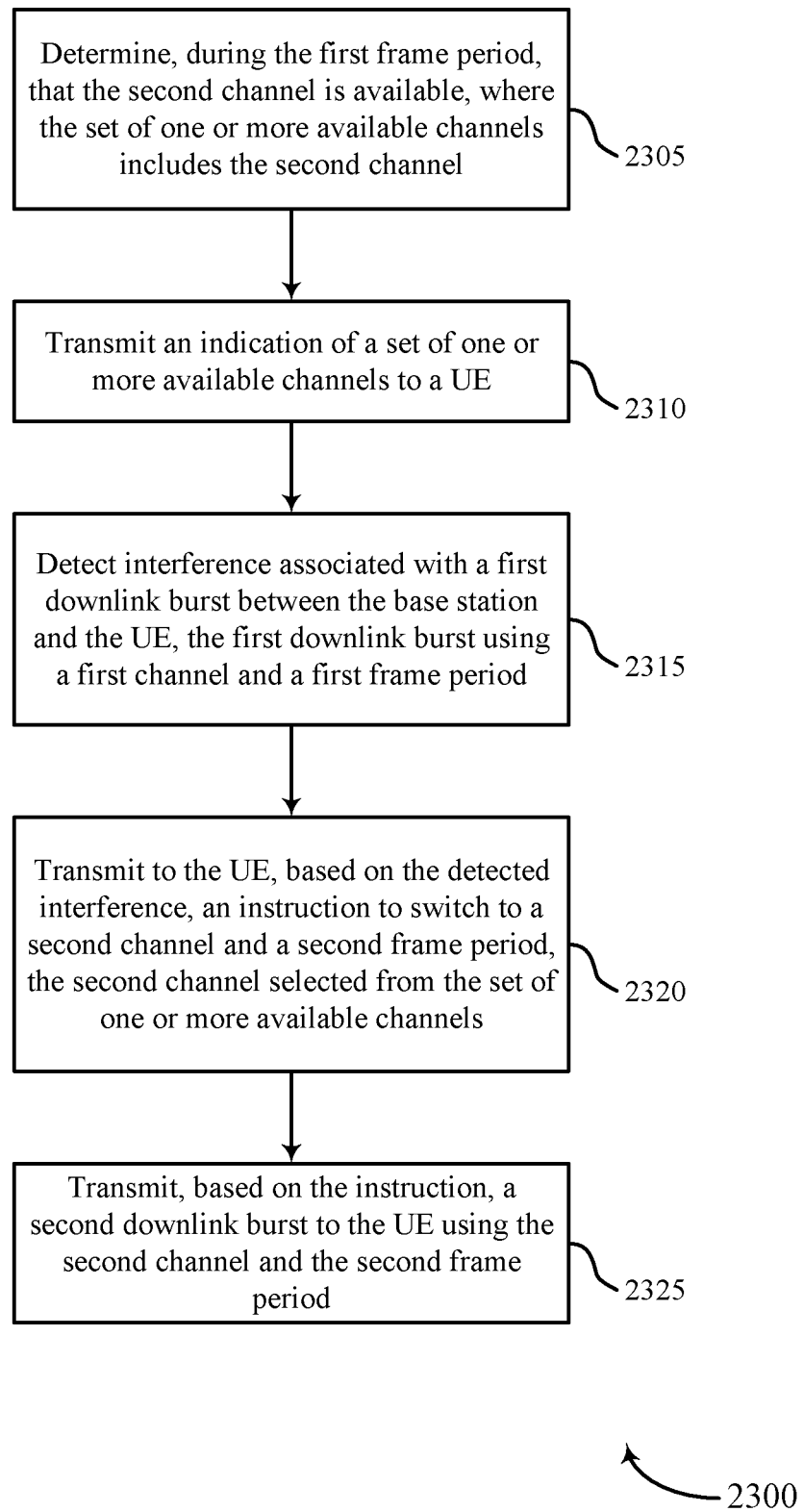

FIG. 23 shows a flowchart illustrating a method 2300 that supports interference detection, signaling, and mitigation techniques for low latency transmissions in accordance with aspects of the present disclosure. The operations of method 2300 may be implemented by a base station 105 or its components as described herein. For example, the operations of method 2300 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2305, the base station may determine, during the first frame period, that the second channel is available, where the set of one or more available channels includes the second channel. The operations of 2305 may be performed according to the methods described herein. In some examples, aspects of the operations of 2305 may be performed by an available channels manager as described with reference to FIGS. 12 through 15.

At 2310, the base station may transmit an indication of a set of one or more available channels to a UE. The operations of 2310 may be performed according to the methods described herein. In some examples, aspects of the operations of 2310 may be performed by an available channels manager as described with reference to FIGS. 12 through 15.

At 2315, the base station may detect interference associated with a first downlink burst between the base station and the UE, the first downlink burst using a first channel and a first frame period. The operations of 2315 may be performed according to the methods described herein. In some examples, aspects of the operations of 2315 may be performed by an interference manager as described with reference to FIGS. 12 through 15.

At 2320, the base station may transmit to the UE, based on the detected interference, an instruction to switch to a second channel and a second frame period, the second channel selected from the set of one or more available channels. The operations of 2320 may be performed according to the methods described herein. In some examples, aspects of the operations of 2320 may be performed by a channel switching manager as described with reference to FIGS. 12 through 15.

At 2325, the base station may transmit, based on the instruction, a second downlink burst to the UE using the second channel and the second frame period. The operations of 2325 may be performed according to the methods described herein. In some examples, aspects of the operations of 2325 may be performed by a downlink burst manager as described with reference to FIGS. 12 through 15.

Figure 24:
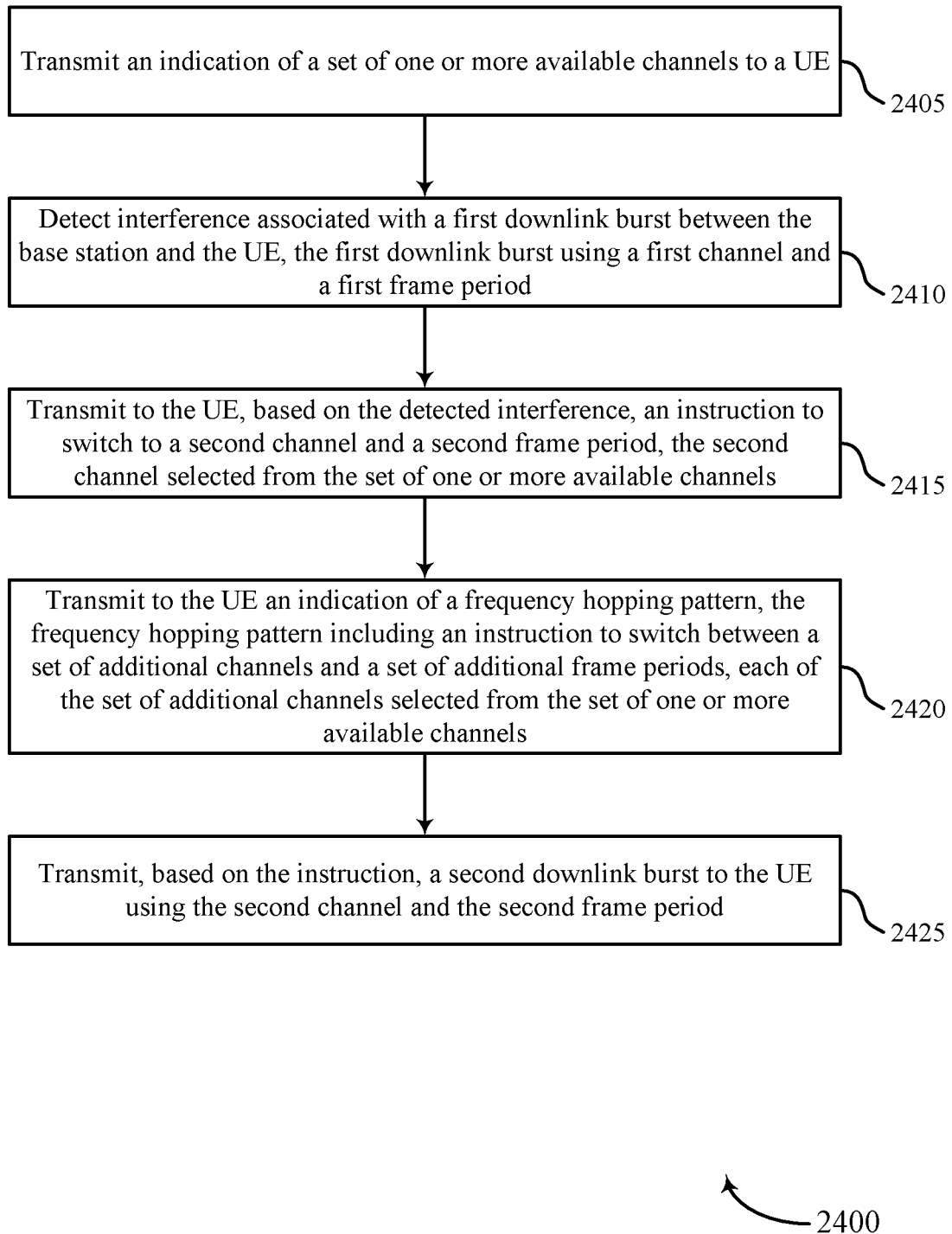

FIG. 24 shows a flowchart illustrating a method 2400 that supports interference detection, signaling, and mitigation techniques for low latency transmissions in accordance with aspects of the present disclosure. The operations of method 2400 may be implemented by a base station 105 or its components as described herein. For example, the operations of method 2400 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2405, the base station may transmit an indication of a set of one or more available channels to a UE. The operations of 2405 may be performed according to the methods described herein. In some examples, aspects of the operations of 2405 may be performed by an available channels manager as described with reference to FIGS. 12 through 15.

At 2410, the base station may detect interference associated with a first downlink burst between the base station and the UE, the first downlink burst using a first channel and a first frame period. The operations of 2410 may be performed according to the methods described herein. In some examples, aspects of the operations of 2410 may be performed by an interference manager as described with reference to FIGS. 12 through 15.

At 2415, the base station may transmit to the UE, based on the detected interference, an instruction to switch to a second channel and a second frame period, the second channel selected from the set of one or more available channels. The operations of 2415 may be performed according to the methods described herein. In some examples, aspects of the operations of 2415 may be performed by a channel switching manager as described with reference to FIGS. 12 through 15.

At 2420, the base station may transmit to the UE an indication of a frequency hopping pattern, the frequency hopping pattern including an instruction to switch between a set of additional channels and a set of additional frame periods, each of the set of additional channels selected from the set of one or more available channels. The operations of 2420 may be performed according to the methods described herein. In some examples, aspects of the operations of 2420 may be performed by a frequency hopping manager as described with reference to FIGS. 12 through 15.

At 2425, the base station may transmit, based on the instruction, a second downlink burst to the UE using the second channel and the second frame period. The operations of 2425 may be performed according to the methods described herein. In some examples, aspects of the operations of 2425 may be performed by a downlink burst manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856

(TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, from a network device, an indication of a set of two or more available channels including a first channel and a second channel;
receiving, from the network device and based at least in part on the UE operating in accordance with a frame based equipment mode, a measurement gap configuration to configure the UE to perform interference detection in the second channel during a measurement gap that at least partially overlaps with an idle period of a fixed frame period of the first channel, the fixed frame period including the idle period and a period reserved for a listen before talk procedure;
receiving a first downlink burst from the network device using the first channel and the fixed frame period;
sensing, based at least in part on the measurement gap configuration, the second channel during the measurement gap that at least partially overlaps with the idle period of the fixed frame period of the first channel; and
transmitting, to the network device, a measurement report that is based at least in part on sensing the second channel during the measurement gap.

2. The method of claim 1, further comprising:
transmitting, to the network device based at least in part on an identified interference associated with the first downlink burst, an interference indication comprising uplink control information (UCI).

3. The method of claim 1, further comprising:
determining a signal-to-interference-plus-noise ratio (SINR) based at least in part on the first downlink burst; and
transmitting, to the network device based at least in part on the determined SINR, an interference indication comprising an indication of the SINR.

4. The method of claim 1, further comprising:
transmitting, based at least in part on an identified interference associated with the first downlink burst, an interference indication comprising an acknowledgment (ACK) or a negative acknowledgment (NACK).

5. The method of claim 1, further comprising:
receiving downlink control information (DCI) from the network device, the DCI comprising an instruction to switch to the second channel.

6. The method of claim 1, further comprising:
receiving interference management resources (IMR) from the network device, the first downlink burst comprising the IMR.

7. The method of claim 6, further comprising:
receiving downlink control information (DCI) from the network device, the DCI comprising a trigger for an IMR report, and the first downlink burst comprising the DCI;
generating the IMR report in response to the trigger, the IMR report indicating an amount of interference measured using the received IMR; and
transmitting the IMR report to the network device.

8. The method of claim 6, further comprising:
receiving an IMR configuration from the network device, the IMR configuration indicating that IMR is to be transmitted semi-persistently at a periodicity within the first downlink burst, and the first downlink burst comprising the IMR configuration;
generating one or more IMR reports at the periodicity within the first downlink burst based at least in part on the IMR configuration, each of the one or more IMR reports indicating respective amounts of interference measured using the received IMR; and
transmitting the one or more IMR reports to the network device.

9. The method of claim 8, wherein the IMR comprises a zero-power (ZP) channel state information (CSI)-reference signal (CSI-RS), and the one or more IMR reports comprise a CSI report.

10. The method of claim 1, further comprising:
determining that at least a portion of the first downlink burst was not successfully received; and
transmitting a negative acknowledgment (NACK) to the network device based at least in part on determining that at least the portion of the first downlink burst was not successfully received.

11. The method of claim 1, further comprising:
receiving, from the network device based at least in part on the measurement report, a second indication of the set of two or more available channels.

12. The method of claim 1, further comprising:
receiving from the network device an indication of a frequency hopping pattern, the frequency hopping pattern comprising an instruction to switch between a plurality of additional channels and a plurality of additional frame periods, each of the plurality of additional channels selected from the set of two or more available channels.

13. The method of claim 12, wherein the frequency hopping pattern comprises a random frequency hopping pattern or a pseudo-random frequency hopping pattern.

14. The method of claim 1, wherein the set of two or more available channels comprises one or more whitelisted channels.

15. The method of claim 1, further comprising:
transmitting, to the network device based at least in part on an identified interference associated with the first downlink burst, an interference indication;
receiving, from the network device and based at least in part on the interference indication transmitted to the network device, an instruction to switch from the first channel to the second channel and a second frame period, the second channel selected from the set of two or more available channels; and
receiving, based at least in part on the instruction, a second downlink burst from the network device using the second channel and the second frame period.

16. The method of claim 1, wherein a duration of the idle period satisfies a channel occupancy time threshold of the fixed frame period of the first channel.

17. An apparatus for wireless communications at a user equipment (UE), comprising:
a processor,
memory in electronic communication with the processor; and
instructions stored in the memory, wherein the instructions are executable by the processor to:
receive, from a network device, an indication of a set of two or more available channels including a first channel and a second channel;
receive, from the network device and based at least in part on the UE operating in accordance with a frame based equipment mode, a measurement gap configuration to configure the UE to perform interference detection in the second channel during a measurement gap that at least partially overlaps with an idle period of a fixed frame period of the first channel, the fixed frame period including the idle period and a period reserved for a listen before talk procedure;
receive a first downlink burst from the network device using the first channel and the fixed frame period;
sense, based at least in part on the measurement gap configuration, the second channel during the measurement gap that at least partially overlaps with the idle period of the fixed frame period of the first channel; and
transmit, to the network device, a measurement report that is based at least in part on sensing the second channel during the measurement gap.

18. The apparatus of claim 17, wherein the instructions are further executable by the processor to:
transmit, to the network device based at least in part on an identified interference associated with the first downlink burst, an interference indication comprising uplink control information (UCI).

19. The apparatus of claim 17, wherein the instructions are further executable by the processor to:
determine a signal-to-interference-plus-noise ratio (SINR) based at least in part on the first downlink burst; and
transmit, to the network device based at least in part on the determined SINR, an interference indication comprising an indication of the SINR.

20. The apparatus of claim 17, wherein the instructions are further executable by the processor to:
receive interference management resources (IMR) from the network device, the first downlink burst comprising the IMR;
receive downlink control information (DCI) from the network device, the DCI comprising a trigger for an IMR report, and the first downlink burst comprising the DCI;
generate the IMR report in response to the trigger, the IMR report indicating an amount of interference measured using the received IMR; and
transmit the IMR report to the network device.

21. The apparatus of claim 17, wherein the instructions are further executable by the processor to:
receive an IMR configuration from the network device, the IMR configuration indicating that IMR is to be transmitted semi-persistently at a periodicity within the first downlink burst, and the first downlink burst comprising the IMR configuration;
generate one or more IMR reports at the periodicity within the first downlink burst based at least in part on the IMR configuration, each of the one or more IMR reports indicating respective amounts of interference measured using the received IMR; and
transmit the one or more IMR reports to the network device.

22. The apparatus of claim 17, wherein the instructions are further executable by the processor to:
determine that at least a portion of the first downlink burst was not successfully received; and
transmit a negative acknowledgment (NACK) to the network device based at least in part on determining that the at least the portion of the first downlink burst was not successfully received.

23. The apparatus of claim 17, wherein the instructions are further executable by the processor to:
receive from the network device an indication of a frequency hopping pattern, the frequency hopping pattern comprising an instruction to switch between a plurality of additional channels and a plurality of additional frame periods, each of the plurality of additional channels selected from the set of two or more available channels.

24. An apparatus for wireless communications at a user equipment (UE), comprising:
means for receiving, from a network device, an indication of a set of two or more available channels including a first channel and a second channel;
means for receiving, from the network device and based at least in part on the UE operating in accordance with a frame based equipment mode, a measurement gap configuration to configure the UE to perform interference detection in the second channel during a measurement gap that at least partially overlaps with an idle period of a fixed frame period of the first channel, the fixed frame period including the idle period and a period reserved for a listen before talk procedure;
means for receiving a first downlink burst from the network device using the first channel and the fixed frame period;
means for sensing, based at least in part on the measurement gap configuration, the second channel during the measurement gap that at least partially overlaps with the idle period of the fixed frame period of the first channel; and
means for transmitting, to the network device, a measurement report that is based at least in part on sensing the second channel during the measurement gap.

25. A non-transitory computer-readable medium storing code for wireless communications at a user equipment (UE), the code comprising instructions executable to:
receive, from a network device, an indication of a set of two or more available channels including a first channel and a second channel;

receive, from the network device and based at least in part on the UE operating in accordance with a frame based equipment mode, a measurement gap configuration to configure the UE to perform interference detection in the second channel during a measurement gap that at least partially overlaps with an idle period of a fixed frame period of the first channel, the fixed frame period including the idle period and a period reserved for a listen before talk procedure;

receive a first downlink burst from the network device using the first channel and the fixed frame period;

sense, based at least in part on the measurement gap configuration, the second channel during the measurement gap that at least partially overlaps with the idle period of the fixed frame period of the first channel; and transmit, to the network device, a measurement report that is based at least in part on sensing the second channel during the measurement gap.

\* \* \* \* \*